(12) United States Patent
Yamamoto

(10) Patent No.: US 11,075,690 B2
(45) Date of Patent: Jul. 27, 2021

(54) COMMUNICATION DEVICE AND COMMUNICATION METHOD

(71) Applicant: Mitsubishi Electric Corporation, Chiyoda-ku (JP)

(72) Inventor: Katsuyuki Yamamoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/755,634

(22) PCT Filed: Oct. 19, 2018

(86) PCT No.: PCT/JP2018/038976
§ 371 (c)(1),
(2) Date: Apr. 13, 2020

(87) PCT Pub. No.: WO2019/078348
PCT Pub. Date: Apr. 25, 2019

(65) Prior Publication Data
US 2020/0336201 A1 Oct. 22, 2020

(30) Foreign Application Priority Data

Oct. 20, 2017 (JP) .............................. JP2017-203200

(51) Int. Cl.
*H04B 7/185* (2006.01)
*H04W 84/06* (2009.01)

(52) U.S. Cl.
CPC ......... *H04B 7/18517* (2013.01); *H04W 84/06* (2013.01)

(58) Field of Classification Search
CPC . H04B 7/185–195; H04W 4/40; H04W 84/06
See application file for complete search history.

(56) References Cited

U.S. PATENT DOCUMENTS 6,034,634 A 3/2000 Karlsson et al.
7,054,593 B2 * 5/2006 de La Chapelle ........... H04B 7/18506
455/12.1

(Continued)

FOREIGN PATENT DOCUMENTS

JP 2015-180026 A 10/2015

OTHER PUBLICATIONS

International Search Report dated Jan. 8, 2019 in PCT/JP2018/038976 filed on Oct. 19, 2018.

(Continued)

*Primary Examiner* — Raymond S Dean
(74) *Attorney, Agent, or Firm* — Oblon, McClelland, Maier & Neustadt, L.L.P.

(57) ABSTRACT

A communication device includes: a reception antenna having element reception antennas, an element reception signal processor for processing element reception signals and outputting signals received from two directions changeable electronically and independently, a transmission antenna having element transmission antennas, an element transmission signal generator for generating element transmission signals capable of transmitting radio waves in two directions changeable electronically and independently, two modems for modulation and demodulation of transmission and reception signals using two communication lines, and a controller. The communication device operates by switching between a search mode to communicate by tracking a primary satellite and searching a direction at which beacon signals transmitted by satellites are receivable in a search range, and a two-line mode to communicate by tracking the primary satellite and the secondary satellite found in the search mode.

20 Claims, 25 Drawing Sheets

(56) References Cited

U.S. PATENT DOCUMENTS

| | | | | |
|---|---|---|---|---|
| 7,512,511 | B1 * | 3/2009 | Schultz | F41H 13/0068 |
| | | | | 250/250 |
| 2006/0040612 | A1 * | 2/2006 | Min | H04B 7/18508 |
| | | | | 455/12.1 |
| 2015/0280806 | A1 * | 10/2015 | Jalali | H04B 7/18506 |
| | | | | 370/316 |
| 2016/0373991 | A1 * | 12/2016 | Corbel | H04B 7/18539 |
| 2017/0086255 | A1 | 3/2017 | Jayasimha et al. | |
| 2017/0105153 | A1 * | 4/2017 | Ashrafi | H04B 7/18541 |
| 2018/0343055 | A1 * | 11/2018 | Olson | B64G 1/10 |

OTHER PUBLICATIONS

Extended European Search Report dated Nov. 20, 2020 in European Patent Application No. 18869109.1, citing documents AA and AB therein. 12 pages.

* cited by examiner

COMMUNICATION DEVICE AND COMMUNICATION METHOD

TECHNICAL FIELD

The present disclosure relates to a communication device and a communication method that are used for communication relayed by a satellite.

BACKGROUND ART

In order to reduce air resistance of a satellite communication antenna mounted on an airplane, a cross-sectional area of the satellite communication antenna as viewed from the front of the airplane is to be made as small as possible. Lowering of height of the antenna is effective for making the cross-sectional area small as viewed from the front of the airplane, and antennas that have a laterally-elongated ellipsoidal opening surface are often used. Active electronically scanned array (AESA) type antennas are being developed as a technology for further lowering height of the antenna. The height can be lowered to roughly several cm by using the AESA type antenna.

The relaying satellite is to be changed depending on the motion of the airplane when communication is relayed by the satellite from the airplane. In the case of a single multi-beam satellite that has multiple beams, each beam relaying for a respective area, the beam in use is sometimes changed. In the case of a change in the communication line when communication is relayed by the satellite, a period occurs in which communication is disabled during switching between the communication lines.

In order to reduce the period in which communication is disabled during switching between the satellite communication lines, a method is proposed by which the allocation of the communication lines is performed by the multi-beam satellite rather than by a line management station installed on the ground (see, Patent Literature 1).

CITATION LIST

Patent Literature

Patent Literature 1: Unexamined Japanese Patent Application Kokai Publication No. 2015-180026

SUMMARY OF INVENTION

Technical Problem

In the field of satellite communications, there are efforts to construct mega-constellations (satellite networks) that provide coverage for the entire earth by several hundred to several thousand small-sized satellites orbiting in low orbits. When communication is relayed by satellites included in a mega-constellation, the changing of the relaying satellite occurs more frequently. For example, the changing of the satellite may be required every few minutes. The increased frequency of the changing of satellites occurs due to smallness of the area covered by a single satellite, and due to the satellite motion relative to the earth's surface due to the low orbit.

For example, in the case of communication relayed by a satellite included in a mega-constellation, switching often occurs to a communication line that is relayed by a different satellite. Thus the period in which communication is disabled during the switching of the communication line is to be eliminated or shortened.

In consideration of the aforementioned circumstances, an objective of the present disclosure is to eliminate the period in which communication is disabled during switching to a communication line relayed by a different satellite.

Solution to Problem

A communication device of the present disclosure includes: a reception antenna having a plurality of element reception antennas each to receive radio waves and output an element reception signal, the reception antenna outputting a plurality of element reception signals; an element reception signal processor to process the plurality of element reception signals to (i) output a reception signal having a primary reception frequency and coming from a primary reception direction being changeable electronically, and (ii) output a reception signal having a secondary reception frequency different from the primary reception frequency, the reception signal coming from a secondary reception direction being changeable electronically and independently of the primary reception direction; a transmission antenna having a plurality of element transmission antennas each being inputted an element transmission signal included in a plurality of element transmission signals and to transmit radio waves; an element transmission signal generator (i) being inputted a transmission signal having a primary transmission frequency and a transmission signal having a secondary transmission frequency different from the primary transmission frequency, and (ii) to generate the plurality of element transmission signals being inputted to the respective element transmission antennas such that the transmission antenna transmits radio waves of the primary transmission frequency in a primary transmission direction being changeable electronically, and such that the transmission antenna transmits radio waves of the secondary transmission frequency in a secondary transmission direction being changeable electronically and independently of the primary transmission direction; two modems to modulate and demodulate signals transmitted and received using either one of an allocated primary communication line and a secondary communication line allocated while communicating using the primary communication line; and a controller to control the element reception signal processor, the element transmission signal generator, and the two modems. The controller controls switching between (i) a search mode to communicate with a communication counterpart by tracking in the primary reception direction and the primary transmission direction a primary satellite that communicates using the primary communication line and is a communicable satellite transmitting radio waves receivable at a strength being greater than or equal to a determined communicable lower limit value, and to find the communicable satellite by setting the secondary reception frequency to a beacon frequency being a frequency of a beacon signal transmitted from a satellite and changing the secondary reception direction within a determined search range of an orientation direction, (ii) a line setting mode to set the secondary communication line to be relayed by a secondary satellite being the communicable satellite found in the search mode to communicate with the communication counterpart using the secondary communication line, and (iii) a two-line mode to communicate with the communication counterpart using the primary communication line by tracking the primary satellite in the primary reception direction and the primary transmission direction, and to communicate with the communication counterpart using the secondary communication line, set in the line setting mode, by tracking the secondary satellite in the secondary reception direction and the secondary transmission direction. The two-line mode is changed to the search mode.

A communication method according to the present disclosure is a communication method to communicate with a communication counterpart by using a communication device including (i) a reception antenna having a plurality of element reception antennas each to receive radio waves and output an element reception signal, the reception antenna outputting a plurality of element reception signals, (ii) an element reception signal processor to process the plurality of element reception signals and to output a reception signal having a primary reception frequency and coming from a primary reception direction that is changeable electronically, and output a reception signal having a secondary reception frequency different from the primary reception frequency, the reception signal coming from a secondary reception direction that is changeable electronically and independently of the primary reception direction, (iii) a transmission antenna having a plurality of element transmission antennas each being inputted an element transmission signal included in a plurality of element transmission signals to transmit radio waves, (iv) an element transmission signal generator being inputted a transmission signal having a primary transmission frequency and a transmission signal having a secondary transmission frequency different from the primary transmission frequency, and to generate the plurality of element transmission signals being inputted to the respective element transmission antennas such that the transmission antenna transmits radio waves of the primary transmission frequency in a primary transmission direction that is changeable electronically, and such that the transmission antenna transmits radio waves of the secondary transmission frequency in a secondary transmission direction being changeable electronically and independently of the primary transmission direction, (v) two modems each to modulate and demodulate signals transmitted and received using either one of an allocated primary communication line and a secondary communication line allocated while communicating using the primary communication line, and (iv) a controller to control the element reception signal processor, the element transmission signal generator, and the two modems. The communication method includes a search procedure to communicate with the communication counterpart by tracking in the primary reception direction and the primary transmission direction a primary satellite communicating using the primary communication line and being a communicable satellite transmitting radio waves receivable at a strength being greater than or equal to a determined communicable lower limit value, and to find the communicable satellite by setting the secondary reception frequency to a beacon frequency being a frequency of a beacon signal transmitted from a satellite and changing the secondary reception direction within a determined search range of an orientation direction; a line setting procedure to set the secondary communication line to be relayed by a secondary satellite being the communicable satellite found in the search procedure to communicate with the communication counterpart using the secondary communication line; a two-line communication procedure to communicate with the communication counterpart using the primary communication line by tracking the primary satellite in the primary reception direction and the primary transmission direction, and to communicate with the communication counterpart using the secondary communication line, set in the line setting procedure, by tracking the secondary satellite in the secondary reception direction and the secondary transmission direction; and a two-line communication continuation check procedure, executed in parallel with the two-line communication procedure, to check whether the two-line communication procedure is to be continued. When it is determined that the two-line communication procedure is not to be continued in the two-line communication continuation check procedure, the two-line communication procedure is changed to the search procedure.

Advantageous Effects of Invention

According to the present disclosure, the period during which communication is disabled during switching to the communication line relayed by a different satellite can be eliminated.

DESCRIPTION OF EMBODIMENTS

Embodiment 1

Figure 1:
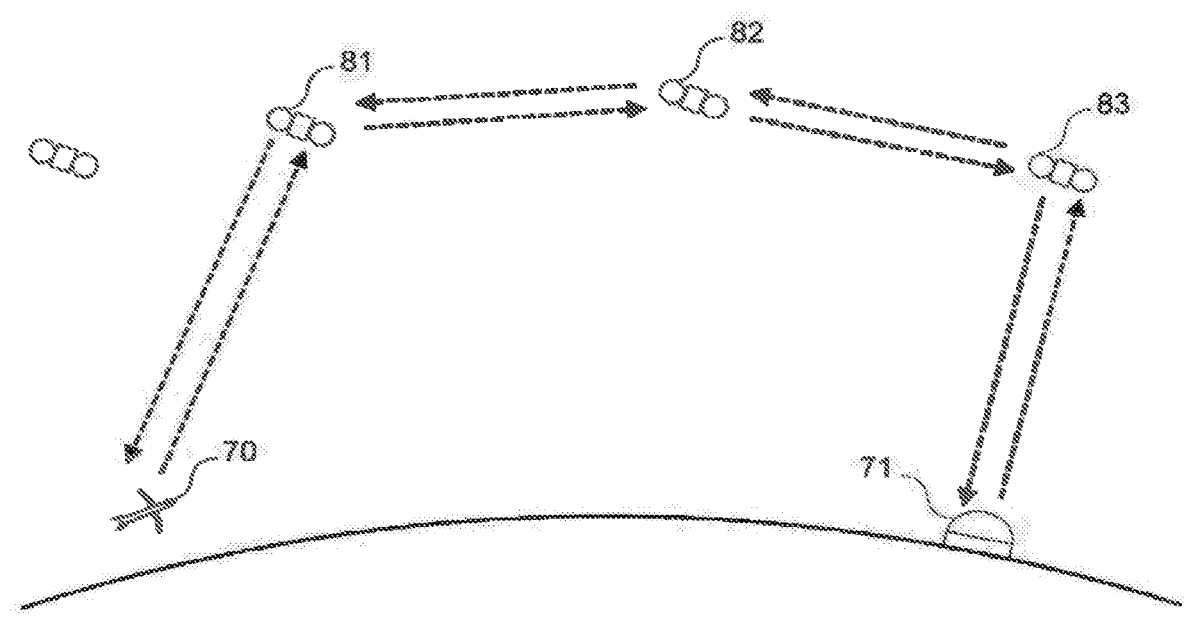
FIG. 1 is a drawing illustrating an example of a situation in which a communication device according to the present disclosure communicates.
Figure 5:
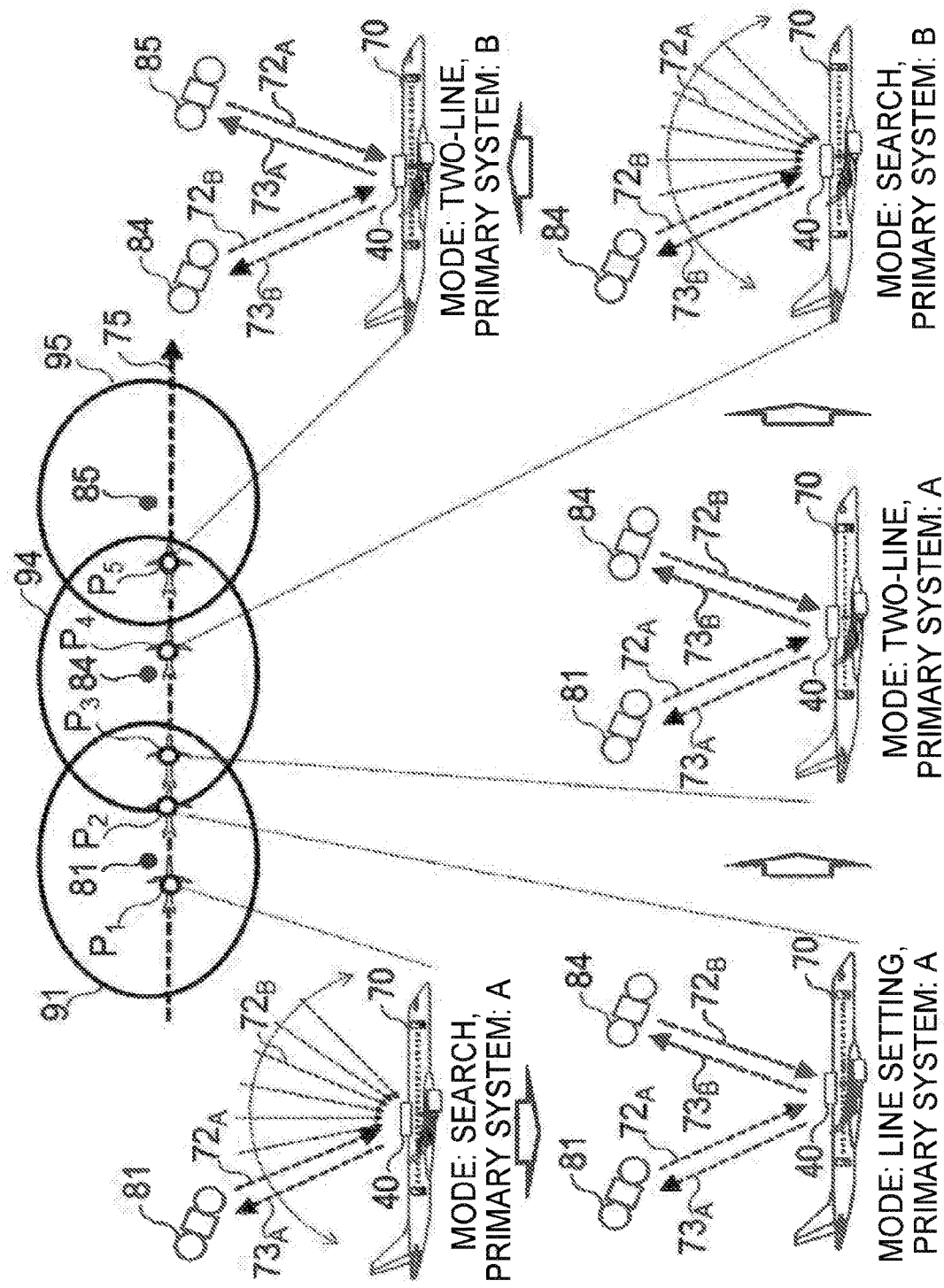
FIG. 5 is a drawing illustrating an example of change of operational mode while performing a handover of satellites by the communication device according to the Embodiment 1.

An example of a situation in which a communication device according to the present disclosure communicates is described with reference to FIG. 1. A communication device 40, as illustrated in FIG. 5, is mounted on an airplane 70. The communication device 40 communicates with a communication counterpart 71 on the ground being relayed by a satellite 81, a satellite 82, and a satellite 83. The communication counterpart 71 may be mounted on a mobile body such as an airplane, ship, automobile, or the like. In the example illustrated in FIG. 1, a satellite communication system 100 includes several thousand low earth orbit satellites that are distributed uniformly above the entire earth surface. Multiple satellites are distributed such that at least one communicable satellite can always be viewed from each spatial point in the entire earth surface and the air space over it up to a determined altitude. In order to communicate by using the satellite communication system 100, the communication device 40 directs an antenna to the satellite 81 existing near the communication device 40, and transmits and receives radio waves. The communication counterpart 71 directs an antenna to the satellite 83 existing near the communication counterpart 71, and transmits and receives radio waves. A communication route between the satellite 81 and the satellite 83 is determined by the satellite communication system 100. FIG. 1 illustrates a case in which three satellites are used for satellite relayed communication. The number of satellites in the communication route may also be 1, 2, 4 or more.

The satellites orbiting the earth at a low orbital height of several thousand kilometers orbit the earth in about two hours. Thus even without movement of the communication device 40, the satellite that transmits and receives radio waves is required to be changed every few minutes. For the ground station installed on the ground, a changing pattern indicating how the satellite being nearest to the ground station changes with temporal transition is fixed. An operational pattern of the antenna can be prepared to communicate by switching automatically to the satellite that is nearest to the ground station. The ground station can communicate continuously using the satellite communication system 100 by operating the antenna according to the predetermined operational pattern.

Figure 3:
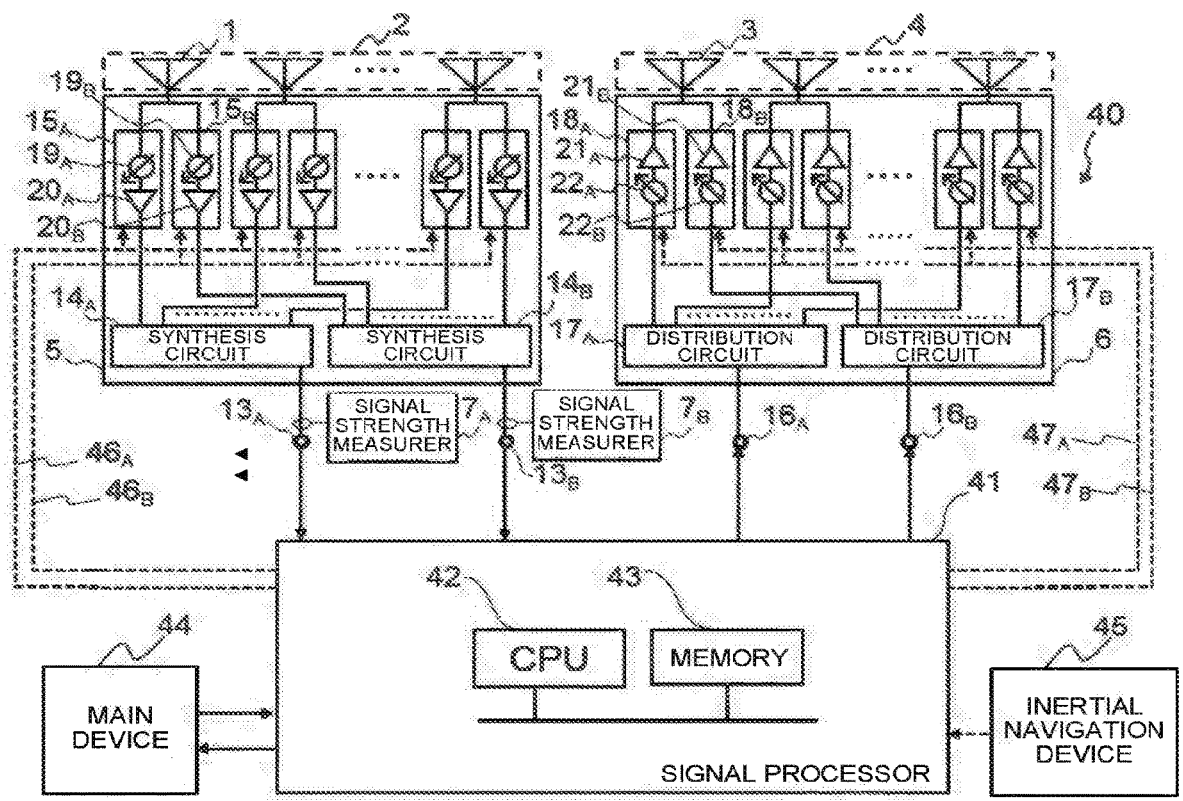
FIG. 3 is a schematic configuration view illustrating an example of the hardware configuration of the communication device according to Embodiment 1.

For the communication device 40 mounted on a mobile body such as the airplane 70, the position of the mobile body changes from moment to moment, and attitude of the mobile body also changes. Therefore, the operational pattern of the antenna cannot be determined beforehand for the communication device 40 mounted on the mobile body. Accompanying with movement of the airplane 70, the communication device 40 finds the communicable satellite and continues communication by switching to the found satellite. During switching (termed "handover") of relaying satellites, the communication device 40 operates to set a period for communication with the communication counterpart 71 that is relayed in parallel by two satellites, that is, the in-communication satellite and the post-handover satellite. Accordingly, the communication device 40 eliminates the period when communication is disabled during a handover. A device for giving data to the communication device 40 for transmission, and for receiving data received by the communication device 40, is termed a main device 44. The main device is illustrated in FIG. 3.

Figure 2:
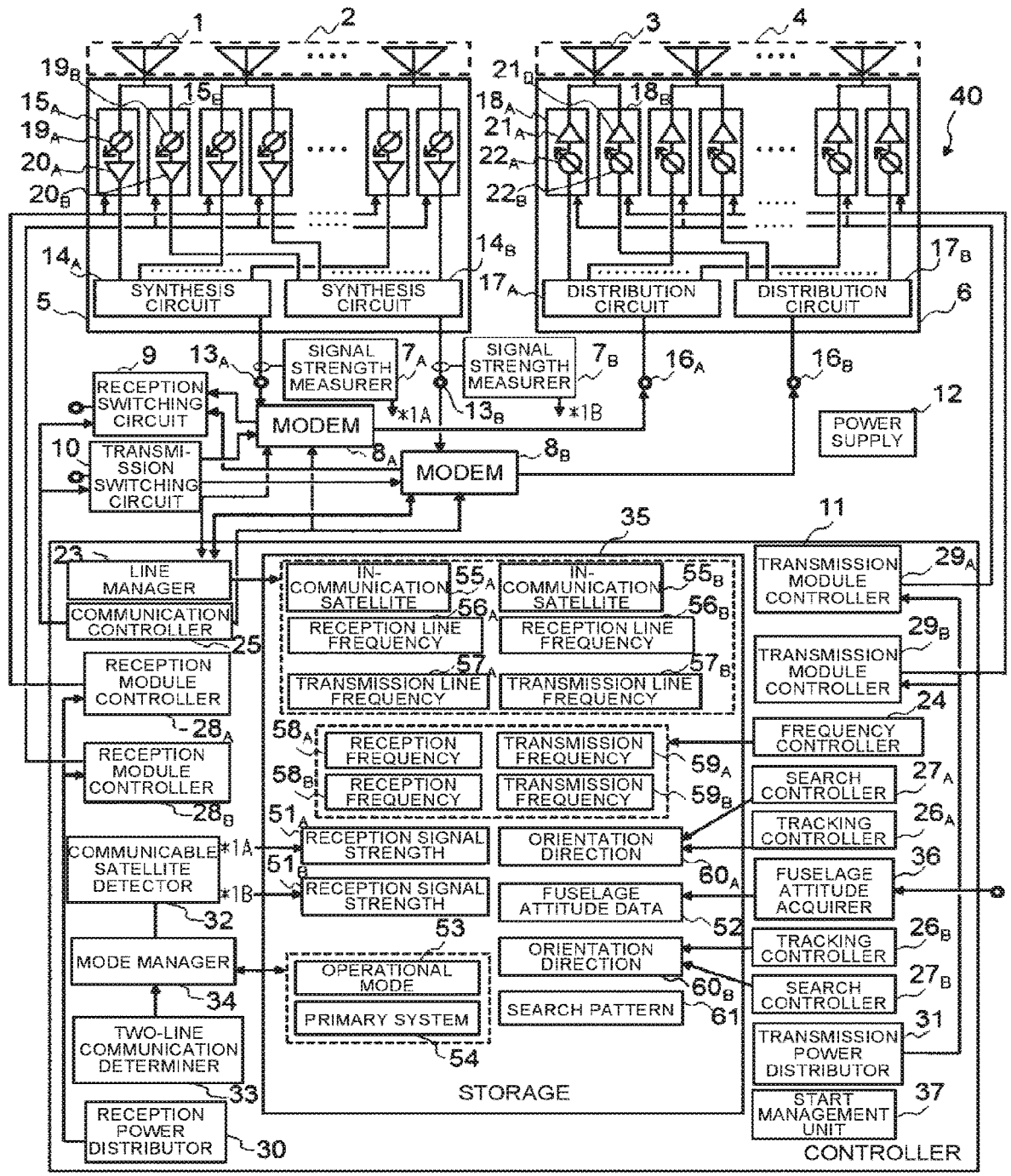
FIG. 2 is a block diagram illustrating the configuration of a communication device according to Embodiment 1 of the present disclosure.

The configuration of the communication device 40 is described with reference to FIGS. 2 and 3. FIG. 2 is a block diagram illustrating the configuration of a communication device according to Embodiment 1 of the present disclosure. FIG. 3 is a schematic configuration view illustrating an example of the hardware configuration of the communication device according to Embodiment 1. The communication device 40 includes a reception antenna 2 having a plurality of element reception antennas 1, a transmission antenna 4 having a plurality of element transmission antennas 3, an element reception signal processor 5, signal strength measurers $7_A$, $7_B$, an element transmission signal generator 6, two modems $8_A$, $8_B$, a reception switching circuit 9, a transmission switching circuit 10, a controller 11, and a power supply 12.

The reception antenna 2 and the transmission antenna 4 are ASEA type antennas. The element reception antennas 1 and the element transmission antennas 3, for example, are patch antennas having circular opening surfaces. The element reception antennas 1, for example, are arrayed at regular intervals to form the reception antenna 2. The thin element reception signal processor 5 is arranged below the reception antenna 2. The element transmission antennas 3, for example, are arrayed at regular intervals to form the transmission antenna 4. The thin element transmission signal generator 6 is arranged below the transmission antenna 4.

The element reception signal processor 5 has two output terminals $13_A$, $13_B$, and two synthesis circuits $14_A$, $14_B$, and a plurality of sets of two reception modules $15_A$, $15_B$ each set being provided for each of the plurality of element reception antenna 1. Each of the plurality of element reception antennas 1 receives radio waves and generates element reception signal. The element reception signal is inputted to the reception modules $15_A$, $15_B$. Signals outputted from the plurality of reception modules $15_A$ are combined by the synthesis circuit $14_A$, and are outputted from the output terminal $13_A$. The signals outputted from the plurality of reception modules $15_B$ are combined by the synthesis circuit $14_B$, and are outputted from the output terminal $13_B$. The signal strength measurer $7_A$ measures a reception signal strength $51_A$ that is the strength of the reception signal outputted by the output terminal $13_A$ of the element reception signal processor 5. The signal strength measurer $7_B$ measures a reception signal strength $51_B$ that is the strength of the reception signal outputted by the output terminal $13_B$.

The element transmission signal generator 6 has two input terminals $16_A$, $16_B$, and two distribution circuits $17_A$, $17_B$, and a plurality of sets of two transmission modules $18_A$, $18_B$ each set being provided for each of the plurality of element transmission antenna 3. The transmission signal inputted to the input terminal $16_A$ is distributed by the distribution circuit $17_A$ to be inputted to the plurality of transmission modules $18_A$. The transmission signal inputted to the input terminal $16_B$ is distributed by the distribution circuit $17_B$ to be inputted to the plurality of transmission modules $18_B$. The element transmission signals outputted by the transmission modules $18_A$, $18_B$ are inputted together to the element transmission antenna 3. Each of the plurality of element transmission antennas 3 emits the inputted element transmission signals to space as radio waves.

The hardware configuration of the communication device 40 is described with reference to FIG. 3. The communication device 40 has the reception antenna 2, the transmission antenna 4, the element reception signal processor 5, the signal strength measurers $7_A$, $7_B$, and a signal processor 41. The signal processor 41 is a computer that executes the processing of the modems $8_A$, $8_B$, the reception switching circuit 9, the transmission switching circuit 10, and the controller 11. The reception switching circuit 9 and the transmission switching circuit 10 may be implemented by hardware other than the signal processor 41. In the schematic configuration views illustrated in drawings such as FIG. 3, signal lines through which communication signals flow are indicated by solid lines, and control signal lines through which the control signals flow are indicated by dashed lines.

The signal processor 41 is implemented by a computer that includes a CPU 42, a memory 43, and the like. The memory 43 stores information such as a program executed by the CPU 42, data used for processing, data obtained as a result of processing, or the like. The memory 43 is semiconductor memory, such as flash memory, and a hard disc. The memory 43 includes volatile memory devices and non-volatile memory devices. The computer may include multiple CPUs 42. Each of the modems $8_A$, $8_B$ and the controller 11 may be executed by separate CPUs 42. The modems $8_A$, $8_B$, the reception switching circuit 9, the transmission switching circuit 10, and the controller 11 may be implemented with the CPU 42 by executing dedicated programs stored in the memory 43. The modems $8_A$, $8_B$ may be implemented by a programmable logic device (PLD) such as a field-programmable gate array (FPGA). The modem may be divided into a modulator and a demodulator.

Transmission data to be transmitted by the transmission antenna 4 is inputted to the signal processor 41 from a main device 44. The signal processor 41 outputs to the main device 44 reception data received by the reception antenna 2. Attitude angles (yaw angle, roll angle, and pitch angle) of the airplane 70 are inputted in order to control the reception antenna 2 and the transmission antenna 4 so as to direct in the direction of the satellite 81 even when attitude of the airplane 70 changes. The attitude angles of the airplane 70 are calculated by an inertial navigation device 45 of the airplane 70.

The reception signals from the output terminals $13_A$, $13_B$ of the element reception signal processor 5 are inputted to the signal processor 41. The signal processor 41 demodulates the reception signals inputted from the two systems, and generates reception data. The signal processor 41 outputs the demodulated reception data to the main device 44. The element reception signal processor 5 has the reception modules $15_A$, $15_B$ of two systems so as to generate reception signals received by the reception antenna 2 from two directions. In order to control the reception modules $15_A$, $15_B$ of the two systems, control signal lines $46_A$, $46_B$ of two systems connect between a signal processor 41 and the element reception signal processor 5.

The signal processor 41 modulates the transmission data inputted from the main device 44, and generates transmission signals of the two systems. The transmission signals of the two systems are inputted respectively to the input terminals $16_A$, $16_B$ of the element transmission signal generator 6. The element transmission signal generator 6 has transmission modules $18_A$, $18_B$ of two systems so as to emit the transmission signals inputted respectively through the input terminals $16_A$, $16_B$, as radio waves in two different directions from the transmission antenna 4. In order to control the transmission modules $18_A$, $18_B$ of the two systems, control signal lines $47_A$, $47_B$ connect between the signal processor 41 and the element transmission signal generator 6.

Figure 4:
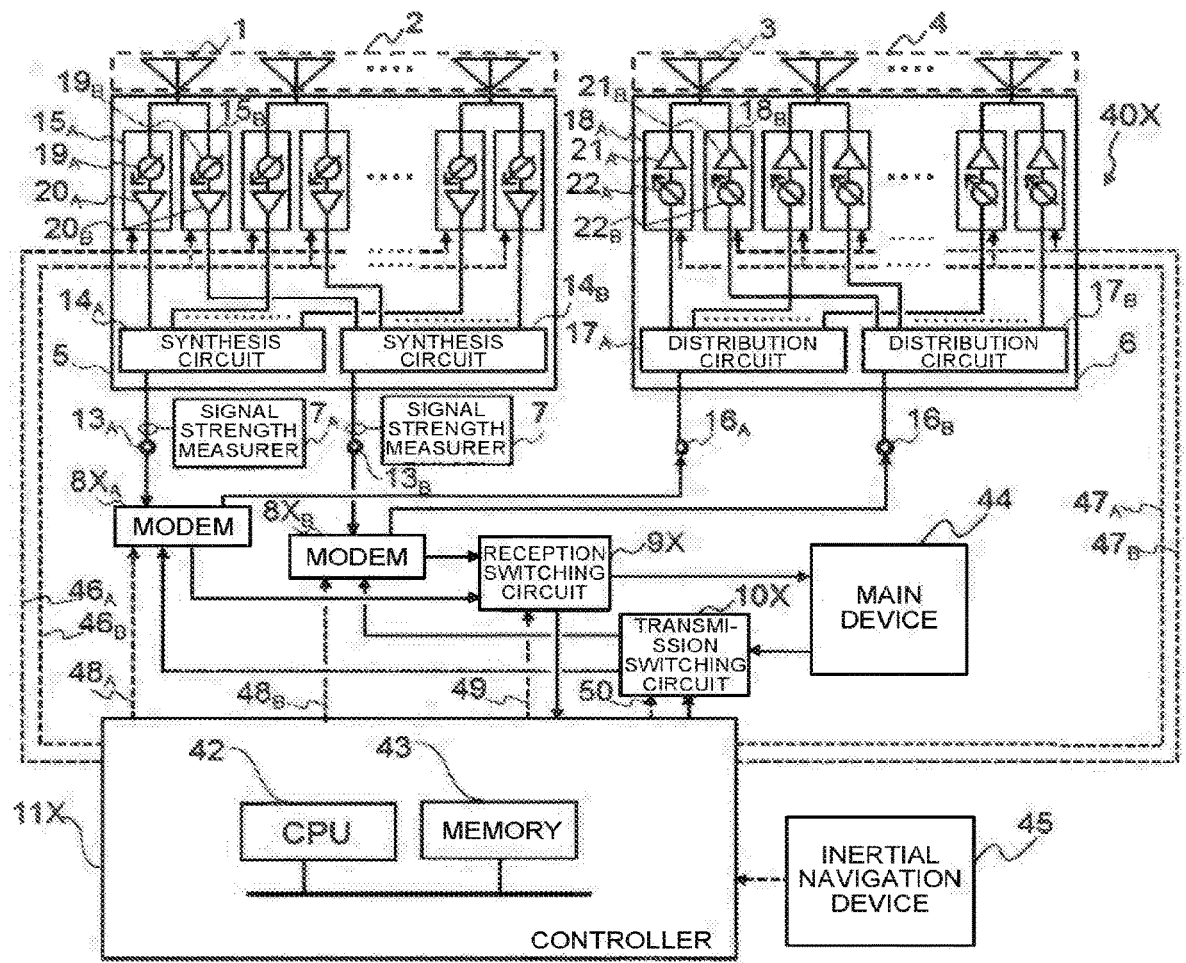
FIG. 4 is a schematic configuration view illustrating a modified example of the hardware configuration of the communication device according to Embodiment 1.

The modems $8_A$, $8_B$, the reception switching circuit 9, and the transmission switching circuit 10 may be implemented by dedicated hardware, and the controller 11 alone may be implemented by the computer. A schematic configuration view in this case is illustrated in FIG. 4. FIG. 4 is a schematic configuration view illustrating a modified example of the hardware configuration of the communication device according to Embodiment 1. The hardware configuration illustrated in FIG. 4 is a modified example, and the description below is for the case having the hardware configuration of FIG. 3. In this modified example, the controller 11 is implemented with the CPU 42 by executing a dedicated program stored in the memory 43.

In the communication device 40X illustrated in FIG. 4, data is exchanged between the modems $8X_A$, $8X_B$ and a controller 11X through a reception switching circuit 9X and a transmission switching circuit 10X. The reception switching circuit 9X outputs to the main device 44 the reception data demodulated by the modems $8X_A$, $8X_B$. Further, the reception data demodulated by the one modem, among the modems $8X_A$, $8X_B$, of the system used in communication for line setting is outputted to the controller 11X. The transmission switching circuit 10X performs switching of the transmission data from the main device 44 to either one or both of the modems $8X_A$, $8X_B$. Further, transmission data outputted from the controller 11X for line setting is inputted to the one of the system used in communication for line setting among the modems $8X_A$, $8X_B$.

The controller 11X uses control signal lines $48_A$, $48_B$ to control whether or not the each of modems $8X_A$, $8X_B$ performs modulation and demodulation. The controller 11X controls the reception switching circuit 9X through a control signal line 49 and the transmission switching circuit 10X through a control signal line 50.

The modem $8_A$ is connected to the output terminal $13_A$ of the element reception signal processor 5 and the input terminal $16_A$ of the element transmission signal generator 6.

The modem $8_A$ demodulates the reception signal having a reception frequency $f_{Ar}$ outputted from the output terminal $13_A$ of the element reception signal processor 5; and modulates the input signal and outputs the modulated signal as a transmission signal having a transmission frequency $f_{As}$ to the input terminal $16_A$ of the element transmission signal generator 6. Both of the reception frequency f and the transmission frequency f together constitute a single communication line. The communication line used for the reception frequency $f_{Ar}$ and the transmission frequency $f_{As}$ is termed the communication line of a system A. The satellite used for the communication line of the system A is termed a satellite $80_A$. The modem $8_A$, the output terminal $13_A$, the synthesis circuit $14_A$, the reception module $15_A$, the input terminal $16_A$, the distribution circuit $17_A$, the transmission module $18_A$ are devices and equipment of the system A.

The modem $8_B$ is connected to the output terminal $13_B$ of the element reception signal processor 5 and the input terminal $16_B$ of the element transmission signal generator 6. The modem $8_B$ demodulates the reception signal having a reception frequency $f_{Br}$ outputted from the output terminal $13_B$, and modulates the input signal and outputs the modulated signal as the transmission signal having a transmission frequency $f_{Bs}$ to the input terminal $16_B$. Both of the reception frequency $f_{Br}$ and the transmission frequency $f_{Bs}$ together constitute a single communication line. The communication line used for the reception frequency $f_{Br}$ and the transmission frequency $f_{Bs}$ is termed the communication line of a system B. The satellite used for the communication line of the system B is termed a satellite $80_B$. The modem $8_B$, the output terminal $13_B$, the synthesis circuit 14B, the reception module $15_B$, the input terminal $16_B$, the distribution circuit $17_B$, and the transmission module $18_B$ are devices and equipment of the system B.

The reception switching circuit 9 outputs to the main device 44, as reception data received by the communication device 40, the signal demodulated by one of the modems $8_A$, $8_B$. The signals may be demodulated and outputted by both of the modems $8_A$, $8_B$, and the main device 44 may determine whether to use either or both of the signals. The transmission switching circuit 10 inputs to either or both of the modems $8_A$, $8_B$ the transmission data inputted from the main device 44 to the communication device 40.

The controller 11 controls the element reception signal processor 5, the element transmission signal generator 6, the two modems $8_A$, $8_B$, the reception switching circuit 9, and the transmission switching circuit 10. Reception signal strengths $51_A$, $51_B$, signals demodulated by the modems $8_A$, $8_B$, and attitude angles of the airplane 70 (yaw angle, roll angle, and pitch angle) are inputted to the controller 11. Moreover, in the case in which an orientation direction error of the antenna is determined outside the communication device 40, the orientation direction error is also inputted. The control signals outputted by the controller 11 are described later The power supply 12 supplies power to components such as the element reception signal processor 5, the element transmission signal generator 6, the two modems $8_A$, $8_B$, and the controller 11.

The element reception signal processor 5 changes phase of the element reception signal outputted by each of the plurality of element reception antennas 1, and combines the phase-changed signals. The amount of change of phase is determined depending on the reception frequency and the position of the element reception antenna 1 within the entire reception antenna 2. By changing phases of the plurality of element reception signals and combining of the phase-changed signals, the reception antenna 2 has directivity, and radio waves can be received from the orientation direction, that is, from the reception direction. The orientation direction can be changed while the reception antenna 2 remains stationary. The changing of the orientation direction while the antenna remains stationary is termed changing the orientation direction electronically. In order to change the orientation direction electronically, the reception module $15_A$ has a phase shifter $19_A$ and an amplifier $20_A$, and the reception module $15_B$ has a phase shifter $19_B$ and an amplifier $20_B$.

The element reception signal processor 5 has the reception modules $15_A$, $15_B$ of two systems. The reception module $15_A$ can change electronically the orientation direction of the reception signal at the reception frequency $F_{Ar}$. The reception module 150 can change electronically and independently of the orientation direction of the reception signal at the reception frequency $f_{Ar}$, the orientation direction of the reception signal at the reception frequency for that differs from the reception frequency $f_{Ar}$. The controller 11, through the control signal line $46_A$, controls the amount of change of phase (phase shift amount) at the phase shifter $19_A$ and an amplification factor of the amplifier $20_A$. The controller 11, through the control signal line $46_B$, controls the phase shift amount of the phase shifter $19_B$ and the amplification factor of the amplifier $20_B$.

By controlling the phase of radio waves emitted from each of the element transmission antennas 3, the transmission antenna 4 can emit radio waves in the determined orientation direction, that is, the transmission direction. The phase of the element transmission signal inputted to each of the element transmission antennas 3 is determined depending on the transmission frequency and the position within the entire transmission antenna 4 of the element transmission antenna 3. The element transmission signal generator 6 generates element transmission signals so that the transmission antenna 4 can transmit radio waves of the transmission frequency $f_{As}$ and the radio waves of the transmission frequency $f_{Bs}$ different from the transmission frequency $f_{As}$ by changing electronically and independently the orientation direction. The corresponding element transmission antenna 3 emits to space the generated element transmission signal as radio waves.

In order to transmit radio waves in two directions independently, the element transmission signal generator 6 has two systems of transmission modules termed the transmission modules $18_A$, $18_B$. The transmission module $18_A$ that processes the transmission signal having the transmission frequency $f_{As}$ has a phase shifter $21_A$, an amplifier $22_A$. The transmission module $18_B$ that processes the transmission signal having the transmission frequency $f_{Bs}$ has a phase shifter $21_B$ and an amplifier $22_B$. The controller 11 through the control signal line $47_A$ controls the phase shift amount at the phase shifter $21_A$, the amplification factor of the amplifier $22_A$. The controller 11 through the control signal line $47_B$ controls the phase shift amount at the phase shifter $21_B$ and the amplification factor of the amplifier $22_B$.

A communication line allocated and set to be used for communication as a first line among the two lines and used by the communication device 40 for communication is termed the "primary communication line". A communication line set to be used for communication and allocated while communicating using the primary communication line is termed the "secondary communication line". A system for communication using the primary communication line is termed the "primary system", and a system for communication using the secondary communication line is termed the "secondary system". Among the system A and the system B, the secondary system is the system that is not the primary system. A satellite to and from which the communication device 40 transmits and receives radio waves by the primary system is termed the "primary satellite", and a satellite to and from which the communication device 40 transmits and receives radio waves by the secondary system is termed the "secondary satellite". A reception frequency used by the primary communication line is termed the "primary reception frequency", a transmission frequency used by the primary communication line is termed the "primary transmission frequency", a reception frequency used by the secondary communication line is termed the "secondary reception frequency", and a transmission frequency used by the secondary communication line is termed the "secondary transmission frequency". The secondary reception frequency differs from the primary reception frequency, and the secondary transmission frequency differs from the primary transmission frequency. A direction receiving the reception signal having the primary reception frequency at the reception antenna 2 is termed the "primary reception direction", and a direction receiving the reception signal having the secondary reception frequency at the reception antenna 2 is termed the "secondary reception direction". A direction transmitting the transmission signal having the primary transmission frequency at the transmission antenna 4 is termed the "primary transmission direction", and a direction transmitting the transmission signal having the secondary transmission frequency at the transmission antenna 4 is termed the "secondary transmission direction".

The configuration of the controller 11 is described. The controller 11 includes a line manager 23, a frequency controller 24, a communication controller 25, reception module controllers $28_A$, $28_B$, transmission module controllers $29_A$, $29_B$, tracking controllers $26_A$, $26_B$, search controllers $27_A$, $27_B$, a reception power distributor 30, a transmission power distributor 31, a communicable satellite detector 32, a two-line communication determiner 33, a mode manager 34, a storage 35, a fuselage attitude acquirer 36, and a start manager 37.

The line manager 23 manages the communication lines used by the communication device 40. The frequency controller 24 determines the frequency of the carrier waves used for modulation and demodulation by the modems $8_A$, $8_B$. The communication controller 25 controls whether the modems $8_A$, $8_B$ are to be used for communication with the communication counterpart 71. The modems $8_A$, $8_B$ are two modems, each for modulation and demodulation of the signals transmitted and received using the primary communication line or the secondary communication line.

The tracking controller $26_A$ controls the orientation direction of the system A so as to track the satellite $80_A$. The tracking controller $26_B$ controls the orientation direction of the system B so as to track the satellite $80_B$. The search controller $27_A$, to search for a communicable satellite, controls the orientation direction of the system A so as to change in a search range. The search controller $27_B$, to search for a communicable satellite, controls the orientation direction of the system B so as to change in the search range. For the system A and the system B, the transmission direction is controlled so that the transmission direction and the reception direction are the same direction. The term "communicable satellite" means a satellite that transmits radio waves that can be received at a strength being greater than or equal to a determined communicable lower limit value. The communicable lower limit value is described later.

The expression "tracking a satellite" means controlling the reception direction of the reception antenna 2 and the transmission direction of the transmission antenna 4 such that the differences of the direction of radio waves coming from the satellite to the reception and the transmission directions are reduced.

The tracking controller $26_A$ and the search controller $27_A$ control the reception direction and the transmission direction of the system A. The tracking controller $26_B$ and the search controller $27_B$ control the reception direction and the transmission direction of the system B.

The reception module controller $28_A$ controls the reception module $15_A$ such that the reception direction of the system A is directed to a determined direction. The transmission module controller $29_A$ controls the transmission module $18_A$ such that the transmission direction of the system A is directed to the determined direction. The reception module controller $28_B$ controls the reception module $15_B$ such that the reception direction of the system B is directed to a determined direction. The transmission module controller $29_B$ controls the transmission module $18_B$ such that the transmission direction of the system B is directed to the determined direction.

The tracking controllers $26_A$, $26_B$, the search controllers $27_A$, $27_B$, the reception module controllers $28_A$, $28_B$, and the transmission module controllers $29_A$, $29_B$ are included in an orientation direction controller that controls the primary reception direction that is the reception direction of the primary system, the secondary reception direction that is the reception direction of the secondary system, the primary transmission direction that is the transmission direction of the primary system, and the secondary transmission direction that is the transmission direction of the secondary system.

The reception power distributor 30 determines how to distribute the power among the reception modules $15_A$ of the system A and the reception modules $15_B$ of the system B in the element reception signal processor 5. The power supplied to the element reception signal processor 5 is fixed. The reception power distributor 30 sets a ratio between a total power distributed to the reception modules $15_A$ and a total power distributed to the reception modules $15_B$. Either one of the reception modules $15_A$, $15_B$ is used as the primary system, and the other reception module is used as the secondary system. The reception power distributor 30 sets a primary reception power that is power used in processing of the reception signal of the primary system, that is, of the primary reception frequency. Further, the reception power distributor 30 sets a secondary reception power that is power used in processing of the reception signal of the secondary system, that is, of the secondary reception frequency.

The transmission power distributor 31 determines how to distribute the power among the transmission modules $18_A$ of the system A and the transmission modules $18_B$ of the system B in the element transmission signal generator 6. The power supplied to the element transmission signal generator 6 is fixed. The transmission power distributor 31 sets a ratio between a total power distributed to the transmission modules $18_A$ and a total power distributed to the transmission modules $18_B$. Either one of the transmission modules $18_A$, $18_B$ is used as the primary system, and the other transmission module is used as the secondary system. The transmission power distributor 31 sets a primary transmission power that is power used in generation of the transmission signal of the primary system, that is, of the primary transmission frequency, and a secondary transmission power that is power used in generation of the transmission signal of the secondary system, that is, of the secondary transmission frequency.

The communicable satellite detector 32 finds the communicable satellite while the search controllers $27_A$, $27_B$ change the orientation direction in a search mode and a start-up search mode. In the case in which both of the system A and the system B are communicating, the two-line communication determiner 33 determines whether or not the communication by the communication lines of the two systems that are the system A and the system B is to be continued. The mode manager 34 controls an operational mode. The operational mode is described later. The storage 35 stores data to be used for operation of the communication device 40. The fuselage attitude acquirer 36 stores in the storage 35 the attitude angle of the airplane 70 inputted from the inertial navigation device 45 as fuselage attitude data 52. The start manager 37 manages starting and stopping of each processing component. The data stored in the storage 35 is described later.

Operational modes of the communication device 40 are roughly divided into the six types as shown below. The operational modes are described below. Each processing component executes processing depending on the operational mode. An operational mode 53 that is data indicating the operational mode is stored in the storage 35.

Stopped mode: A state in which the communication device 40 is not communicating.

Start-up search mode: A beginning state for the communication device 40 to start communication with the communication counterpart 71, and to search for a communicable satellite in order to set the first communication line.

Start-up line setting mode: A state in which the first satellite (primary satellite) is found, and the first communication line (primary communication line) is being set to be able to communicate with the communication counterpart 71.

Search mode: A state, while communicating with the communication counterpart 71 using the primary communication line, in which the communicable satellite is being searched in order to set the second communication line to communicate with the communication counterpart 71.

Line setting mode: A state in which the second satellite, that is, the secondary satellite, is found, and the second communication line (secondary communication line) is being set to be able to communicate with the communication counterpart 71.

Two-line mode: A state while communicating with the communication counterpart 71 using the primary communication line and the secondary communication line.

The start-up search mode and the start-up line setting mode are operational modes that are taken only during the start-up of communication. The search mode, the line setting mode, and the two-line mode are taken while communicating with the communication counterpart 71.

During the searching for the satellite in the start-up search mode and the search mode, a beacon signal that includes information for identifying the satellite and being transmitted by the satellite is detected. Therefore, the reception frequency of the system to be used for the search is set to a beacon frequency that is the frequency of the beacon signal. In the start-up search mode, the orientation direction of the primary system is changed, and in the search mode, the orientation direction of the secondary system is changed.

In the start-up search mode and the search mode, a search range to search for the communicable satellite, for example, is a range that is 360° azimuth angle and 0° to 90° in elevation angle. A search controller 27 of one of the systems, among the search controllers $27_A$, $27_B$, is used in the searching for the communicable satellite. The search controller 27 means either one of the search controllers $27_A$, $27_B$. Which of the search controllers $27_A$, $27_B$ actually is used changes depending on whether the primary system is the system A or the system B. Similarly, a tracking controller 26 or the like means that of either the system A or the system B. In the start-up search mode and the search mode, the search controller 27 of the system used for the search changes the orientation direction of the reception antenna 2 within the search range at a rough and uniform density at the beginning of the search. When the direction of the beacon signal is detected at a signal strength equal to or greater than a threshold, the vicinity of such a direction is searched more finely. However, in the search mode, even when the signal strength of the beacon signal is greater than or equal to the threshold in the vicinity of the direction in which the primary satellite exists, such fine searching is not performed in the vicinity of the direction. The two types of information, shown below, are obtained by the search controller 27 of one of the systems.

(a) Whether or not there exists a direction in which the signal strength of the beacon signal is greater than or equal to a threshold.

(b) When such a direction exists, the direction in which the signal strength becomes maximum within the determined range in the vicinity of the direction in which the signal strength is greater than or equal to the threshold.

In the case in which there exists no direction in which the signal strength is greater than or equal to the threshold, the communicable satellite is not found. In the case in which the direction exists in which the signal strength is greater than or equal to the threshold, the communicable satellite is found.

A different search method taking into account the attitude angle of the airplane 70 may be used. In the different search method, assuming a tangent plane of a virtual sphere defining a fixed distance from the center of the earth at the altitude of the airplane 70, only on an earth-opposite side of the tangent plane is searched. Because the communicable satellite cannot be found on an earth side of the tangent plane of the virtual sphere, the search range being impossible to find the communicable satellite is not searched, and the period for rough searching the entire search range can be shortened.

The speed of scanning of the orientation direction of the reception antenna 2 and the transmission antenna 4 that are AESA type antennas is greater than or equal to 90° per second, for example. The period for a single search is assumed to be several seconds. In the case in which the communicable satellite is not found in the search mode, searching is repeated at a determined cycle.

In the case in which the communicable satellite is found in the search mode, the operational mode is changed to the line setting mode. In the line setting mode, the orientation direction of the secondary system of the reception antenna 2 and the transmission antenna 4 is set to the direction in which the communicable satellite found in the search mode exists. In the line setting mode, the line manager 23, by the secondary system, communicates with the line management station to set the communication line. The device, such as the line management station, that manages the communication lines and allocates a communication line in response to a request is provided for the satellite communication system in use. Moreover, when the line manager 23 is in communication with the line management station in the search mode, the reception frequency and the transmission frequency of the secondary system are set to the reception frequency and the transmission frequency used in line allocation control. In the start-up search mode, the reception frequency and the transmission frequency of the primary system are set to the reception frequency and the transmission frequency used in line allocation control.

An example how the operational mode is changed when the communication device 40 performs a handover of the satellite is described with reference to FIG. 5. The upper part of FIG. 5 illustrates a positional relationship between the airplane 70 and communicable ranges (beam ranges) of the satellites. The upper part of FIG. 5 is a view as viewed in the direction of the center of the earth from a point far from the center of the earth. Since a satellite in low orbit moves relative to the earth surface, the beam ranges of the satellite moves. To facilitate understanding in FIG. 5, the satellite beam ranges are drawn such that the ranges do not move, and the airplane 70 is indicated as moving along a flight track 75. The beam ranges 91, 94, and 95 of three satellites 81, 84, and 85, respectively, are expressed with ellipses.

When the airplane 70 exists at a spatial point $P_1$, the airplane 70 exists in only the beam range 91 of the satellite 81. At the spatial point $P_1$, the system A is the primary system, and the system B is the secondary system. The communication device 40 operates in the search mode. In the search mode, the communication device 40 uses a reception beam $72_A$ and a transmission beam $73_A$ of the primary system to communicate with the communication counterpart 71 using the primary communication line relayed by the satellite 81. As a parallel operation, the communication device 40 searches for the communicable satellite by a reception beam $72_B$ of the secondary system.

When the airplane 70 moves to a spatial point $P_2$, the communication device 40 enters the interior of the beam range 94 of the satellite 84. At the spatial point $P_2$, the beacon signal emitted by the satellite 84 is detected by the reception beam $72_B$ of the secondary system. The communication device 40 changes the operational mode from the search mode to the line setting mode. In the line setting mode, the communication device 40 transmits radio waves to and receives radio waves from the satellite 81 by the reception beam $72_A$ and the transmission beam $73_A$ of the primary system, thereby communicating with the communication counterpart 71 using the primary communication line relayed by the satellite 81. As a parallel operation, the communication device 40 transmits radio waves to and receives radio waves from the satellite 84 by the reception beam $72_B$ and a transmission beam $73_B$ of the secondary system, thereby communicating with the line management station using the secondary communication line relayed by the satellite 84. For the secondary communication line during line setting, a communication line that is determined by the satellite communication system 100, such as a dedicated line for line setting or the like is used. When setting of the secondary communication line is completed and the line-setting mode is ended, the airplane 70 exists at a spatial point $P_3$. At the spatial point $P_3$, the communication device 40 operates in the two-line mode to communicate in parallel using the primary communication line relayed by the satellite 81 and the secondary communication line relayed by the satellite 84.

When the airplane 70 moves to a spatial point $P_4$, the communication device 40 gets out of the beam range 91 of the satellite 81, and the satellite 81 is no longer a communicable satellite. The communication device 40 cannot communicate using the primary communication line relayed by the satellite 81. The communication device 40 changes the satellite 84 from the secondary satellite to the primary satellite, and changes the system B, formerly the secondary system, to the primary system. The system A becomes the secondary system, and the communication device 40 operates in search mode to search for a communicable satellite using the system A. In the search mode starting from the spatial point $P_4$, the communication device 40 communicates using the primary communication line relayed by the satellite 84 using the reception beam $72_B$ and the transmission beam $73_B$ of the primary system. As a parallel operation, the communication device 40 searches for the communicable satellite by the reception beam $72_A$ of the secondary system.

When the satellite 85 is found in the search mode, the operational mode is changed to the two-line mode being temporarily the line setting mode. A spatial point $P_5$ exists within the beam range 94 of the satellite 84 and within the beam range 95 of the satellite 85. At the spatial point $P_5$, the communication device 40 operates in the two-line mode while using the system B as the primary system. The communication device 40 transmits radio waves to and receives radio waves from the satellite 84 using the reception beam $72_B$ and the transmission beam $73_B$ of the primary system, and communicates with the communication counterpart 71 using the primary communication line relayed by the satellite 84. As a parallel operation, the communication device 40 transmits radio waves to and receives radio waves from the satellite 85 by the reception beam $72_A$ and the transmission beam $73_A$ of the secondary system, thereby communicating with the communication counterpart 71 using the secondary communication line relayed by the satellite 85.

As illustrated in FIG. 5, while performing the handover from the satellite 81 to the satellite 84, a period of communication relayed by both of the satellite 81 and the satellite 84 is taken, and communication with the communication counterpart 71 is continued by relay using only the satellite 84. Thus the communication device 40 does not have a period during the handover in which communication cannot be performed with the communication counterpart 71. Also during the handover from the satellite 84 to the satellite 85, no period occurs in which the communication device 40 cannot communicate with the communication counterpart 71.

An example of use state of the antenna in each operational mode of the communication device 40 is described with reference to FIG. 6. Power distribution of the reception antenna 2 and the transmission antenna 4 to the primary system and the secondary system in the search mode are illustrated in the upper part of FIG. 6. At the reception antenna 2, 90% of power is distributed to the primary system, and 10% of power is distributed to the secondary system. At the transmission antenna 4, 100% of power is distributed to the primary system, and 0% of power is distributed to the secondary system. The power distribution to the secondary system of the reception antenna 2 may be any power being greater than or equal to the power that ensure to find the communicable satellite. The secondary system power distribution of the reception antenna 2 may be set to a value different from 10%. The secondary system of the transmission antenna 4 does not need to operate in the search mode, and the power distribution thereof is set to 0%.

Figure 6:
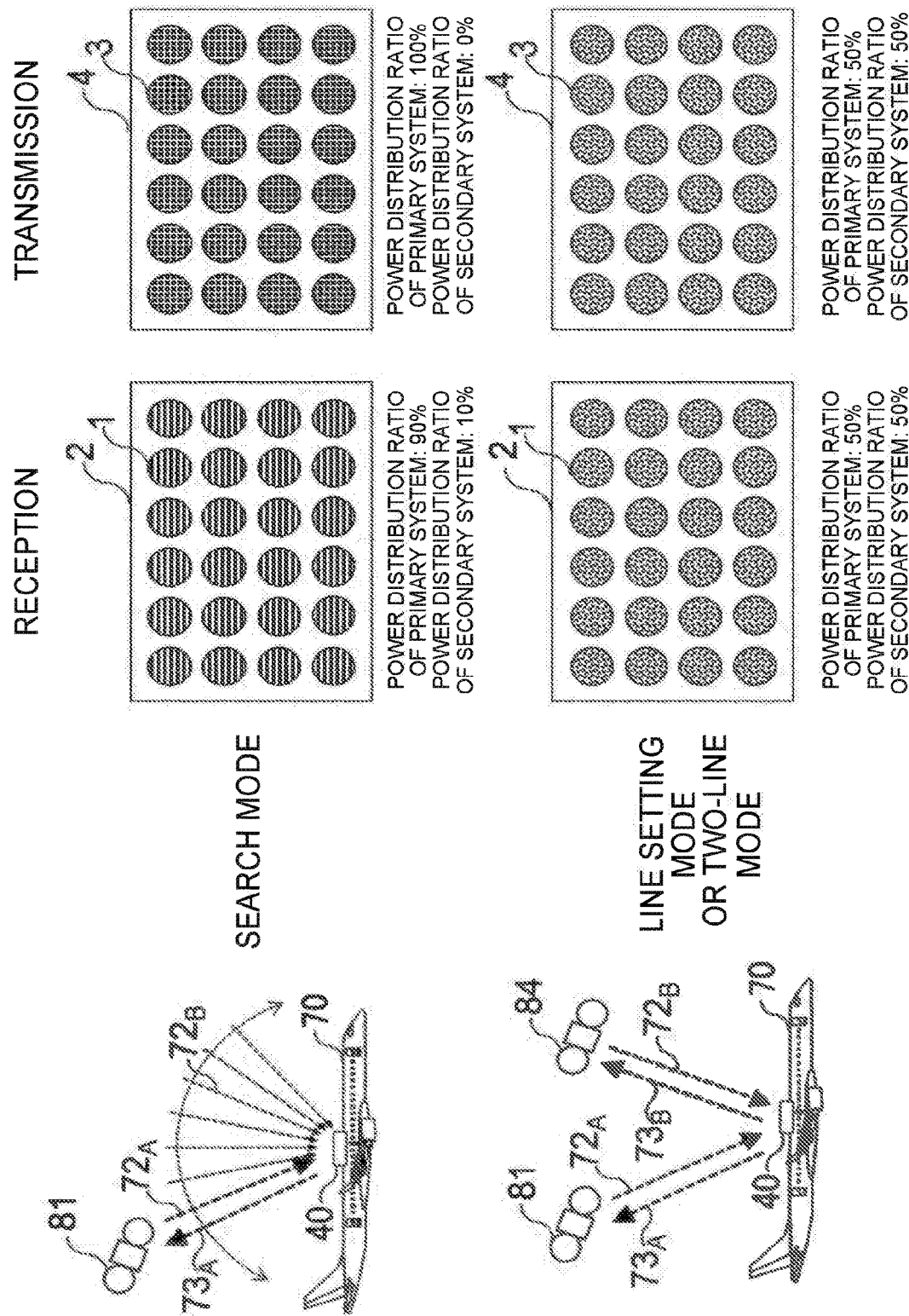
FIG. 6 is a drawing illustrating an example of use state of antennas in each operational mode of the communication device according to Embodiment 1.

Power distribution in the line setting mode and the two-line mode are illustrated in the lower part of FIG. 6. In the line setting mode and the two-line mode, at the reception antenna 2, 50% of power is distributed to the primary system and to the secondary system. Also at the transmission antenna 4, 50% of power is distributed to the primary system and to the secondary system. The power distributions to the primary system and the secondary system are not necessarily equal (50% and 50%). The distribution ratio of power between the reception antenna 2 and the transmission antenna 4, may be different values for the primary system and for the secondary system. In the line setting mode and the two-line mode, the distribution of powers to the primary system and the secondary system may be freely selected as long as the power distributed to the secondary system is secured to be able to continue communication with the secondary satellite, and as long as the power distributed to the primary system is greater than or equal to the power distributed to the secondary system.

Data stored in the storage 35 is described. The storage 35 stores the operational mode 53, a primary system 54, in-communication satellites $55_A$, $55_B$, reception line frequencies $56_A$, $56_B$, transmission line frequencies $57_A$, $57_B$, reception frequencies $58_A$, $58_B$, transmission frequencies $59_A$, $59_B$, the fuselage attitude data 52, orientation directions $60_A$, $60_B$, reception signal strengths $51_A$, $51_B$, and a search pattern 61.

The operational mode 53 is data to record the operational mode indicating the operational state of the communication device 40, such as the search mode and the two-line mode. The primary system 54 is data to record whether the primary system is the system A or the system B. The mode manager 34 determines the operational mode and the primary system and stores them at the operational mode 53 and the primary system 54.

When the line manager 23 sets a new communication line, data relating to the set communication line is stored at the in-communication satellite $55_A$ or $55_B$, the reception line frequency $56_A$ or $56_B$, and the transmission line frequency $57_A$ or $57_B$. Information to identify which satellite is communicating by the system A and which satellite is communicating by the system B is stored at the in-communication satellites $55_A$, $55_B$. When the system A or the system B is not communicating with a satellite, data that indicates that communicating satellite does not exist is stored at the in-communication satellite $55_A$ or $55_B$.

The reception frequencies of the communication line allocated to be used by the system A or the system B are stored at the reception line frequencies $56_A$, $56_B$. The transmission frequencies of the communication line allocated to be used by the system A or the system B are stored at the transmission line frequency $57_A$, $57_B$. When a communication line is not allocated for the system A, data (not-allocated value) indicating that the communication line is not allocated is stored at the reception line frequency $56_A$ and the transmission line frequency $57_A$. When a communication line is not allocated for the system B, the not-allocated value is stored at the reception line frequency $56_B$ and the transmission line frequency $57_B$.

The frequency of the signal received by the reception antenna 2 using the system A is stored at the reception frequency $58_A$ while the frequency of the signal transmitted by the transmission antenna 4 using the system A is stored at the transmission frequency $59_A$. The frequency of the signal received by the reception antenna 2 using the system B is stored at the reception frequency $58_B$ while the frequency of the signal transmitted by the transmission antenna 4 using the system B is stored at the transmission frequency $59_B$. For example, in the case in which the system A is used for communication in the search mode, the reception line frequency $56_A$ is stored at the reception frequency $58_A$, and the transmission line frequency $57_A$ is stored at the transmission frequency $59_A$. The beacon frequency is stored at the reception frequency $58_B$. Data (not-used value) indicating not used is stored at the transmission frequency $59_B$.

The orientation direction $60_A$ is the orientation direction used by the system A for the reception antenna 2 and the transmission antenna 4. The orientation direction $60_B$ is the orientation direction used by the system B. The orientation direction $60_A$ is set by the tracking controller $26_A$ and the search controller $27_A$. The orientation direction $60_B$ is set by the tracking controller $26_B$ and the search controller $27_B$.

The reception module controller $28_A$ controls the reception module $15_A$ such that the orientation direction of the system A of the reception antenna 2 coincides with the orientation direction $60_A$. The transmission module controller $29_A$ controls the transmission module $18_A$ such that the orientation direction of the system A of the transmission antenna 4 coincides with the orientation direction $60_A$. The reception module controller $28_B$ controls the reception module $15_B$ such that the orientation direction of the system B of the reception antenna 2 coincides with the orientation direction $60_B$. The transmission module controller $29_B$ controls the transmission module $18_B$ such that the orientation direction of the system B of the transmission antenna 4 coincides with the orientation direction $60_B$.

The element reception signal processor 5 including the plurality of reception modules $15_A$, $15_B$ processes the plurality of element reception signals and outputs a reception signal having the primary reception frequency and coming from the primary reception direction that is changeable electronically. Further, the element reception signal processor 5 processes the plurality of element reception signals and outputs the reception signal having the secondary reception frequency coming from the secondary reception direction that is changeable electronically and independently of the primary reception direction.

The element reception signal processor 5 may process the plurality of element reception signals whose frequency is converted to an intermediate frequency that is a frequency lower than the frequency of radio waves. The reception signal may be digitized and phase of the digitized reception signal may be changed.

The transmission signal having the primary transmission frequency and the transmission signal having the secondary transmission frequency are inputted to the element transmission signal generator 6 including the plurality of transmission modules $18_A$, $18_B$. The element transmission signal generator 6 generates the plurality of element transmission signals to be inputted to the plurality of element transmission antennas such that the transmission antenna transmits radio waves of the primary transmission frequency toward the primary transmission direction that is changeable electronically, and transmits radio waves of the secondary transmission frequency toward the secondary transmission direction that is changeable electronically and independently of the primary transmission direction.

Reception signal strengths are measured by the signal strength measurers $7_A$, $7_B$ and are stored at the reception signal strengths $51_A$, $51_B$. The communicable satellite detector 32 determines whether the communicable satellite is found by referring to the primary system 54 and the reception signal strengths $51_A$, $51_B$. The two-line communication determiner 33 refers to the reception signal strengths $51_A$, $51_B$ and determines whether the two-line mode is to be continued.

The signal strength measurer 7 of the primary system is a primary signal strength measurer for measuring a primary signal strength that is a strength of the reception signal having the primary reception frequency outputted by the element reception signal processor 5. The signal strength measurer 7 of the secondary system is a secondary signal strength measurer for measuring a secondary signal strength that is a strength of the reception signal having the secondary reception frequency outputted by the element reception signal processor 5.

A pattern for changing the orientation direction of the secondary system in the search mode is stored at the search pattern 61. The search controller 27 of the secondary system refers to the search pattern 61 and searches through the search range by using the pattern indicated by the search pattern 61. Because the search pattern 61 is recorded as data, the search pattern is easily revised.

What sort of data is referred to and what sort of operations is performed are described for each processing component. The line manager 23 requests the line management station to allocate the communication line for communication with the communication counterpart 71, and performs processing that causes the communication device 40 to start communication with the communication counterpart 71 by the allocated communication line. The data relating to the allocated communication line are stored at the in-communication satellite 55, the reception line frequency 56, and the transmission line frequency 57 of the system to which the communication line is allocated. In order to communicate with the line management station, a signal demodulated by one of the modems 8 is inputted to the line manager 23. A signal outputted by the line manager 23 is inputted to one of the modems 8. The line manager 23 uses one of the modems 8 depending on the operational mode 53 and the primary system 54. The line manager 23 uses the modem 8 of the primary system in the start-up line setting mode, and uses the modem 8 of the secondary system in the line setting mode.

In the start-up line setting mode, in the case in which the primary system 54 is the system A, the line manager 23 stores the data of the allocated primary communication line at the in-communication satellite $55_A$, the reception line frequency $56_A$, and the transmission line frequency $57_A$. In the case in which the primary system 54 is the system B, such data is stored at the in-communication satellite $55_B$, the reception line frequency $56_B$, and the transmission line frequency $57_B$.

In the line setting mode, in the case in which the primary system 54 is the system A, the line manager 23 stores the data of the allocated secondary communication line at the in-communication satellite $55_B$, the reception line frequency $56_B$, and the transmission line frequency $57_B$. In the case in which the primary system 54 is the system B, the line manager 23 stores the data of the allocated secondary communication line at the in-communication satellite $55_A$, the reception line frequency $56_A$, and the transmission line frequency $57_A$.

After the line manager 23 stores the data concerning the communication line, the frequency controller 24 stores, at the reception frequency 58 and the transmission frequency 59, the reception line frequency 56 and the transmission line frequency 57 stored by the line manager 23. Accordingly, the reception antenna 2 can receive, and the transmission antenna 4 can transmit, radio waves of the frequency of the allocated communication line. And the modem 8 of the system allocated with the communication line is notified of the setting of the reception frequency 58 and the transmission frequency 59.

In the case in which the line manager 23 stores at the reception line frequency $56_A$ and the transmission line frequency $57_A$, the frequency controller 24 refers to the reception line frequency $56_A$ and the transmission line frequency $57_A$ and stores at the reception frequency $58_A$ and the transmission frequency $59_A$. And the modem $8_A$ is notified of the setting of the reception frequency $58_A$ and the transmission frequency $59_A$.

In the case in which the line manager 23 stores at the reception line frequency $56_B$ and the transmission line frequency $57_B$, the frequency controller 24 refers to the reception line frequency $56_B$ and the transmission line frequency $57_B$ and stores at the reception frequency $58_B$ and the transmission frequency $59_B$. And the modem $8_B$ is notified of the setting of the reception frequency $58_B$ and the transmission frequency $59_B$.

As preprocessing to change to the start-up search mode or the search mode, the frequency controller 24 stores the beacon frequency at the reception frequency 58 of the system used for the search, and stores the not-used value at the transmission frequency 59 of the system used for the search. When the primary system 54 is the system A, the frequency controller 24 stores the beacon frequency at the reception frequency $58_B$, and stores the not-used value at the transmission frequency $59_B$. When the primary system 54 is the system B, the frequency controller 24 stores the beacon frequency at the reception frequency $58_A$, and stores the not-used value at the transmission frequency $59_A$.

As preprocessing to change to the line setting mode, the frequency controller 24 sets the reception frequency and the transmission frequency to be used in the line allocation control at the reception frequency 58 and the transmission frequency 59 of the secondary system. In the case of changing to the start-up line setting mode, the reception frequency and the transmission frequency to be used in the line allocation control are stored at the reception frequency 58 and the transmission frequency 59 of the primary system.

Depending on the operational mode 53, the communication controller 25 controls the modems $8_A$, $8_B$, the reception switching circuit 9, and the transmission switching circuit 10. In the case in which the operational mode 53 is the start-up line setting mode, the transmitted and received data is modulated and demodulated by the modem 8 of the primary system indicated by the primary system 54, and the transmitted and received data for modulation and demodulation by the modem 8 of the primary system (the one modem 8) is inputted to and outputted from the line manager 23. The reception switching circuit 9 and the transmission switching circuit 10 cause the modem 8 of the primary system not to be inputted and not to output transmission-reception data with the main device 44. The modem 8 of the secondary system (the other modem 8) does not perform modulation and demodulation. When the primary system 54 is the system A, the modem $8_A$ operates, and the transmission-reception data modulated-demodulated by the modem $8_A$ is inputted to and outputted from the line manager 23. When the primary system 54 is the system B, the modem $8_B$ operates, and the transmission-reception data modulated-demodulated by the modem $8_B$ is inputted to and outputted from the line manager 23.

In the search mode, the communication controller 25 causes the modem 8 of the primary system to operate. And the reception switching circuit 9 and the transmission switching circuit 10 cause the transmission-reception data modulated-demodulated by the modem 8 of the primary system to be inputted to and outputted from the main device 44. When the primary system 54 is the system A, the transmission-reception data modulated-demodulated by the modem $8_A$ is inputted to and outputted from the main device 44. When the primary system 54 is the system B, the transmission-reception data modulated-demodulated by the modem $8_B$ is inputted to and outputted from the main device 44.

In the line setting mode, the communication controller 25 keeps the modem 8 of the primary system to operate so that the transmission-reception data are inputted to and outputted from the main device 44. Further, the communication controller 25 causes the modem 8 of the secondary system to operate so that the transmission-reception data are inputted to and outputted from the line manager 23. When the primary system 54 is the system A, the modem $8_B$ operates so that the transmission-reception data are inputted to and outputted from the line manager 23. When the primary system 54 is the system B, the modem $8_A$ operates so that the transmission-reception data are inputted to and outputted from the line manager 23. The line manager 23 may be always connected to the modems $8_A$, $8_B$, and the line manager 23, by referring to the operational mode 53 and the primary system 54, may determine which is the transmission-reception data to be used among two systems of the transmission-reception data each inputted from, and outputted to, either the modem $8_A$ or $8_B$.

In the two-line mode, the communication controller 25 maintains the operation of both of the modems $8_A$, $8_B$, and the reception switching circuit 9 is switched to input the transmission data from the main device 44 to both of the modems $8_A$, $8_B$. Moreover, the transmission switching circuit 10 is switched such that the modem 8 of the primary system outputs the reception data to the main device 44. When the primary system 54 is the system A, the modem $8_A$ outputs the reception data to the main device 44. When the primary system 54 is the system B, the modem $8_B$ outputs the reception data to the main device 44.

In each operational mode, the operation of controlling the modems $8_A$, $8_B$, considering the relationship between the satellite and the communication device 40, performed by the communication controller 25 is as described below. In the start-up line setting mode, the communication controller 25 causes the one modem 8, which is that of the primary system, to modulate and to demodulate the signal transmitted to or received from the primary satellite using the primary communication line. The other modem 8, which is that of the secondary system, is caused neither to modulate nor to demodulate. In the search mode, the signal transmitted to and received from the primary satellite using the primary communication line is modulated and demodulated using the modem 8 of the primary system, and the modem 8 of the secondary system is caused to demodulate the signal having the beacon frequency. In the line setting mode and the two-line mode, the communication controller 25 causes the modem 8 of the primary system to modulate and to demodulate the signal transmitted to and received from the primary satellite using the primary communication line, and causes the modem 8 of the secondary system to modulate and to demodulate the signal transmitted to and received from the secondary satellite using the secondary communication line.

Operation of the tracking controllers $26_A$, $26_B$ in each operational mode is described. When the operational mode 53 is the two-line mode or the line setting mode, both of the tracking controllers $26_A$, $26_B$ operate. The tracking controller $26_A$ determines the orientation direction at a next time point based on the orientation direction $60_A$, the fuselage attitude data 52, and the orientation direction error, which are stored before update, and stores the determined orientation direction at the orientation direction $60_A$. The tracking controller $26_B$ determines the orientation direction at a next time point based on the orientation direction $60_B$, the fuselage attitude data 52, and the orientation direction error, which are stored before update, and stores the determined orientation direction at the orientation direction $60_B$. The orientation direction error is acquired by some means by the communication device 40 or is inputted from the outside.

When the operational mode 53 is the search mode or the start-up line setting mode, the tracking controller 26 of the primary system operates. When the primary system 54 is the system A, the tracking controller $26_A$ operates. When the primary system 54 is the system B, the tracking controller 268 operates. When the operational mode 53 is the start-up search mode, neither of the tracking controller $26_A$, $26_B$ operates.

Among the search controllers $27_A$, $27_B$, the search controller 27 of the primary system operates in the start-up search mode and the search controller 27 of the secondary system operates in the search mode. In the start-up search mode, when the primary system 54 is the system A, the search controller $27_A$ operates. When the primary system 54 is the system B, the search controller $27_B$ operates. In the search mode, when the primary system 54 is the system A, the search controller $27_B$ operates. When the primary system 54 is the system B, the search controller $27_A$ operates.

The search controller $27_A$, when operates, refers to the search pattern 61, and stores values that are changed according to a pattern that is changed with time indicated by the search pattern 61 at the orientation direction $60_A$. The search controller $27_B$, when operates, refers to the search pattern 61, and stores the values that are changed according to the pattern that is changed with time at the orientation direction $60_B$.

When communicable satellite is found at the time point of end of the start-up search mode or the search mode, the direction in which the communicable satellite exists is stored at the orientation direction 60 of the system used in the search. When no communicable satellite is found, data indicating that there exists no direction to be oriented is stored at the orientation direction 60 of the system used in the search.

The reception power distributor 30 refers to the operational mode 53 and the primary system 54, and determines the distribution ratio between the reception power of the system A and that of the system B as explained above with reference to FIG. 6. The reception module controllers $28_A$, $28_B$ are notified of the determined distribution ratio of the reception power. The reception module controllers $28_A$, $28_B$ may determine the distribution ratio of the reception power by referring to the operational mode 53 and the primary system 54. In such a case, the reception module controllers $28_A$, $28_B$ operate as the reception power distributor.

The transmission power distributor 31 determines the distribution ratio between transmission power of the system A and that of the system B by referring to the operational mode 53 and the primary system 54. The transmission module controllers $29_A$, $29_B$ are notified of the determined distribution ratio of the transmission power. The transmission module controllers $29_A$, $29_B$ may determine the distribution ratio of the transmission power by referring to the operational mode 53 and the primary system 54. In such a case, the transmission module controllers $29_A$, $29_B$ operate as the transmission power distributor.

The reception module controller $28_A$ determines sets of the phase shift amount and the amplification factor instructing reception modules $15_A$ such that the reception antenna 2 of the system A is directed toward the orientation direction $60_A$, by referring to the orientation direction $60_A$, the reception frequency $58_A$, and the distribution ratio notified by the reception power distributor 30. The determined sets of phase shift amounts and amplification factors are sent as instructions to the reception modules $15_A$.

The reception module controller $28_B$ determines sets of the phase shift amount and the amplification factor instructing reception modules $15_B$ such that the reception antenna 2 of the system B is directed toward the orientation direction $60_B$, by referring to the orientation direction $60_B$, the reception frequency $58_B$, and the distribution ratio notified by the reception power distributor 30. The determined sets of phase shift amounts and amplification factors are sent as instructions to the reception modules $15_B$.

The transmission module controller $29_A$ determines sets of the phase shift amount and the amplification factor instructing transmission modules $18_A$ such that the transmission antenna 4 of the system A is directed toward the orientation direction $60_A$, by referring to the orientation direction $60_A$, the transmission frequency $59_A$, and the distribution ratio of the transmission power notified by the transmission power distributor 31. The determined sets of phase shift amounts and amplification factors are sent as instructions to the transmission modules $18_A$.

The transmission module controller $29_B$ determines sets of the phase shift amount and the amplification factor instructing transmission modules $18_B$ such that the transmission antenna 4 of the system B is directed toward the orientation direction $60_B$, by referring to the orientation direction $60_B$, the transmission frequency $59_B$, and the distribution ratio of the transmission power notified by the transmission power distributor 31. The determined sets of phase shift amounts and amplification factors are sent as instructions to the transmission modules $18_B$.

The communicable satellite detector 32 operates when the operational mode 53 is the start-up search mode or the search mode. In the start-up search mode, the communicable satellite detector 32 uses the orientation direction 60 of the primary system and the reception signal strength 51 of the primary system when oriented in the direction indicated by the orientation direction 60. In the search mode, the orientation direction 60 of the secondary system and the reception signal strength 51 of the secondary system when oriented in the direction indicated by the orientation direction 60. In the start-up search mode, the orientation direction $60_A$ and the reception signal strength $51_A$ are used when the primary system 54 is the system A, and the orientation direction $60_B$ and the reception signal strength $51_B$ are used when the primary system 54 is the system B. In the search mode, the orientation direction $60_B$ and the reception signal strength $51_B$ are used when the primary system 54 is the system A, and the orientation direction $60_A$ and the reception signal strength $51_A$ are used when the primary system 54 is the system B.

In the start-up search mode, the communicable satellite detector 32 finds the communicable satellite based on the reception signal strength of the beacon signal received by the primary system. When a direction in which beacon signal having the reception signal strength greater than or equal to the reception signal strength lower limit value is detected, the communicable satellite is found. When beacon signal having the reception signal strength greater than or equal to the reception signal strength lower limit value is not detected from any direction, communicable satellite is not found. In the search mode, the communicable satellite is found based on the reception signal strength of the beacon signal received by the secondary system. When a direction in which beacon signal having the reception signal strength greater than or equal to the reception signal strength lower limit value is detected outside the vicinity of the orientation direction of the primary system, the communicable satellite is found. When the beacon signal having the reception signal strength greater than or equal to the reception signal strength lower limit value is not detected outside the vicinity of the orientation direction of the primary system, the communicable satellite is not found The reception signal strength lower limit value is determined depending on a magnitude of the reception power and the communicable lower limit value that is a strength of radio waves that can be received. In the case in which the total of the reception powers of the system A and the system B is fixed, the magnitude of the reception power is determined according to the distribution ratio of the reception power between the system A and the system B. Because the distribution ratios of the reception power are determined to be different between the start-up search mode and the search mode, the used reception signal strength lower limit values differ between the start-up search mode and the search mode.

When the magnitude of the reception power differ between the primary system and the secondary system, the reception signal strength lower limit values differ between the primary system and the secondary system. The reception signal strength lower limit value compared with the reception signal strength of the primary system is termed the "primary reception signal strength lower limit value". The reception signal strength lower limit value compared with the reception signal strength of the secondary system is termed the "secondary reception signal strength lower limit value".

When the communicable satellite is found, the communicable satellite detector 32 also detects the direction in which the reception signal strength of the beacon signal coming from the communicable satellite is maximum.

The two-line communication determiner 33 operates when the operational mode 53 is the two-line mode. The two-line communication determiner 33 monitors the reception signal strengths $51_A$, $51_B$ to determine whether the two-line mode is to be continued. The method for determining whether the two-line mode is to be continued, is described later.

The mode manager 34 determines the operational mode 53 based on various types of input data. The input data are a command for starting communication or a communication finish command inputted by a user of the communication device 40, a notification of operation completion from the line manager 23, a detection result of the communicable satellite detector 32, a determination result of the two-line communication determiner 33, a notification of abnormality occurrence from equipment such as the modems $8_A$, $8_B$, or the like.

When the command for starting communication is inputted, the mode manager 34 changes the operational mode 53 from the stopped mode to the start-up line search mode. When the communicable satellite is found while the operational mode 53 is the start-up search mode, the operational mode 53 is changed to the start-up line setting mode. When the communicable satellite is not found, the operational mode 53 remains unchanged as the start-up search mode. When the notification of operation completion from the line manager 23 is received while the operational mode 53 is the start-up line setting mode, the operational mode 53 is changed to the search mode. When the operational mode 53 is the start-up line setting mode and the reception signal strength of the primary system is detected to be less than the lower limit value that is used to determine to be communicable, the operational mode 53 is changed to the start-up search mode. When the reception signal strength of the secondary system is detected to be less than the lower limit value, the operational mode 53 is changed to the search mode.

When the operational mode 53 is the search mode and the communicable satellite is found, the mode manager 34 changes the operational mode 53 to the line setting mode. When the communicable satellite is not found in the search mode, the operational mode 53 remains unchanged as the search mode. When the operational mode 53 is the search mode and the reception signal strength of the primary system is detected to be less than the lower limit value, the operational mode 53 is changed to the start-up search mode.

When the operational mode 53 is the two-line mode and the two-line communication determiner 33 determines that the two-line mode is not to be continued, the operational mode 53 is changed to the search mode. When the two-line mode is determined to be continued, the operational mode 53 remains unchanged as the two-line mode. When the operational mode 53 is the two-line mode and the reception signal strengths of the primary system and the secondary system are detected to be less than the lower limit value, the operational mode 53 is changed to the start-up search mode.

When the user inputs a communication finish command, the mode manager 34 executes the procedure of finishing the communication depending on the operational mode 53, and thereafter, changes the operational mode 53 to the stopped mode.

When a monitoring function of the communication device 40 detects some sort of abnormality such that communication cannot be continued, after executing processing for changing to the stopped state, the mode manager 34 changes the operational mode 53 to the stopped mode.

The fuselage attitude acquirer 36 stores in the storage 35, at the fuselage attitude data 52, the attitude angle of the airplane 70 inputted from the inertial navigation device 45 at a determined cycle.

Figure 7:
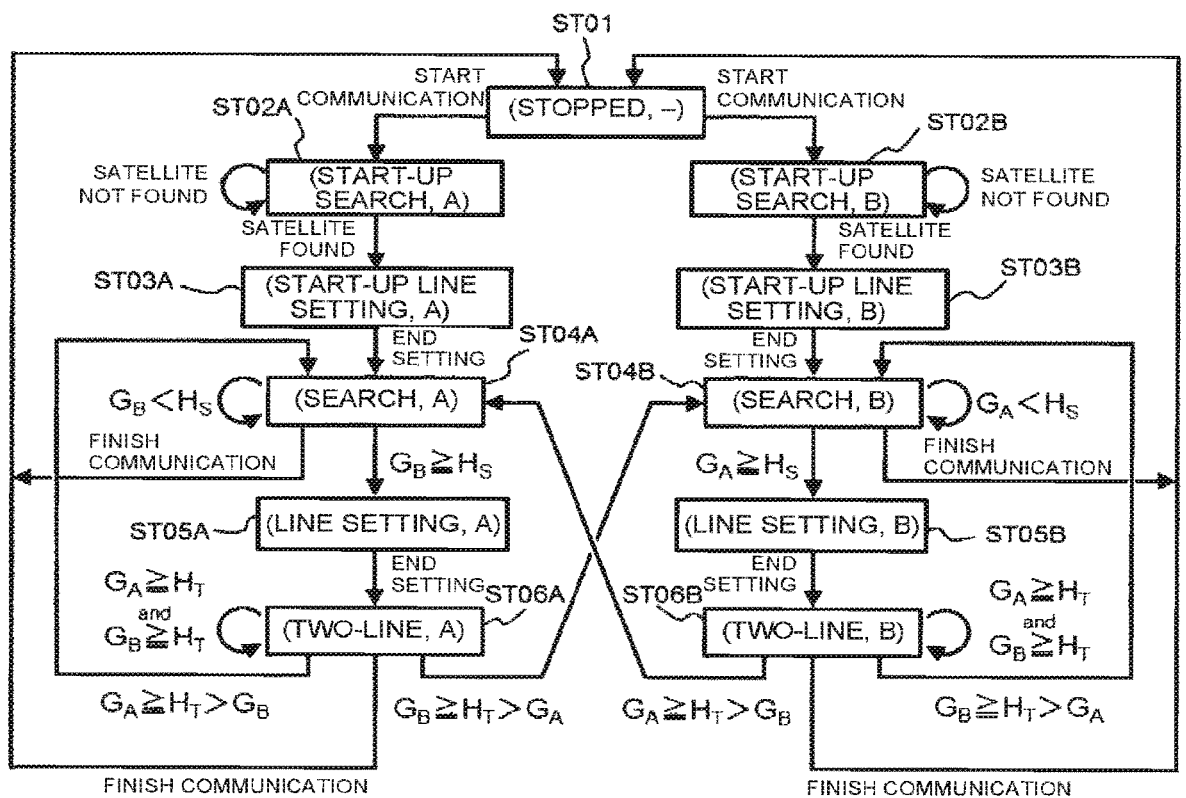
FIG. 7 is a state transition diagram illustrating a change in the state of the communication device according to Embodiment 1.

A state transition diagram indicating states of the communication device 40 is expressed as FIG. 7, in which operational mode 53 and whether the primary system 54 is the system A or the system B is distinguished. FIG. 7 is a state transition diagram illustrating changes of state of the communication device according to Embodiment 1. Each state is expressed as "(operational mode, primary system)".

The variables are defined for expressing the conditions for changing the state of the communication device 40 as shown below.

$G_A$: The reception signal strength $51_A$ of the system A.
$G_B$: The reception signal strength $51_B$ of the system B.
$G_{ma\ n}$: The reception signal strength of the primary system.
$G_{sub}$: The reception signal strength of the secondary system.
$\beta_s$: The power distribution ratio of the secondary system in the search mode. In Embodiment 1, $\beta_s$=10%.
$\beta_T$: The power distribution ratio of each system in the two-line mode. In Embodiment 1, $\beta_T$=50%.
$H_S$: The lower limit value (reception signal strength lower limit value) of the reception signal strength for detecting the communicable satellite in the search mode.
$H_T$: The lower limit value (reception signal strength lower limit value) of the reception signal strength for determining that the satellite is not the communicable satellite in the two-line mode. The satellite is communicable when the reception signal strength is greater than or equal to $H_T$.

$T_s$: The period required for executing a single cycle of the search mode.
$T_T$: A cycle time for determining whether the satellite is the communicable satellite while communicating in the two-line mode.

The reception signal strength is almost proportional to the reception power distributed to the reception modules $15_A$, $15_B$, and these variables have the relationship, as shown below.

$$H_S=(\beta_S/\beta_T)\times H_T \qquad (1)$$

In the case in which $H_S$ is determined so as to satisfy Equation (1), the secondary communication line is communicable in the two-line mode changed from the search mode. Further, the relationship may be expressed by a relationship equation other than an equation of direct proportionality between the reception signal strength and the reception power. In such a case, the reception signal strength lower limit value in the search mode and the reception signal strength lower limit value in the two-line mode are determined according to the equation expressing the relationship between the reception signal strength and the reception power.

In FIG. 7, operations during a normal handover are considered, and operations under abnormal conditions are not considered. FIG. 7 is a state transition diagram based on the assumptions shown below.

(a) In the start-up line setting mode, the reception signal strength is not lowered such that communication cannot be performed using the primary communication line.

(b) In the line setting mode, the reception signal strength is not lowered such that communication cannot be performed using both of the primary communication line and the secondary communication line.

(c) In the search mode, the reception signal strength is not lowered such that communication cannot be performed using the primary communication line.

The two-line communication determiner 33 maintains the two-line mode while the primary communication line and the secondary communication line is communicable. Determinations are made as follows.

$G_A \geq H_T$ and $G_B \geq H_T$ Maintain two-line communication.
$G_A \geq H_T > G_A$ Unable to maintain two-line communication.
$G_B \geq H_T > G_B$ Unable to maintain two-line communication.

When not communicating, the communication device 40 is in a state ST01 that is "(stopped, -)". When communication with the communication counterpart 71 starts in the case in which the primary system 54 is the system A, the state of the communication device 40 is changed to a state ST02A that is "(start-up search, system A)". When the primary system 54 is the system B, the state is changed to a state ST02B that is "(start-up search, system B)". The primary system in the start-up search mode, for example, may be always determined to be either the system A or the system B, or may be determined to be the system A and the system B alternately.

When the communicable satellite is not found while being the state ST02A that is "(start-up search, system A)", the state ST02A is continued. When the communicable satellite is found while being the state ST02A that is "(start-up search, system A)", the state is changed to a state ST03A that is "(start-up line setting, system A)". When setting of the primary communication line is completed, the state is changed to a state ST04A that is "(search, system A)". Similarly, the state is changed from a state ST02B that is "(start-up search, system B)" to a state ST03B that is "(start-up line setting, system B)", and further is changed to a state ST04B that is "(search, system B)".

When Ts elapses while being the state ST04A that is "(search, system A)" without detecting that $G_B \geq H_S$, the communicable satellite is not found, and the state ST04A is continued. When Ts elapses and $G_B \geq H_S$ is detected, the communicable satellite is found, and the state is changed to a state ST05A that is "(line setting, system A)". When setting of the communication line is completed while being the ST05A that is "(line setting, system A)", the state is changed to a state ST06A that is "(two-line, system A).

When Ts elapses while being the state ST04B that is "(search, system B)" without detecting that $G_B \geq H_S$, the communicable satellite is not found, and the state ST04B is continued. When Ts elapses and $G_B \geq H_S$ is detected, the communicable satellite is found, and the state is changed to the state ST05B that is "(line setting, system B)". When setting of the communication line is completed while being the state ST05B that is "(line setting, system B)", the state is changed to a state ST06B that is "(two-line, system B).

While being the state ST06A that is "(two-line, system A)", in the case in which $T_T$ elapses and $G_A \geq H_T$ and $G_B \geq H_T$ are detected, the primary communication line and the secondary communication line are communicable, and the state ST06A is continued. In the case in which $T_T$ elapses and $G_A \geq H_T > G_B$ is detected, a handover from the primary satellite to the secondary satellite becomes impossible, and the state is changed to the state ST04A that is "(search, system A)". In the case in which $T_T$ elapses and $G_B \geq H_T > G_A$ is detected, the handover is performed, and the state is changed to the state ST04B that is "(search, system B)".

While being the state ST06B that is "(two-line, system B)", in the case in which $T_T$ elapses and $G_A \geq H_T$, and $G_B \geq H_T$ are detected, the primary communication line and the secondary communication line are communicable, and the state ST06B is continued. In the case in which $T_T$ elapses and $G_B \geq H_T > G_A$ is detected, a handover becomes impossible, and the state is changed to the state ST04B that is "(search, system B)". In the case in which $T_T$ elapses and $G_A \geq H_T > G_B$ is detected, the handover is performed, and the state is changed to the state ST04A that is "(search, system A)".

When the communication finish command is inputted in any one of the states that are the state ST04A that is "(search, system A)", the state ST04B that is "(search system B)", the state ST06A that is "(two-line, system A)", and the state ST06B that is "(two-line, system B)", the state is changed to the state ST01 that is "(stopped, -)".

Figure 8:
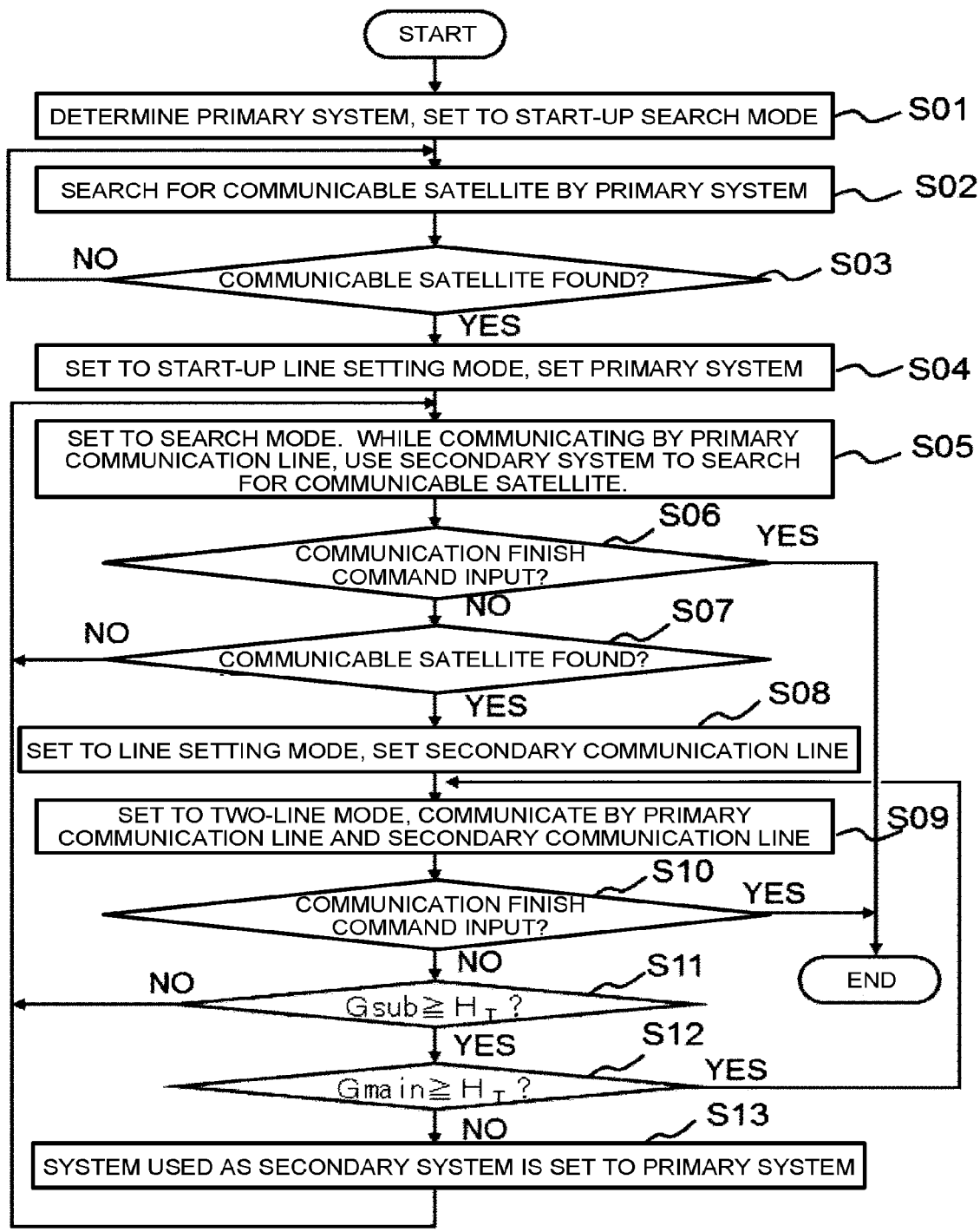
FIG. 8 is a flowchart illustrating operation of the communication device according to Embodiment 1.

Operations are described. FIG. 8 is a flowchart illustrating operation of the communication device according to Embodiment 1. In step S01, the primary system is determined to be the system A or the system B, the determined system is set as the primary system 54, and the operational mode 53 is set to the start-up search mode. In step S02, the primary system is used to search for the communicable satellite. When a single cycle of searching is completed, in step S03 it is checked as to whether the communicable satellite is found. When the communicable satellite is not found (NO in step S03), processing returns to step S02.

When the communicable satellite is found in the start-up search mode (YES in step S03), in step S04, the operational mode 53 is changed to the start-up line setting mode, and the primary communication line is set. In step S05, the operational mode 53 is set to the search mode, and the secondary communication line is used to search for the communicable satellite while communication is performed using the primary communication line. When a single cycle of searching is completed, it is checked in step S06 as to whether the communication finish command is inputted. When the communication finish command is inputted (YES in step S06), communication ends. In the case in which the communication finish command is not inputted (NO in step S06), it is checked in step S07 as to whether the communicable satellite is found. In the case in which the communicable satellite is not found (NO in step S07), processing returns to step S05, and the search mode is continued.

In the case in which the communicable satellite is found in the search mode (YES in step S07), in step S08, the operational mode 53 is changed to the line setting mode, and the secondary communication line is set. When setting of the secondary communication line is completed, in step S09, the operational mode 53 is set to the two-line mode, and communication is performed using both of the primary communication line and the secondary communication line. In step S10, it is checked as to whether the communication finish command is inputted. In the case in which the communication finish command is inputted (YES in step S10), communication is discontinued.

In the case in which the communication finish command is not inputted (NO in step S10), in step S11, it is checked as to whether the signal strength ($G_{Sub}$) of the secondary communication line is greater than or equal to the lower limit value ($H_T$). In the case in which $G_{sub} \geq H_T$ is detected, the secondary communication line is communicable. In the case in which $G_{sub} \geq H_T$ is not detected (NO in step S11), communication by two lines becomes impossible, and the two-line mode is ended. Processing returns to step S05, and operation is performed in the search mode.

In the case in which $G_{sub} \geq H_T$ (YES in step S11) is detected, in step S12, it is checked as to whether the signal strength ($G_{main}$) of the primary communication line is greater than or equal to the lower limit value ($H_T$). In the case in which $G_{main} \geq H_T$ is detected, the primary communication line is communicable. In the case in which $G_{main} \geq H_T$ is not detected (NO in step S12), communication using the primary communication line is impossible, and a handover is performed from the primary satellite to the secondary satellite. In step S13, the system that is being used as the secondary system is set to the primary system 54. Processing returns to step S05, and the state is changed to the search mode. In the case in which the primary communication line is communicable (YES in step S12), processing returns to step S09, and the two-line mode is continued.

Steps S05 and S07 are search procedures to search for the communicable satellite by the secondary system during tracking the primary satellite and communicating using the primary communication line. Step S09 is the two-line communication procedure that tracks the primary satellite to communicate using the primary communication line and tracks the secondary satellite to communicate using the secondary communication line. Steps S11 and S12 are two-line communication continuation check procedures that check whether execution of the two-line communication procedure is to be continued. The communication device 40 executes the two-line communication continuation check procedure and the two-line communication procedure in parallel. In the case in which the two-line communication continuation check procedure determines that the two-line communication procedure is not to be continued, processing is changed from the two-line communication procedure to the search procedure.

The two-line communication continuation check procedure performed in the communication method of Embodiment 1 has a primary signal strength measurement procedure, a secondary signal strength measurement procedure, and a two-line communicable check procedure. In the primary signal strength measurement procedure, the primary signal strength is measured. In the secondary signal strength measurement procedure, the secondary signal strength is measured. In the two-line communicable check procedure, it is checked as to whether the primary satellite is a communicable satellite based on the primary signal strength, and it is checked as to whether the secondary satellite is a communicable satellite based on the secondary signal strength. In the case in which during the two-line communicable check procedure, when it is detected that the primary satellite or the secondary satellite is not a communicable satellite, it is determined that the two-line communication procedure is not to be continued.

By operation as described above, during switching between satellites that are used for communication as illustrated in the example of FIG. 5, the switching is performed by taking the two-line mode that communicates being relayed by two satellites in parallel, and therefore the switching between satellites causes no period in which communication is disabled.

It can be applied to a satellite network that does not cover the entire earth surface and the air space over it, but rather has a communication target range that is a determined range of the earth's surface and the air space over it. When the communication target range is limited, the communication device according to the present disclosure can be used for such a satellite group that at least one communicable satellite can be viewed from each spatial point within the communication target range.

Although in the search mode the range is scanned 360° in azimuth angle and 0° to 90° in elevation angle, the range of the search may be determined depending on the targeted satellite network or satellite group. For example, in the case of targeting a quasi-zenith satellite that exists at a high elevation angle, only in a range in which the elevation angle is greater than or equal to 30°, for example, may be searched.

In the search mode, the vicinity of the orientation direction of the primary system is searched, but the communicable satellite is not found in the vicinity of the orientation direction of the primary system. A determined range that includes the orientation direction of the primary system may not be searched.

The two-line mode may be ended when the two-line communication is determined to be unnecessary, instead of continuing the two-line mode until communication becomes impossible for one among the two lines. The mobile body may be any type mobile body other than airplane. The above modifications are applicable also for other embodiments.

Embodiment 2

Embodiment 2 is a case in which Embodiment 1 is modified such that, when the two-line communication is possible but unnecessary, the two-line communication is discontinued. When the two-line communication is maintained until communication becomes impossible for the primary communication line or the secondary communication line, the start time point of using the communication line relayed by the satellite through which the reception signal strength is highest sometimes delay. In the case in which the two-line communication is discontinued at the time point when two-line communication becomes unnecessary, when a satellite that causes a high reception signal strength is found, the communication line relayed by the satellite causing the high reception signal strength can be used earlier.

Figure 9:
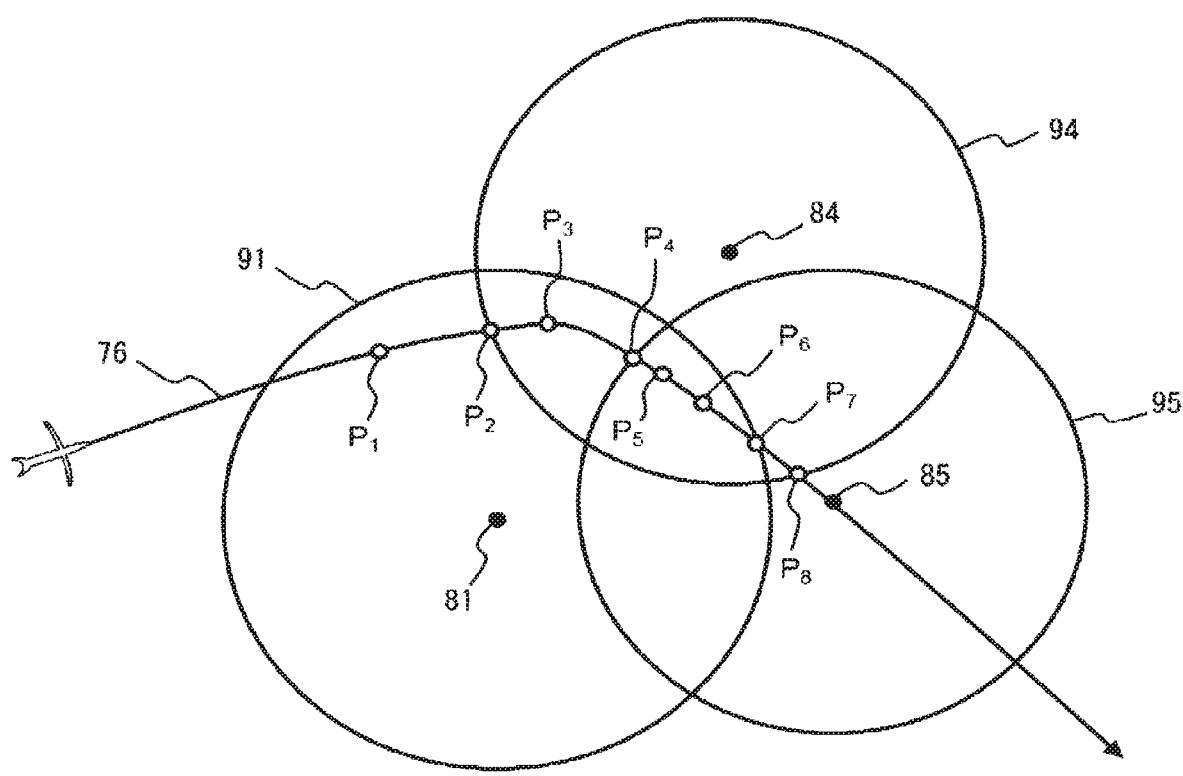
FIG. 9 is a drawing illustrating an example of a flight track in which the communication device according to Embodiment 1 cannot use a communication line of which reception signal strength is high.
Figure 10:
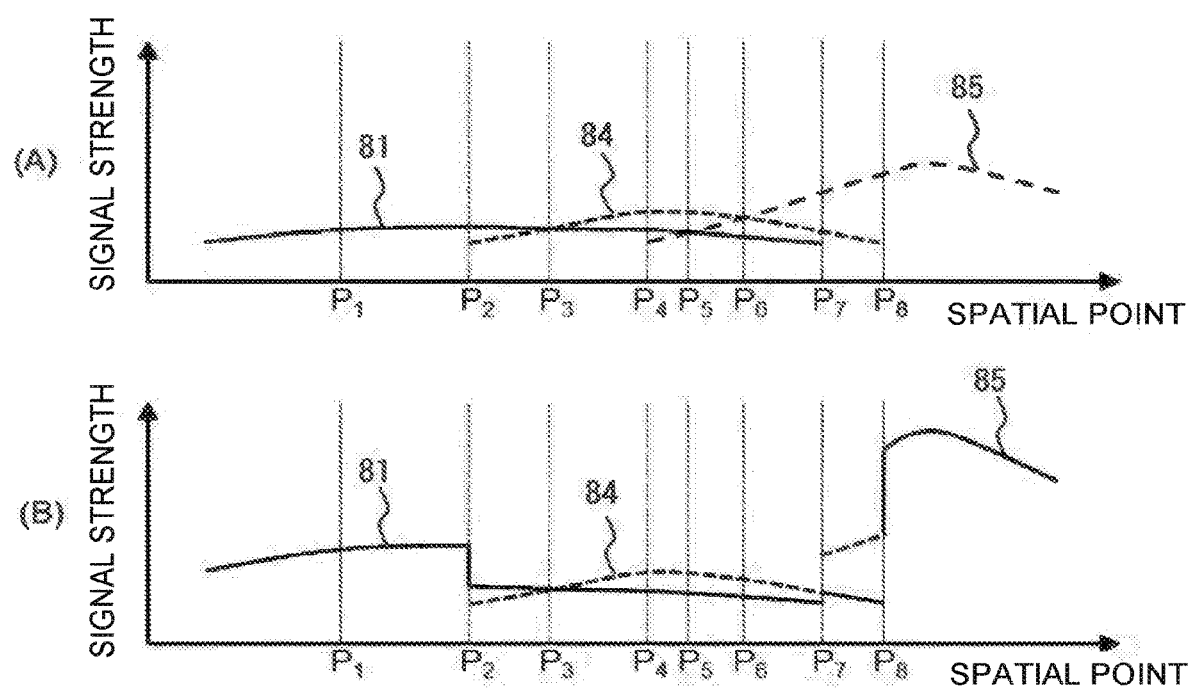
FIGS. 10A and 10B each is a drawing illustrating change in the reception signal strength of the communication device according to Embodiment 1 in the example of the flight track illustrated in FIG. 9.

Problems that are caused by continuing the two-line communication as long as the two-line communication can be maintained are described with reference to FIGS. 9 and 10. FIG. 9 illustrates an example of a flight track in which the communication device according to Embodiment 1 cannot use the communication line that has the high reception signal strength. The beam ranges 91, 94, and 95 of three satellites 81, 84, and 85 are each indicated by a circle. The airplane 70 moves along a flight track 76 indicated by the solid line in the drawing.

FIGS. 10A and 10B illustrate change in the reception signal strength of the communication device of Embodiment 1 in the example of the flight track illustrated in FIG. 9. FIGS. 10A and 10B illustrate the reception signal strength only in the time range when the reception signal strength is greater than or equal to $H_T$. FIG. 10A illustrates the strength of the radio waves from satellites capable of reception on the flight path. FIG. 10A expresses strength of radio waves that is the reception signal strength obtained by receiving radio waves by the communication device 40 in two-line mode from the satellites. FIG. 10B illustrates the reception signal strength received the communication device 40 mounted on the airplane 70. In FIG. 10B, reception signal strength while receiving using the primary communication line is indicated by the solid line, and reception signal strength while receiving using the secondary communication line is indicated by the dashed line.

It is described about spatial points at which there exist changings of the relationships of strengths of the reception signals generated by the communication device 40 receiving radio waves from satellites. At the spatial point $P_1$, the communication device 40 can communicate only with the satellite 81. At the spatial point $P_2$, the satellite 84 becomes communicable. At the spatial point $P_3$, the strengths of the radio waves of the satellite 81 and the satellite 84 have the same magnitude. At the spatial point $P_4$, the satellite 85 becomes communicable. The strength of radio waves from the satellite 85 increase. At the spatial point $P_5$, the strengths of radio waves of the satellite 85 and the satellite 81 have the same magnitude. Further, at the spatial point $P_6$, the strengths of radio waves of the satellite 85 and the satellite 84 have the same magnitude. At the spatial point $P_7$, communication with the satellite 81 becomes impossible. At the spatial point $P_8$, communication with the satellite 84 becomes impossible.

When the airplane 70 exists at the spatial point $P_1$, the communication device 40 tracks the satellite 81 using the primary communication line and operates in the search mode. When the airplane 70 moves to the spatial point $P_2$, communication with the satellite 84 becomes possible. At the spatial point $P_2$ at which the satellite 84 is found, the operational mode is changed to the line setting mode. Here, the period required for line setting is assumed to be short, and the communication line relayed by the satellite 84 is assumed to be capable of use as the secondary communication line from the spatial point $P_2$. The operational mode after the spatial point $P_2$ is indicated as the two-line mode.

The two-line mode is discontinued at the spatial point $P_7$ because communication with the satellite 81 becomes impossible at the spatial point $P_7$. The operational mode of the communication device 40 changes to the search mode that tracks the satellite 84 by the primary communication line. In the first cycle of the search mode, the satellite 85 is found as the communicable satellite. To facilitate understanding of the drawing, one cycle of the search mode is assumed to be short, and the two-line mode is indicated from the spatial point $P_7$. The communication with the satellite 84 can be performed until the spatial point $P_8$. The two-line mode is continued from the spatial point $P_7$ to the spatial point $P_8$. Upon passing the spatial point $P_8$, the search mode in which the communication line relayed by the satellite 85 becomes the primary communication line begins.

Operation of the communication device 40 as described above has a problem in that the communication line relayed by the satellite causing a high reception signal strength is not used. Since strength of radio waves from the satellite 84 becomes greater at the spatial point $P_3$, the handover to the satellite 84 is possible at the time point of passing the spatial point $P_3$, but two-line communication is maintained. Up to the spatial point $P_7$, the communication device 40 communicates in the two-line mode using the line relayed by the satellite 81 as the primary communication line. From the spatial point $P_4$ to the spatial point $P_7$, three satellites are communicable. From the spatial point $P_5$ to the spatial point $P_7$, the communication device 40 does not use the top two satellites causing strong radio waves. In particular, from the spatial point $P_6$ to the spatial point $P_7$, the satellite 85 causing the highest strength of radio waves is not used for communication. A communication device 40A of Embodiment 2 does not have this type of problem.

Figure 11:
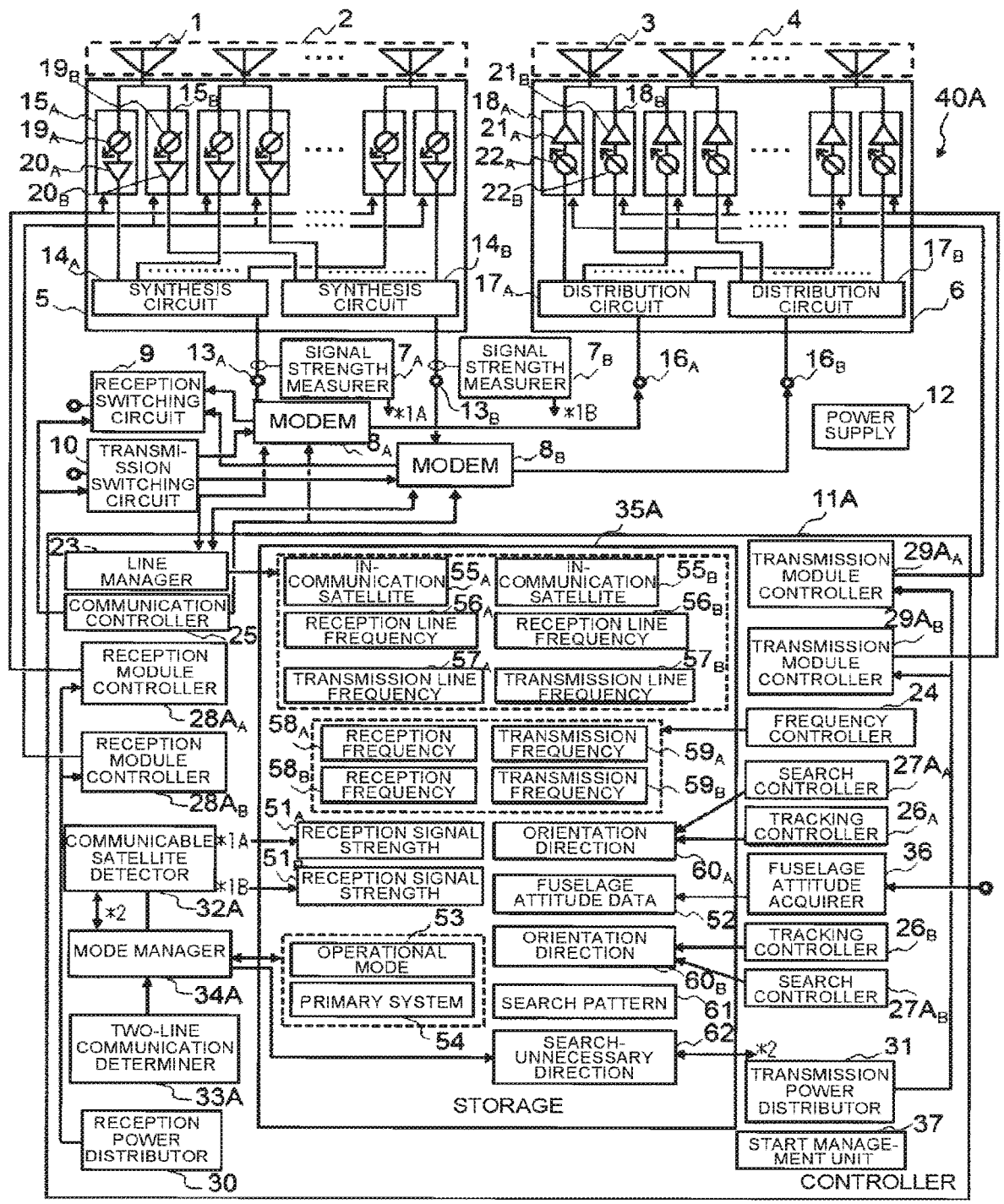
FIG. 11 is a block diagram illustrating the configuration of a communication device according to Embodiment 2 of the present disclosure.

FIG. 11 is a block diagram illustrating the configuration of the communication device according to Embodiment 2 of the present disclosure. The configuration of the communication device according to Embodiment 2 of the present disclosure is described with reference to FIG. 11. Points of difference between Embodiment 1 and Embodiment 2 are described with reference to FIG. 11. In a controller 11A of the communication device 40A, search controllers $27A_A$, $27A_B$, a communicable satellite detector 32A, a two-line communication determiner 33A, a mode manager 34A, and a storage 35A are modified.

The two-line communication determiner 33A determines whether two-line communication is unnecessary even when such communication is possible. The two-line communication determiner 33A determines that the two-line communication is unnecessary in the case in which the reception signal strength of the secondary communication line is greater than the reception signal strength of the primary communication line. That is to say, it is determined as shown below.

(1) When the primary system 54 is the system A:
  $G_A \geq G_B \geq H_T$ Two-line communication is necessary.
  $G_B > G_A \geq H_T$ Two-line communication is unnecessary.
  $G_B \geq H_T > G_A$ Two-line communication cannot be maintained.
  $G_A \geq H_T > G_B$ Two-line communication cannot be maintained.

(2) When the primary system 54 is the system B:
  $G_B \geq G_A \geq H_T$ Two-line communication is necessary.
  $G_A > G_B \geq H_T$ Two-line communication is unnecessary.
  $G_A \geq H_T > G_B$ Two-line communication cannot be maintained.
  $G_B \geq H_T > G_A$ Two-line communication cannot be maintained.

Further, when the reception signal strength of the secondary communication line is greater than or equal to the reception signal strength of the primary communication line, the two-line communication may be determined to be unnecessary. That is to say, determinations may be made as shown below.

(1) When the Primary System 54 is the System A:
  $G_A > G_B \geq H_T$ Two-line communication is necessary.
  $G_B \geq G_A \geq H_T$ Two-line communication is unnecessary.
  $G_B \geq H_T > G_A$ Two-line communication cannot be maintained.
  $G_A \geq H_T > G_B$ Two-line communication cannot be maintained.

(2) When the primary system 54 is the system B:
  $G_B > G_A \geq H_T$ Two-line communication is necessary.
  $G_A \geq G_B \geq H_T$ Two-line communication is unnecessary.
  $G_A \geq H_T > G_B$ Two-line communication cannot be maintained.
  $G_B \geq H_T > G_A$ Two-line communication cannot be maintained.

In the case in which the two-line communication determiner 33A determines that the two-line communication is unnecessary, the two-line communication determiner 33A notifies the mode manager 34A that two-line communication is unnecessary.

When the mode manager 34A is notified that the two-line communication is unnecessary, the mode manager 34A terminates communication using the primary communication line, and stores in the storage 35A the direction in which there exists the satellite used for the primary communication line. The direction in which there exists the satellite used for the primary communication line is the direction in which communicating with the communicable satellite with which communication is discontinued. In order to store the direction in which communicating with the communicable satellite with which communication is discontinued, a search-unnecessary direction 62 is added to the storage 35A. The direction stored at the search-unnecessary direction 62 is the direction in which there exists the satellite that is communicable but is not used for communication. When the search-unnecessary direction 62 is not stored, after the handover, the operational mode returns to the two-line mode in which the satellite used for the primary satellite prior to the handover is used for the secondary satellite. Specifically, in the search mode, in a direction to be stored at the search-unnecessary direction 62, the satellite that is the primary satellite prior to the handover is found as the communicable satellite. In the two-line mode, the reception signal strength of the primary system is less than in the search mode. Returning to the two-line mode is undesirable, because it causes lowering of the reception signal strength of the primary system.

The search-unnecessary direction 62 can store data indicating directions, for example, up to two. The mode manager 34A stores an orientation direction 60 of the primary system at the search-unnecessary direction 62. In the case in which one direction data is already stored at the search-unnecessary direction 62, a direction data is stored as the second search-unnecessary direction data. In the case in which two direction data are already stored at the search-unnecessary direction 62, the oldest direction data is overwritten. Which direction data stored at the search-unnecessary direction 62 is the oldest direction data is determined by a suitable method such as a method of recording a time at which the direction data is stored, a method of storing direction data as an array in order of from the oldest, or the like. The search-unnecessary direction 62 may be able to store three or more direction data.

The communicable satellite detector 32A finds the communicable satellite that is the satellite that causes the maximum reception signal strength and is communicable in a direction different from the orientation direction of the primary system and the direction stored at the search-unnecessary direction 62.

After searching roughly according to the search pattern 61, the search controller 27$_A$ of the system used in the search detects a direction (peak direction) at which the reception signal strength becomes a local maximum value (peak) greater than or equal to H$_S$ in a direction different from the orientation direction of the primary system. The search controller 27$_A$ detects a maximum of three peak directions from the largest. When m (2≥m≥0) directions are stored at the search-unnecessary directions 62, the search controller 27$_A$ of the system used for the search detects the peak directions of up to m+1 directions from the largest.

When the communicable satellite is found, the communicable satellite detector 32A sets at the orientation direction 60 of the system (search system) being used to search in the search mode. The search system is the secondary system that communicates using the secondary communication line after being changed to the two-line mode. The orientation direction 60 of the search system becomes an initial value of the orientation direction 60 when tracking the secondary satellite using the secondary communication line in the two-line mode. Moreover, on the basis of the peak direction detected by the search controller 27 of the search system, the communicable satellite detector 32A corrects and sets at the search-unnecessary direction 62. The case in which the search controller 27$_A$ operates is described. In the case in which the search controller 27$_B$ operates, operation is similar with respect to the orientation direction 60$_B$.

In the case in which, in the peak directions detected by the search controller 27$_A$, there exists a peak direction that is different from the directions stored at the search-unnecessary directions 62, it is determined that the communicable satellite is found, and the peak direction is stored at the orientation direction 60$_A$. In the case in which there are multiple peak directions that differ from the directions stored at the search-unnecessary directions 62, the peak direction having the maximum reception signal strength is stored at the orientation direction 60$_A$. In the case in which all of the peak directions are stored at the search-unnecessary directions 62, it is determined that the communicable satellite is not found.

The communicable satellite detector 32A corrects the search-unnecessary direction 62 as described below. In the case in which the peak direction is detected in the vicinity of the search-unnecessary directions 62, such a peak direction is stored at the search-unnecessary direction 62. In the case in which a peak direction is not detected in the vicinity of a direction stored at the search-unnecessary directions 62, the direction is deleted from the search-unnecessary directions 62.

Figure 12:
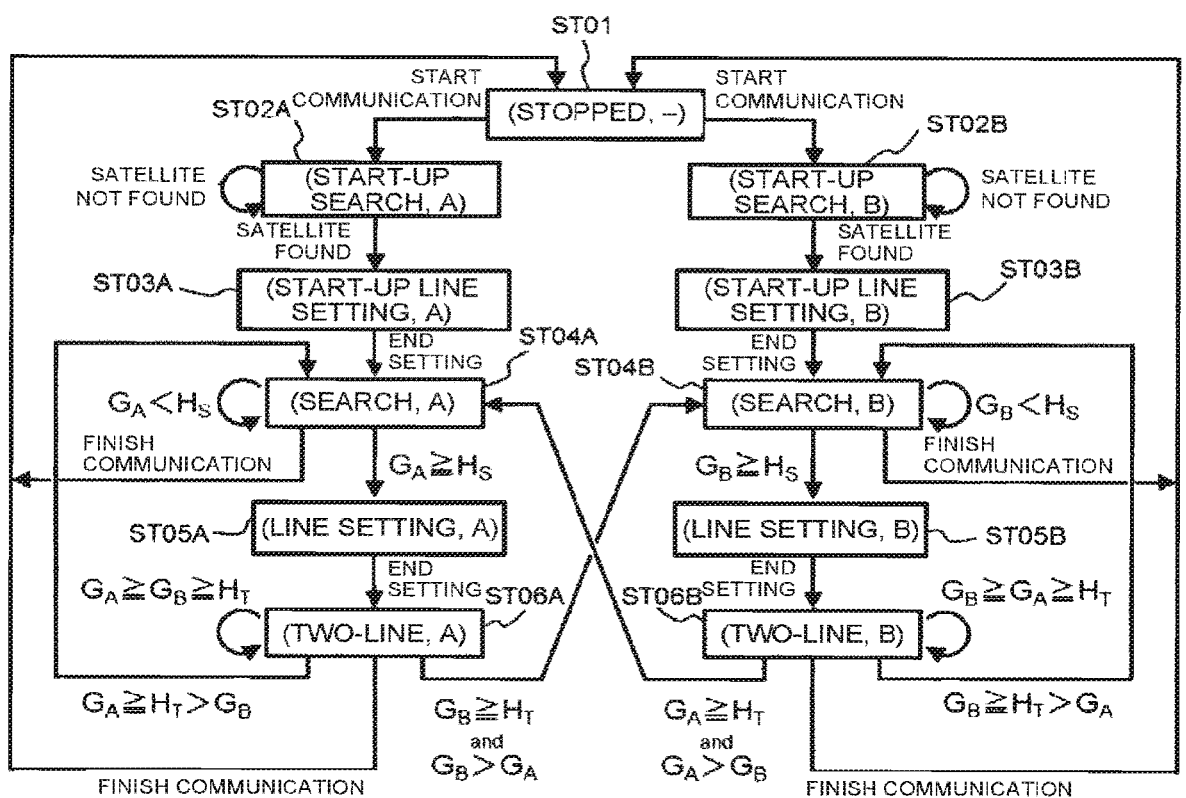
FIG. 12 is a state transition diagram illustrating change of state of the communication device according to Embodiment 2.

FIG. 12 is a state transition diagram illustrating change of the state of the communication device according to Embodiment 2. In comparison to FIG. 7 in the case of Embodiment 1, conditions for changing from the state ST06A that is "(two-line, system A)" and state ST06B that is "(two-line, system B)" are different.

While being the state ST06A that is "(two-line, system A)", in the case in which T$_T$ elapses and G$_A$≥G$_B$≥H$_T$ is detected, since two-line communication can be maintained, and the primary communication line has the greater signal strength, the state ST06A is continued. In the case in which T$_T$ elapses and G$_A$≥H$_T$> G$_B$ is detected, communication is not possible using the secondary communication line, and processing is changed to the state ST04A that is "(search, system A)". In the case in which T$_T$ elapses and G$_B$≥H$_T$ and G$_B$> G$_A$ are detected, a handover is performed from the primary satellite to the secondary satellite, and the state is changed to the state ST04B that is "(search, system B)". The condition that is G$_B$≥H$_T$ and G$_B$> G$_A$ is the condition indicating the union of the case in which two-line communication cannot be maintained (G$_B$≥H$_T$> G$_A$) and the case in which two-line communication is unnecessary (G$_B$> G$_A$≥H$_T$). The condition for changing from the state ST06B to the state ST04B is similar.

While being the state ST06B that is "(two-line, system B)", in the case in which T$_T$ elapses and G$_A$≥G$_B$≥H$_T$ is detected, since two-line communication can be maintained, and the primary communication line has greater signal strength, the state ST06B is continued. In the case in which T$_T$ elapses and G$_B$≥H$_T$> G$_A$ is detected, communication is not possible using the secondary communication line, and processing is changed to the state ST04B that is "(search, system B)". In the case in which T$_T$ elapses and G$_A$≥H$_T$ and G$_A$≥G$_B$ are detected, a handover is performed, and the state is changed to the state ST04A that is "(search, system A)".

Figure 13:
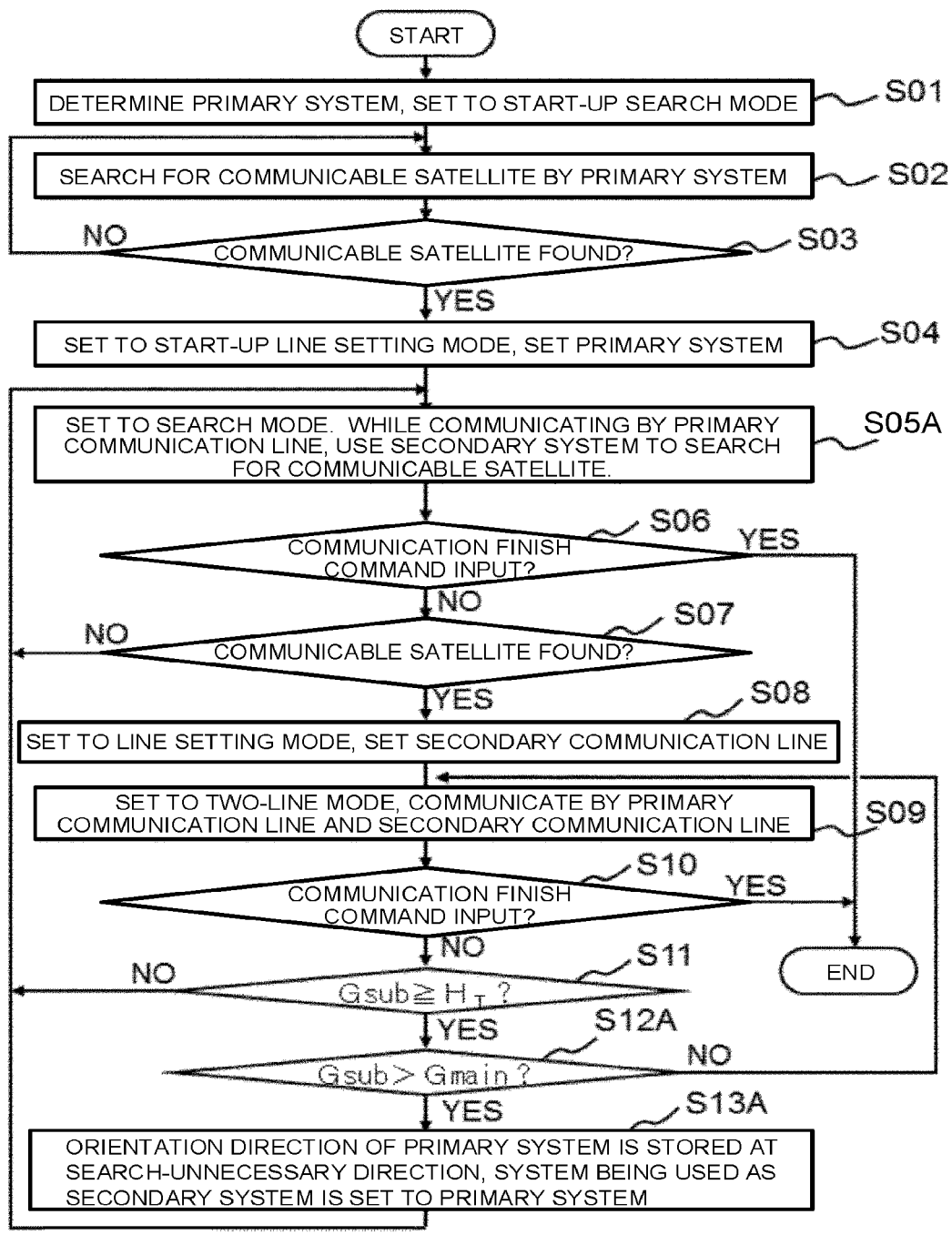
FIG. 13 is a flowchart illustrating operation of the communication device according to Embodiment 2.

Operations are described. FIG. 13 is a flowchart illustrating operation of the communication device according to Embodiment 2. Points in FIG. 13 that differ from those in FIG. 8 in the case of Embodiment 1 are described. Steps S05A, S12A, and S13A are modified.

In step S05A, the operational mode 53 is set to the search mode, and the searching for the communicable satellite is performed using the secondary communication line while communicating using the primary communication line. However, communication device 40A does not search for the communicable satellite in the vicinity of the directions stored at the search-unnecessary directions 62. Moreover, in the case in which the peak direction is detected in the vicinity of the search-unnecessary direction 62, the search-unnecessary direction 62 is revised to become the peak direction. In the case in which a peak direction is not detected in the vicinity of the search-unnecessary directions 62, the search-unnecessary direction 62 for such a peak direction is deleted.

In the case in which G$_{sub}$≥H$_T$ (YES in step S11), it is checked in step S12A as to whether the reception signal strength (G$_{main}$) of the primary communication line is greater than or equal to the reception signal strength (G$_{sub}$) of the secondary communication line. In the case in which G$_{main}$≥G$_{sub}$ is not detected (NO in step S12A), two-line communication is unnecessary, and a handover is performed from the primary satellite to the secondary satellite. In step S13A, the orientation direction 60 of the primary system is stored at the search-unnecessary direction 62, and the system that is being used as the secondary system is stored at the primary system 53. And processing returns to step S05A, and the communication device 40A operates in the search mode. In the case in which G$_{main}$≥G$_{sub}$ is detected (YES in step S12A), processing returns to step S09, and the two-line mode is continued.

Among the procedures that determine NO in step S12A, the procedure to detect that G$_{sub}$> G$_{main}$ and G$_{sub}$≥H$_T$ are satisfied, is a two-line communication communication-unnecessary determination procedure that determines whether continuation of the two-line communication procedure is necessary in the case in which both of the primary satellite and the secondary satellite are communicable satellites based on at least one of the primary signal strength and the secondary signal strength. That is to say, the two-line communication continuation check procedure performed in the communication method of Embodiment 2 has the two-line communication-unnecessary determination procedure.

Figure 14:
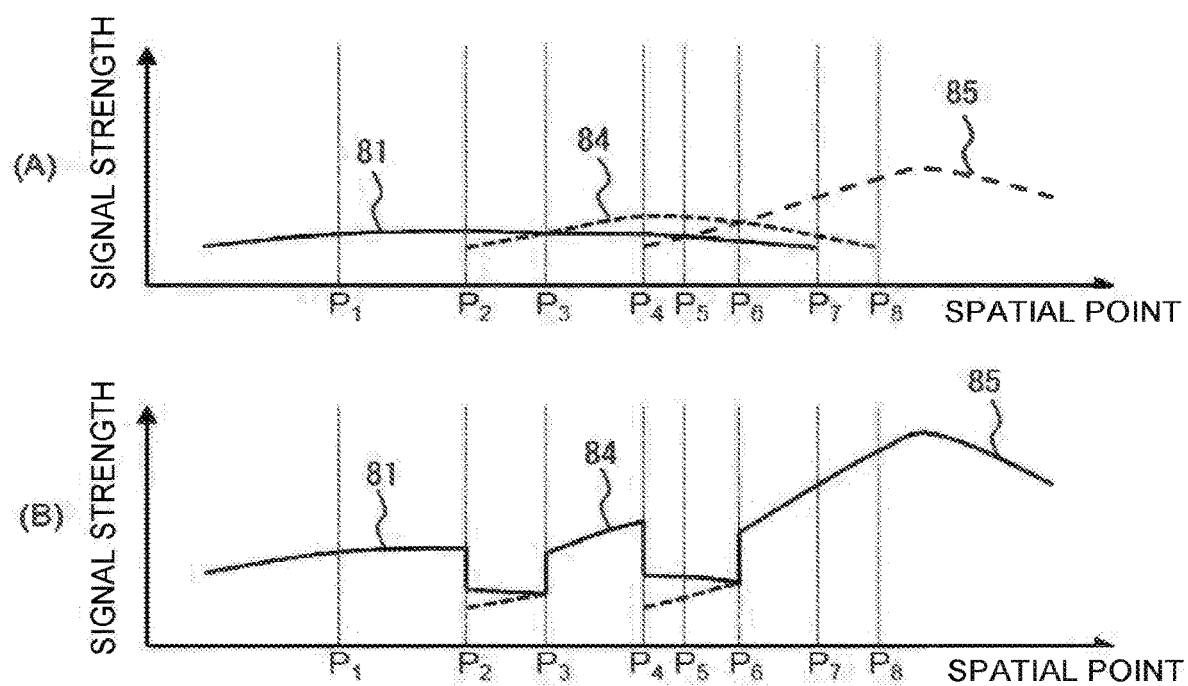
FIGS. 14A and 14B each is a drawing illustrating change in reception signal strength of the communication device according to Embodiment 2 in the example of the flight track illustrated in FIG. 9.

The method of operation of the communication device 40A in the case illustrated in FIG. 9 is described with reference to FIGS. 14A and 14B. FIGS. 14A and 14B illustrate changes in the reception signal strength of the communication device according to Embodiment 2 in the example of the flight track illustrated in FIG. 9. FIG. 14A is the same figure shown as FIG. 10A.

The trend in signal strength up to the spatial point $P_3$ in FIG. 14B is the same as in FIG. 9B. When the airplane 70 passes through the spatial point $P_3$, the reception signal strength of the secondary communication line relayed by the satellite 84 becomes greater than the reception signal strength of the primary communication line relayed by the satellite 81. The two-line communication determiner 33A determines that the two-line communication is unnecessary, and the operational mode is changed to the search mode. In the search mode, communication using the communication line relayed by the satellite 84 is performed. The direction in which there exists the satellite 81 is stored at the search-unnecessary direction 62. The power distribution to the primary communication line in the search mode is greater than that in the two-line mode, and the reception signal strength of radio waves from the satellite 84 increases. The direction in which there exists the satellite 81 is stored at the search-unnecessary direction 62, and the search mode is continued without finding the satellite 81 as the communicable satellite.

When the airplane 70 moves to the spatial point $P_4$, the satellite 85 is found, and the operational mode is changed to the two-line mode. Upon passing the spatial point $P_6$, the two-line mode becomes unnecessary, and the operational mode is changed to the search mode communicating by the primary system with the satellite 85. The direction in which there exists the satellite 84 is added to the search-unnecessary directions 62. When the airplane 70 passes through the spatial point $P_7$, the satellite 81 becomes no longer the communicable satellite. When the satellite is detected not to be the communicable satellite, the direction of the satellite 81 is deleted from the search-unnecessary directions 62. Similarly, upon passing the spatial point $P_8$, the direction of the satellite 84 is deleted from the search-unnecessary directions 62.

Also for the communication device 40A, no period occurs in which communication is disabled with the communication counterpart 71 during switching to the communication line relayed by a different satellite. Further, using the communication device 40A, the handover from the satellite 81 to the satellite 84 is completed at the spatial point $P_3$, and the handover from the satellite 84 to the satellite 85 is completed at the spatial point $P_6$. In the case in which the communication device 40 illustrated in FIG. 10 is used, the handover from the satellite 81 to the satellite 84 is completed at the spatial point $P_7$, and the handover from the satellite 84 to the satellite 85 is completed at the spatial point $P_8$. In comparison to use of the communication device 40, the reception signal strength of the primary system from the spatial point $P_3$ to the spatial point $P_7$ is greater when using the communication device 40A.

Whether the two-line communication is unnecessary may be determined at a time point when $G_{sub}$ becomes greater than a threshold (switching-possible lower limit value $P_{min}$) determined on the basis of the signal strength $G_{main}$ of the primary system, instead of determining at the time point at which the signal strength $G_{sub}$ of the secondary system becomes greater than the signal strength $G_{main}$ of the primary system. The switching-possible lower limit value, for example, may be determined to be a value such as 98%, 102%, or the like of $G_{main}$. In the case in which the switching-possible lower limit value is set to be lower than $G_{main}$, conditions including a condition that $G_{sub}$ is greater than or equal to a fixed threshold $P_{th}$ ($G_{sub} \geq P_{th}$) in addition to the condition that $G_{sub}$ is greater than the switching-possible lower limit value ($G_{sub} > P_{min}$), may be used for determining that the two-line communication is unnecessary.

For example, the switching-possible lower limit value $P_{min}$ may be determined as shown below on the basis of a coefficient R, such as 102%, and the signal strength $G_{main}$ of the primary system.

$$P_{min} = R \times G_{main}$$

In the case in which the switching-possible lower limit value $P_{min}$ is used, the two-line communication determiner determines, as shown below, whether the two-line communication is to be continued.

(1) When the primary system 54 is the system A:

$G_A \geq H_T$ and $R \times G_A > G_B \geq H_T$ Two-line communication is necessary.

$G_A \geq H_T$ and $G_B \geq R \times G_A > H_T$ Two-line communication is unnecessary.

$G_B \geq H_T > G_A$ Two-line communication cannot be maintained.

$G_A \geq H_T > G_B$ Two-line communication cannot be maintained.

(2) When the primary system 54 is the system B:

$G_B \geq H_T$ and $R \times G_B > G_A \geq H_T$ Two-line communication is necessary.

$G_B \geq H_T$ and $G_A \geq R \times G_B > H_T$ Two-line communication is unnecessary.

$G_A \geq H_T > G_B$ Two-line communication cannot be maintained.

$G_B \geq H_T > G_A$ Two-line communication cannot be maintained.

The switching-possible lower limit value may be determined as any value as long as a handover from the primary satellite to the secondary satellite can be made with a certain accuracy or more. The condition for determining that the two-line communication is unnecessary may be any condition as long as the condition can determine that the two-line communication is unnecessary for the case in which the reception signal strength of the primary system is increased by the handover. The condition for determining that the two-line communication is unnecessary is preferably such a condition that can determine that the communication line relayed by the post-handover satellite can be used for communication at least a period having a determined length.

Embodiment 3

In Embodiment 3 similarly to Embodiment 2, the two-line communication is discontinued when, even if the two-line communication is possible, the two-line communication is unnecessary. In Embodiment 3, identification information of the satellite included in the beacon signal is used, instead of the direction of the satellite with which communication is discontinued. By using the identification information of the satellite, the processing to correct the search-unnecessary direction in accordance with the passage of time becomes unnecessary. When the search-unnecessary direction is used, processing to correct the search-unnecessary direction in accordance with the passage of time is necessary.

Figure 15:
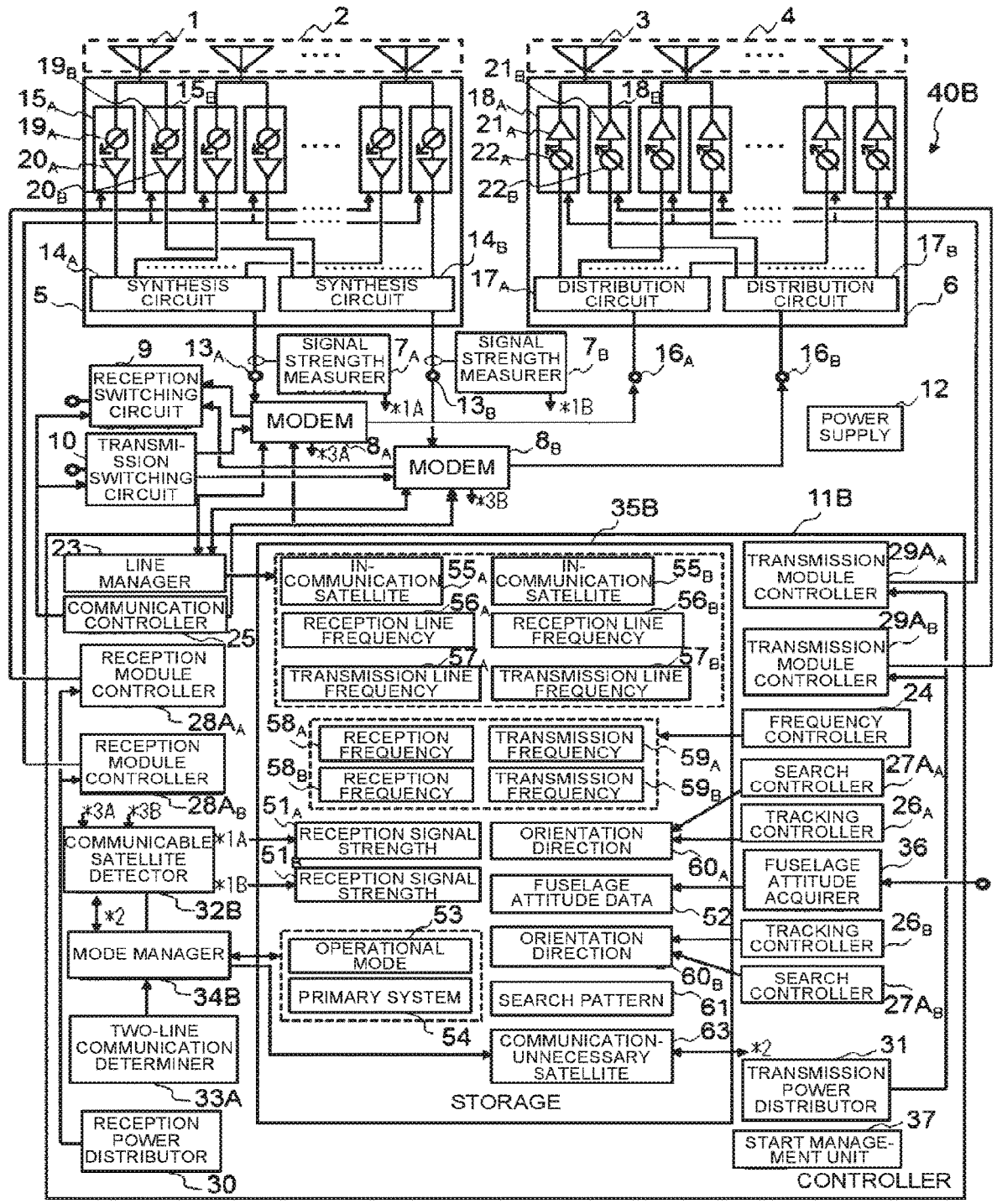
FIG. 15 is a block diagram illustrating the configuration of a communication device according to Embodiment 3 of the present disclosure.

The configuration of a communication device according to Embodiment 3 of the present disclosure is described with reference to FIG. 15. Points in FIG. 15 that differ from those in FIG. 11 in the case of Embodiment 2 are described. In a controller 11B included in a communication device 40B, a communicable satellite detector 32B, a mode manager 34B, and a storage 35B are modified.

The storage 35B stores communication-unnecessary satellites 63 instead of search-unnecessary direction 62. Identification information of the satellite that relays the communication line that is discontinued to use for communication because it is determined that the two-line mode is unnecessary, is stored at the communication-unnecessary satellite 63. The satellite with which communication is discontinued is the communicable satellite.

The demodulated signals of the modems $8_A$, $8_B$ are inputted to the communicable satellite detector 32B. The communicable satellite detector 32B uses the identification information of the satellite included in the demodulated beacon signal to find the communicable satellite being the satellite that is different from the satellite of the primary system and different from the communication-unnecessary satellites 63.

The communicable satellite detector 32B extracts the satellite identification information from the beacon signal of a period when the search controller $27_A$ of the system used in the search detects the peak direction of the reception signal power. When the extracted identification information is different from the identification information stored at the communication-unnecessary satellites 63, it is determined that the communicable satellite is found. The communicable satellite is determined not to be found when each of the identification information extracted in the period when the reception direction of the system used in the search is directed in each of the peak directions, coincides with one of the identification information stored at the communication-unnecessary satellite 63 after all of the peak directions are processed. Identification information of a satellite stored at the communication-unnecessary satellite 63 and not extracted by processing all of the peak directions is deleted from the communication-unnecessary satellites 63.

When the two-line communication determiner 33A determines that the two-line communication is unnecessary, the two-line communication determiner 33A notifies the mode manager 34B that the two-line mode is unnecessary.

When the mode manager 34B is notified, the mode manager 34B terminates communication using the primary communication line and stores at the communication-unnecessary satellites 63 of the storage 35B the identification information of the satellite being used by the primary communication line. The communication-unnecessary satellites 63 can store the identification information of up to two satellites, for example. The mode manager 34B stores the in-communication satellite 55 of the primary system at the time point when the two-line mode is determined to be unnecessary at the communication-unnecessary satellites 63. In the case in which one satellite is already stored at the communication-unnecessary satellites 63, the in-communication satellite 55 of the primary system is stored at the second communication-unnecessary satellites 63. When two satellites are already stored, the one stored older is overwritten.

The state transition diagram of Embodiment 3 is the same as that of FIG. 12 in the case of Embodiment 2.

Figure 16:
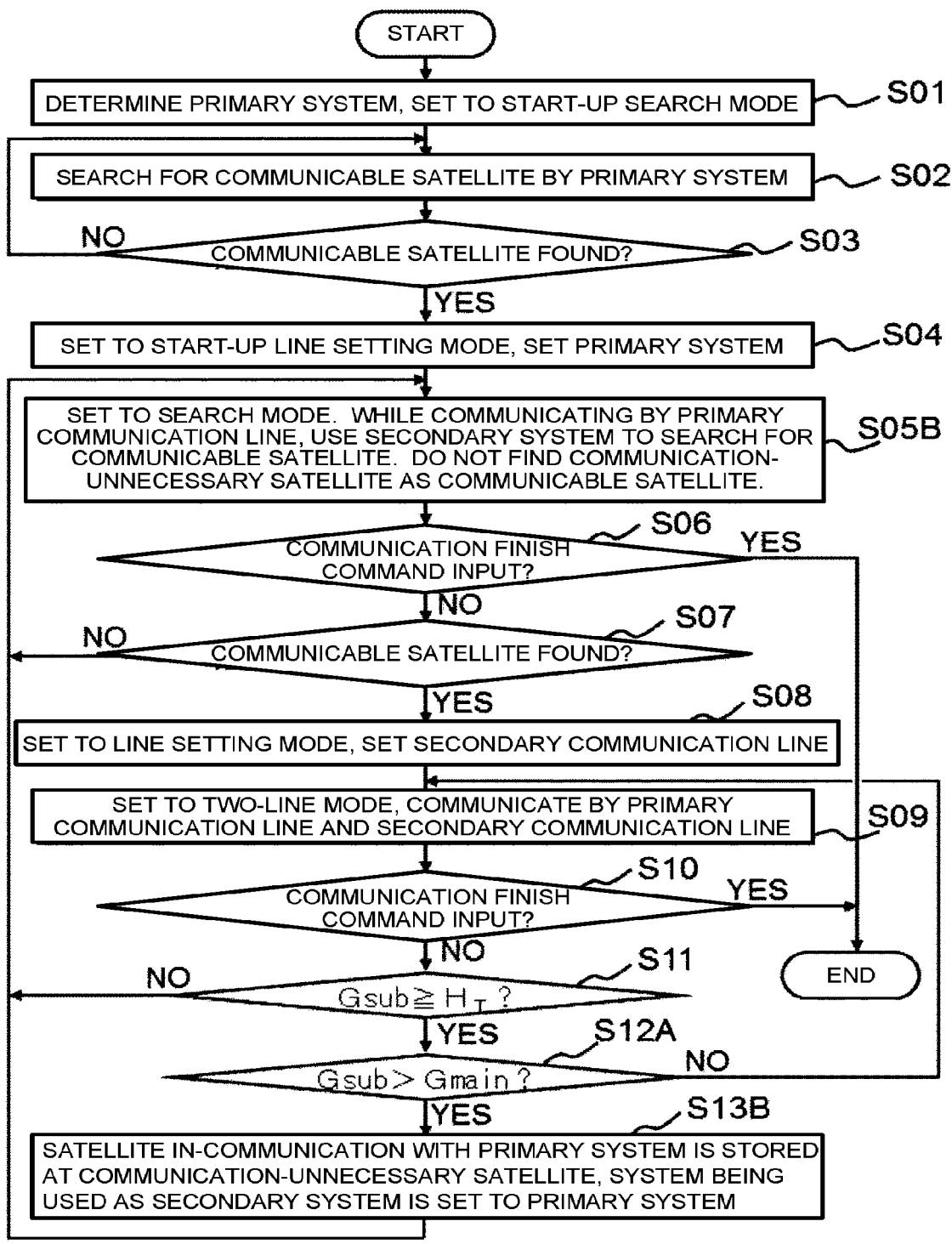
FIG. 16 is a flowchart illustrating operation of the communication device according to Embodiment 3.

Operations are described. FIG. 16 is a flowchart illustrating operation of the communication device according to Embodiment 3. Points in FIG. 16 that differ from those in FIG. 13 in the case of Embodiment 2 are described. Steps S05B and S13B are modified.

In step S05B, the operational mode 53 is set to the search mode, and while communication is performed using the primary communication line, the searching for the communicable satellite is performed by using the secondary communication line. The communicable satellite detector 32B extracts the identification information of the satellite from the inputted beacon signal, and does not detect, as a communicable satellite, a satellite having the identification information stored at the communication-unnecessary satellites 63. In the case in which the identification information of the satellite stored at the communication-unnecessary satellites 63 is detected, the identification information of such a satellite remains at the communication-unnecessary satellites 63. In the case in which the identification information is not detected, the identification information is deleted from the communication-unnecessary satellites 63.

In step S13B, the in-communication satellite 55 of the primary system is stored at the communication-unnecessary satellite 63, and the system that is being used as the secondary system is stored at the primary system 53.

Operations are performed similarly to the case of Embodiment 2, and similar advantageous effects are obtained. Use of the identification signal of the satellite reduces the probability of erroneously determining, to be a communicable satellite, the satellite used for communication that is discontinued due to determining that two-line communication is unnecessary. The processing to correct the search-unnecessary direction in accordance with the passage of time can be eliminated, and the processing is simplified.

Embodiment 4

Embodiment 4 is an Embodiment in which the Embodiment 2 is modified such that two-line communication is unnecessary is determined also in the case in which the secondary communication line becomes impossible to communicate without changing to the primary communication line. The case in which the secondary communication line becomes impossible to communicate without changing to the primary communication line is detected before communication using the secondary communication line becomes impossible, and the two-line mode is discontinued. The period of the two-line mode that does not result in a handover can be shortened, and reception signal strength of the primary communication line averaged over time can be increased than that of the case of Embodiment 2. Embodiment 1 or Embodiment 3 may also be modified.

Figure 17:
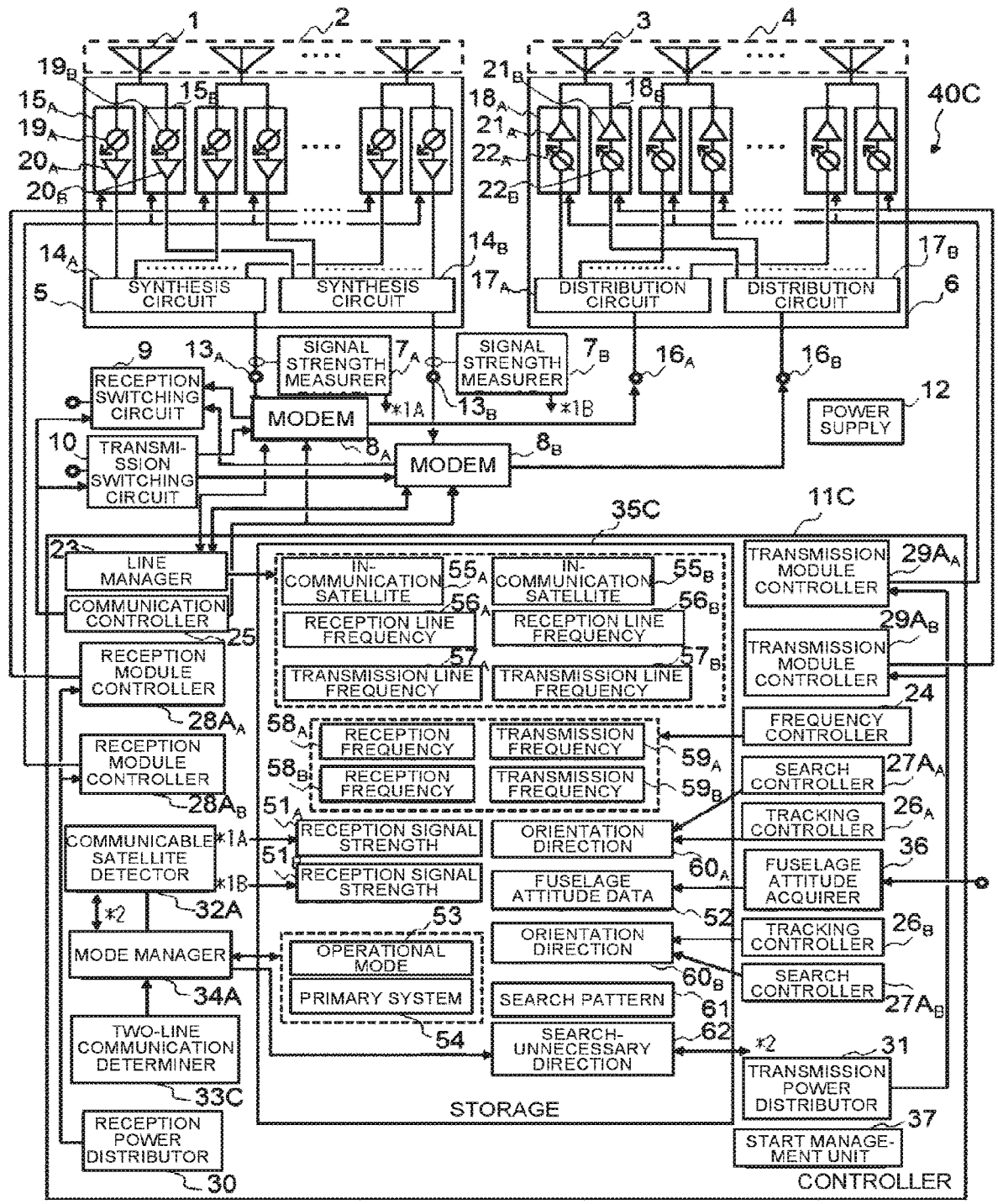
FIG. 17 is a block diagram illustrating the configuration of a communication device according to Embodiment 4 of the present disclosure.

The configuration of a communication device according to Embodiment 4 of the present disclosure is described with reference to FIG. 17. Points in FIG. 17 that differ from those in FIG. 11 in the case of Embodiment 2 are described. A controller 11C of a communication device 40C has a modified two-line communication determiner 33C.

The two-line communication determiner 33C determines that the two-line communication is unnecessary and two-line communication is discontinued, when the reception signal strength of the secondary communication line is decreasing, even if two-line communication is possible. In the case in which the reception signal strength of the secondary communication line is detected as decreasing, communication using the secondary communication line becomes impossible in the near future, and the possibility of a handover to the secondary communication line is quite small.

The variables are defined for expressing the operations of the two-line communication determiner 33C as shown below.

$K_A$: The change rate of the reception signal strength $51_A$ of the system A.

$K_B$: The change rate of the reception signal strength $51_B$ of the system B.

$K_{sub}$: The change rate of the reception signal strength ($G_{sub}$) of the secondary system.

Further, the "change rate" is the change rate averaged over a period having a suitable length. The length of the period of averaging is determined, in consideration of the magnitude of measurement errors of the reception signal strengths $51_A$, $51_B$, such that there is no erroneous determination of decrease for a case in which the reception signal strengths $51_A$ or $51_B$ is actually not decreasing. Moreover, decreasing of signal strength may be determined in the case in which each of the change rate of the reception signal strengths $51_A$, $51_B$ is less than an appropriately determined negative value.

The two-line communication determiner 33C determines that the two-line communication is unnecessary when the reception signal strength of the secondary communication line is greater than the reception signal strength of the primary communication line, or when the reception signal strength of the secondary communication line decreases. That is, it is determined as shown below.

(1) When the primary system 54 is the system A is:

$G_A \geq G_B \geq H_T$ and $K_B \geq 0$ Two-line communication is necessary.

$G_A \geq G_B \geq H_T$ and $K_B < 0$ Two-line communication is unnecessary.

$G_B > G_A \geq H_T$ Two-line communication is unnecessary.

$G_B \geq H_T > G_A$ Two-line communication cannot be maintained.

$G_A \geq H_T > G_B$ Two-line communication cannot be maintained.

(2) When the primary system 54 is the system B is:

$G_B \geq G_A \geq H_T$ and $K_A \geq 0$ Two-line communication is necessary.

$G_B \geq G_A \geq H_T$ and $K_A < 0$ Two-line communication is unnecessary.

$G_A > G_B \geq H_T$ Two-line communication is unnecessary $G_A \geq H_T > G_B$ Two-line communication cannot be maintained.

$G_B \geq H_T > G_A$ Two-line communication cannot be maintained.

Figure 18:
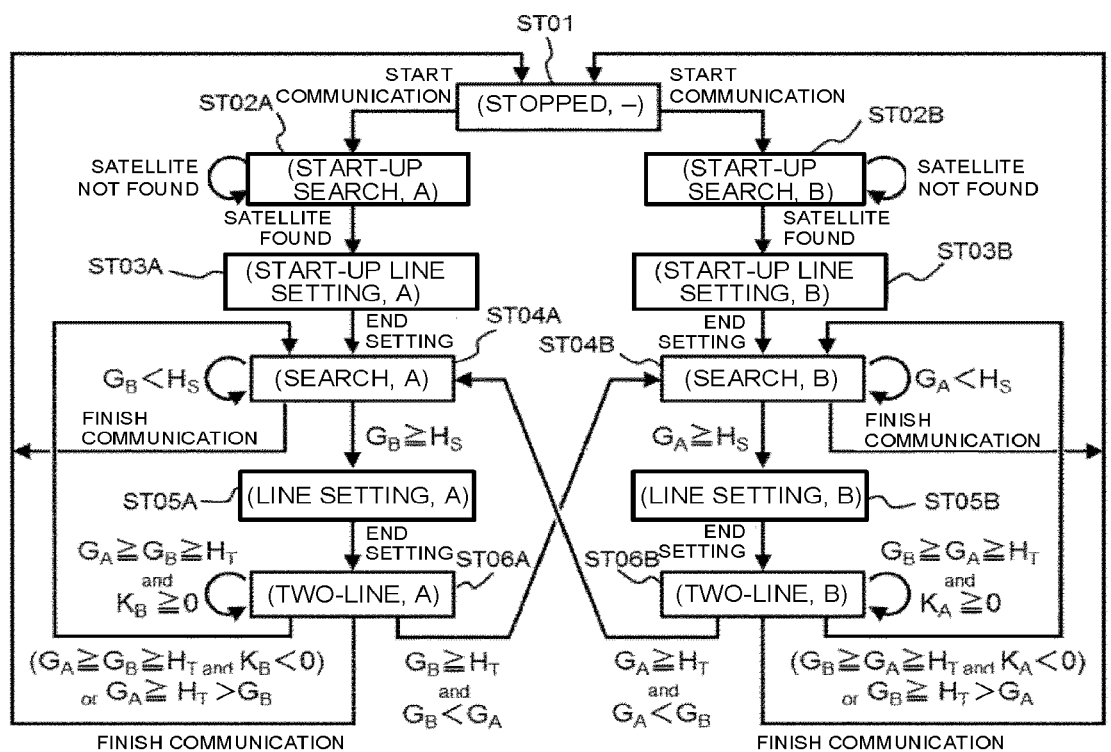
FIG. 18 is a state transition diagram illustrating change of state of the communication device according to Embodiment 4.

FIG. 18 is a state transition diagram illustrating changes of state of the communication device according to Embodiment 4 of the present disclosure. Points in FIG. 18 that differ from those in FIG. 12 in the case of Embodiment 2 are described. The conditions for changing from the state ST06A that is "(two-line, system A)" and from the state ST06B that is "(two line, system B)" are different.

While being the state ST06A that is "(two-line, system A)", in the case in which $T_T$ elapses and $G_A \geq G_B \geq H_T$ and $K_B \geq 0$ are detected, two-line communication can be maintained, and there exists a possibility of performing a handover, and the state ST06A is continued. In the case in which $T_T$ elapses and $G_A \geq H_T > G_B$ or "$G_A \geq G_B \geq H_T$ and $K_B < 0$" are detected, it is determined that the handover from the primary satellite to the secondary satellite becomes impossible, and the state is changed to the state ST04A that is "(search, system A)". In the case in which $T_T$ elapses and $G_B \geq H_T$ and $G_B > G_A$ are detected, the handover is performed, and the state is changed to the state ST04B that is "(search, system B)".

While being the state ST06B that is "(two-line, system B)", in the case in which $T_T$ elapses and $G_A \geq G_B \geq H_T$ and $K_A \geq 0$ are detected, two-line communication can be maintained, and there exists a possibility of performing a handover, and the state ST06B is continued. In the case in which $T_T$ elapses and $G_B \geq H_T > G_A$ or "$G_B \geq G_A \geq H_T$ and $K_A < 0$" is detected, it is determined that the handover becomes impossible, and the state is changed to the state ST04B that is "(search, system B)". In the case in which $T_T$ elapses and $G_A \geq H_T$ and $G_A > G_B$ are detected, the handover is performed, and the state is changed to the state ST04A that is "(search, system A)".

Figure 19:
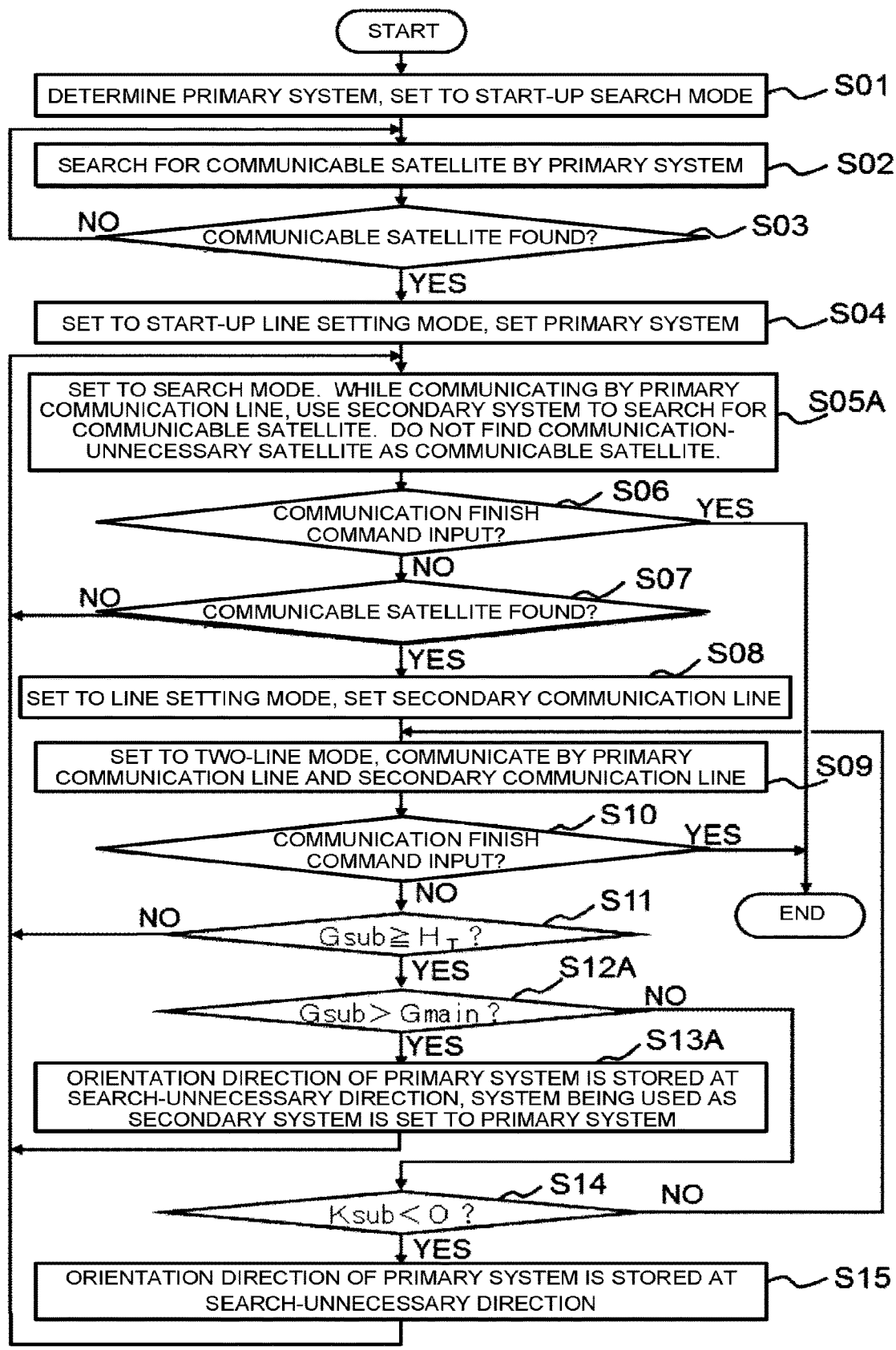
FIG. 19 is a flowchart illustrating operation of the communication device according to Embodiment 4.

Operations are described. FIG. 19 is a flowchart illustrating operation of the communication device according to Embodiment 4. Points in FIG. 19 that differ from those in FIG. 16 in the case of Embodiment 3 are described. Steps S14 and S15 are added.

In the case in which the reception signal strength ($G_{main}$) of the primary communication line is greater than or equal to the reception signal strength ($G_{sub}$) of the secondary communication line ($G_{main} > G_{sub}$, YES in step S12A), processing proceeds to step S14. In step S14, it is checked as to whether the change rate ($K_{sub}$) of $G_{sub}$ is negative. In the case in which $K_{sub} < 0$ (YES in step S14) is detected, it is determined that the handover from the primary satellite to the secondary satellite becomes impossible, and the two-line communication is discontinued. In step S15, the in-communication satellite 55 of the secondary system is stored at the communication-unnecessary satellite 63. After executing step S15, processing returns to step S05A. In the case in which $K_{sub} < 0$ is not detected (NO in step S14), processing returns to step S09, and the two-line mode is continued.

Figure 20:
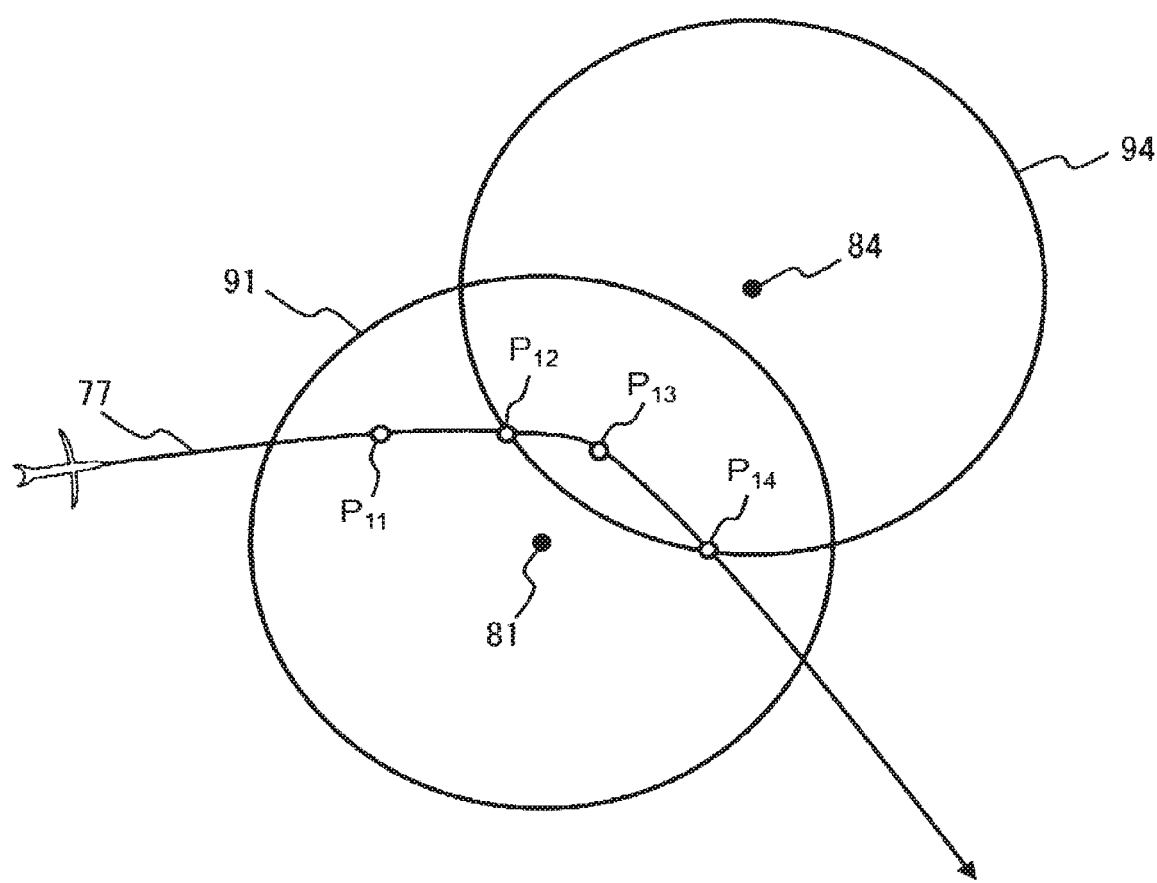
FIG. 20 is a drawing illustrating an example of a flight track in which the communication device according to Embodiment 4 can detect a state in which a handover becomes impossible earlier.

FIG. 20 is a drawing illustrating an example of a flight track in which the state in which a handover becomes impossible is detected earlier by the communication device according to Embodiment 4. The beam ranges 91, 94 of the two satellites 81, 84 are each indicated by a circle. The airplane 70 moves through the flight track 77 illustrated by the solid line in the drawing.

Figure 21:
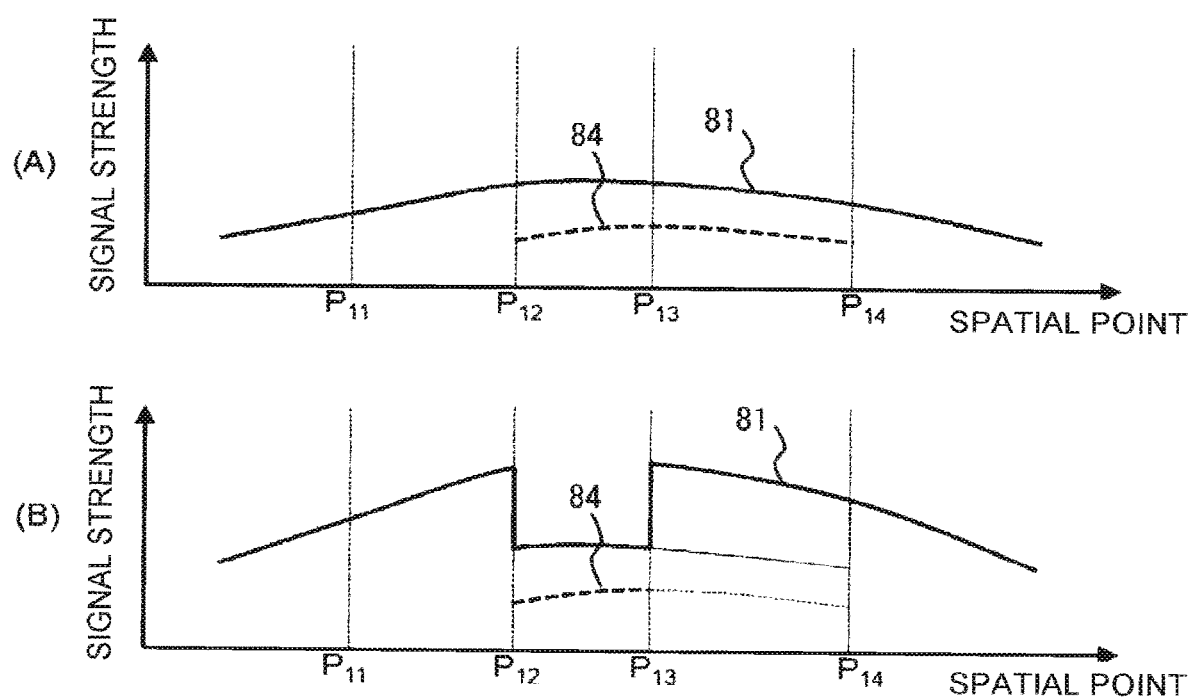
FIGS. 21A and 21B each is a drawing illustrating change in reception signal strength of the communication device according to Embodiment 4 in the example of the flight track illustrated in FIG. 20.

FIGS. 21A and 21B are drawings illustrating the change in reception signal strength of the communication device according to Embodiment 4 in the example of the flight track illustrated in FIG. 20. Strengths of radio waves of the satellites 81 and 84 are illustrated in FIG. 21A. Reception signal strength received by the communication device 40C is illustrated in FIG. 21B. Reception signal strength while receiving using the primary communication line is indicated by the solid line, and reception signal strength while receiving using the secondary communication line is indicated by the dashed line. The reception signal strength received by the communication device 40A of Embodiment 2 is indicated by the fine solid line.

When the airplane 70 exists at the spatial point $P_{11}$, the satellite 81 is tracked using the primary communication line, and the communication device 40C operates in the search mode. When the airplane 70 moves to the spatial point $P_{12}$, communication with the satellite 84 becomes possible. To facilitate description, the communication line relayed by the satellite 84 is assumed to be capable of use as the secondary communication line from the spatial point $P_{12}$. At the spatial point $P_{13}$, the change rate of the reception signal strength of the secondary communication line relayed by the satellite 84 changes to a value indicating decrease. Communication with the satellite 84 becomes impossible at the spatial point $P_{14}$.

The communication device 40C performs communication in the two-line mode from the spatial point $P_{12}$ to the spatial point $P_{13}$, and operates in the search mode by setting the line relayed by the satellite 81 as the primary communication line for the sections of the flight track other than the section between the spatial point $P_{12}$ and the spatial point $P_{13}$. The communication device 40A communicates in the two-line mode from the spatial point $P_{12}$ to the spatial point $P_{14}$. At the spatial point $P_{13}$, the communication device 40C detects that the handover to the satellite 84 becomes impossible and returns to the search mode earlier than the communication device 40A. From the spatial point $P_{13}$ to the spatial point $P_{14}$, the reception signal strength of the communication device 40C is greater than that obtained by the communication device 40A. The communication device 40C can shorten the period of the two-line mode that does not lead to the handover, and can increase the time-averaged reception signal strength of the primary communication line relative to the case of Embodiment 2.

During the handover, the communication device 40C operates similarly to the communication device 40A. Also for the communication device 40C, there exists no occurrence of the period in which communication with the communication counterpart 71 cannot be performed during switching to the communication line relayed by a different satellite.

Embodiment 5

Figure 22:
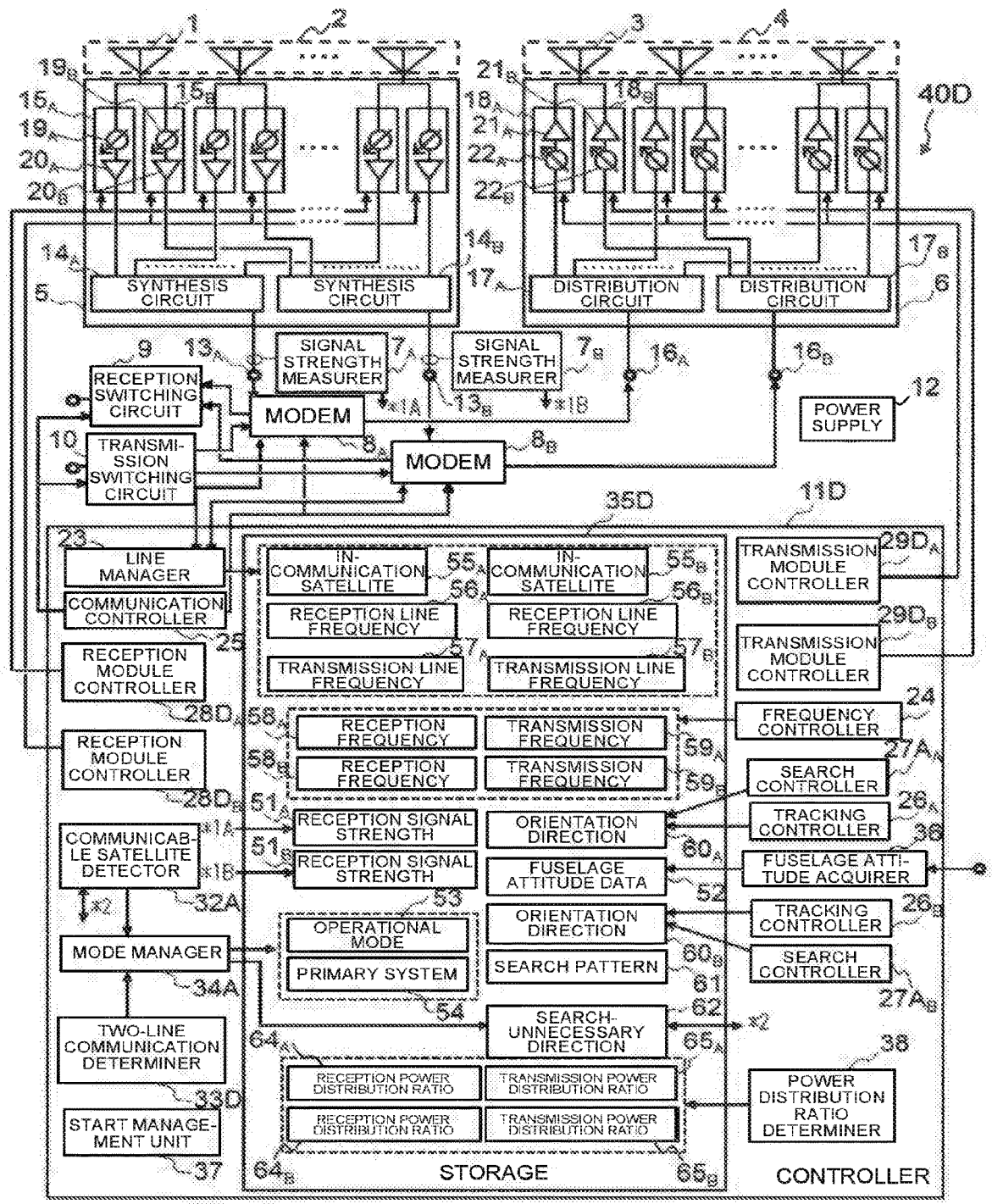
FIG. 22 is a block diagram illustrating the configuration of a communication device according to Embodiment 5 of the present disclosure.

Embodiment 5 is a case in which Embodiment 4 is modified such that, the reception signal strength of the secondary communication line in the two-line mode is greater than or equal to the communicable strength being the reception signal strength that can communicate, and the reception signal strength of the primary communication line is increased. FIG. 22 is a block diagram illustrating the configuration of a communication device according to Embodiment 5 of the present disclosure. Points in FIG. 22 that differ from those in FIG. 17 in the case of Embodiment 4 are described.

A controller 11D included in a communication device 40D has a power distribution ratio determiner 38. Moreover, reception module controllers $28D_A$, $28D_B$, transmission module controllers $29D_A$, $29D_B$, a two-line communication determiner 33D, and a storage 35D are modified.

Reception power distribution ratios $64_A$, $64_B$ and transmission power distribution ratios $65_A$, $65_B$ are added to the storage 35D.

The reception module controller $28D_A$ refers to the reception power distribution ratio $64_A$ and controls power supplied to the reception module $15_A$. The reception module controller $28D_B$ refers to the reception power distribution ratio $64_B$ and controls power supplied to the reception module $15_B$. The transmission module controller $29D_A$ refers to the transmission power distribution ratio $65_A$ and controls power supplied to the transmission module $18_A$. The transmission module controller $29D_B$ refers to the transmission power distribution ratio $65_B$ and controls power supplied to the transmission module $18_B$.

The reception module controllers $28_A$, $28_B$ of Embodiment 1 control power supplied respectively to the reception modules $15_A$, $15_B$ according to the distribution ratio notified by the reception power distributor 30. The transmission module controllers $29_A$, $29_B$ control power supplied respectively to the transmission modules $18_A$, $18_B$ according to the distribution ratio notified by the transmission power distributor 31.

At the communication device 40D, the power distribution ratio determiner 38 refers to the operational mode 53, the primary system 54, and the reception signal strengths $51_A$, $51_B$, and sets the reception power distribution ratios $64_A$, $64_B$ and the transmission power distribution ratios $65_A$, $65_B$. The reception module controllers $28D_A$, $28D_B$ refer to the reception power distribution ratios $64_A$, $64_B$ and do not refer to the operational mode 53 and the primary system 54. The transmission module controllers $29D_A$, $29D_B$ refer to the transmission power distribution ratios $65_A$, $65_B$ and do not refer to the operational mode 53 and the primary system 54.

The power distribution ratio determiner 38 set the reception power distribution ratios $64_A$, $64_B$ and the transmission power distribution ratios $65_A$, $65_B$ such that, the reception signal strength and the transmission signal strength of the secondary communication line in the two-line mode are greater than or equal to the communicable strength, and the reception signal strength the transmission signal strength of the primary communication line are increased. The reception power distribution ratios $64_A$, $64_B$ indicate how reception power, whose total is fixed, are distributed to the system A and the system B. The transmission power distribution ratios $65_A$, $65_B$ indicate how transmission power, whose total is fixed, are distributed to the system A and the system B.

In the search mode in Embodiments 1 to 4, the reception power distribution to the primary communication line is 90%, and the transmission power distribution to the primary communication line is 100%. In the two-line mode, the reception power distribution to the primary communication line is 50%, and the transmission power distribution to the primary communication line is 50%. Thus, when the operational mode is changed from the search mode to the two-line mode, the reception signal strength and the transmission signal strength of the primary communication line become lower than those in the search mode. According to Embodiment 5, the power distribution ratio determiner 38 is added to reduce the amount of the lowering of the reception signal strength and the transmission signal strength of the primary communication line when the operational mode is changed from the search mode to the two-line mode.

The reception signal strength is almost proportional to strength of radio waves received by the reception antennas 1, and is also almost proportional to the power used by the element reception signal processor 5. Because the power distribution ratios are changed, the communication device 40D cannot determine whether the communication line is communicable based on the reception signal strength. The communication device 40D determines whether the communication line is communicable by comparing a threshold and a sensitivity coefficient of the reception signal strength. The sensitivity coefficient is a value obtained by dividing the reception signal strength with the power used for receiving the reception signal. Variables are defined as shown below.

$\beta_A$: The power distribution ratio of the system A in the two-line mode.

$\beta_B$: The power distribution ratio of the system B in the two-line mode. $\beta_A + \beta_B = 100\%$.

$\beta_{sub}$: The power distribution ratio of the secondary system in the two-line mode. $\beta_{sub} \leq 50\%$.

$\beta_{main}$: The power distribution ratio of the primary system in the two-line mode. $\beta_{main} = 100\% - \beta_{sub}$.

$\gamma_A$: The sensitivity coefficient of the reception signal strength $51_A$ of the system A. $\gamma_A = G_A/\beta_A$.

$\gamma_B$: The sensitivity coefficient of the reception signal strength $51_B$ of the system B. $\gamma_B = G_B/\beta_A$.

$\gamma_{main}$: The sensitivity coefficient of the reception signal strength $51_B$ of the primary system.

$\gamma_{sub}$: The sensitivity coefficient of the reception signal strength $51_B$ of the secondary system.

$\delta$: An acceptable decrease amount for the sensitivity coefficients $\gamma_A$ and $\gamma_B$. $\delta \geq 0$.

$H_C$: A threshold value for the sensitivity coefficient in determining to be communicable.

$M_A$: A change rate of the sensitivity coefficient of the reception signal strength $51_A$ of the system A.

$M_B$: A change rate of the sensitivity coefficient of the reception signal strength $51_B$ of the system B.

$M_{sub}$: A change rate of the sensitivity coefficient ($\gamma_{sub}$) of the reception signal strength of the secondary system.

The threshold $H_C$ with respect to the sensitivity coefficients $\gamma_A$ and $\gamma_B$ is required to be a threshold that can determine whether the communication line is communicable in the case in which $\beta_A = \beta_B = \beta_T = 50\%$ is satisfied, similarly to the threshold $H_T$ with respect to the reception signal strengths $G_A$ and $G_B$. Thus values are set as shown below.

$$H_C = H_T/\beta_T \quad (2)$$

The acceptable decrease amount $\delta$ for the sensitivity coefficients $\gamma_A$ and $\gamma_B$ is set appropriately while taking into account factors such as measurement errors.

In the two-line mode, the power distribution ratio determiner 38 sets the power distribution ratios $\beta_A{}^n$ and $\beta_B{}^n$ as described below. Here, the appended superscript "n" indicates the time point. Taking the time point at the starting the two-line mode to be "0", the initial value of the power distribution ratio is set as shown below.

$$\beta_A{}^0 = \beta_B{}^0 = \beta_T = 50\%$$

In the case in which both of the system A and the system B are communicable at the n-th time point, the power distribution ratios $\beta_A{}^{n+1}$ and $\beta_B{}^{n-1}$ are determined at the n+1 time point as described below. Here, the relationships are established when the sensitivity coefficients $\gamma_A$ and $\gamma_B$ are not actually decreasing as shown below.

$$\gamma_A{}^{n+1} \geq \gamma_A{}^n - \delta, \gamma_B{}^{n+1} \geq \gamma_B{}^n - \delta \quad (3)$$

(1) In the case in which the primary system 54 is the system A:

$\beta_B{}^{n+1} = \beta_{sub} = \min((H_C/(\gamma_B{}^n - \delta)) \times \beta_T, \beta_T)$
$\beta_A{}^{n+1} = \beta_{main} = 100 - \beta_B{}^{n+1}$ (2) In the case in which the primary system 54 is the system B:

$\beta_A{}^{n+1} = \beta_{sub} = \min((H_C/(\gamma_A{}^n - \delta)) \times \beta_T, \beta_T)$
$\beta_B{}^{n+1} = \beta_{main} = 100 - \beta_A{}^{n+1}$ Further, in the case in which the system A or the system B is not communicable at the n-th time point, the operational mode is changed from the two-line mode to the search mode at the n+1 time point.

When $\beta_A{}^{n+1}$ and $\beta_B{}^{n+1}$ are set as described above, establishment of Equation (3) results in the following. The lower limit value $H_T$ is the reception signal strength lower limit value in the two-line mode.

(1) When the primary system 54 is the system A:

$G_B{}^{n+1} = \gamma_B{}^{n+1} \times \beta_B{}^{n+1} \geq (\gamma_B{}^n - \delta) \times (H_C/(\gamma_B{}^n - \delta)) \times \beta_T = H_C \times \beta_T = H_T$ (2) When the primary system 54 is the system B:

$G_A{}^{n+1} = \gamma_A{}^{n+1} \times \beta_A{}^{n+1} \geq (\gamma_A{}^n - \delta) \times (H_C/(\gamma_A{}^n - \delta)) \times \beta_T = H_C \times \beta_T = H_T$ The power distribution ratio determiner 38 controls so that the reception signal strength $G_A{}^{n+1}$ or $G_B{}^{n+1}$ of the secondary system is greater than or equal to the communicable lower limit value $H_T$. However, the distribution ratio of the power distributed to the secondary system is set to a value of up to 50%. That is to say, the reception power distributed to the secondary system is set to be less than or equal to the reception power distributed to the primary system. The two-line mode is continued in the case in which the reception signal strength $G_{sub}$ of the secondary communication line is less than the reception signal strength $G_{main}$ of the primary communication line ($G_{sub} < G_{main}$). Therefore, the power distribution ratio determiner 38 controls so that the reception signal strength $G_{sub}$ of the secondary communication line is greater than or equal to the communicable lower limit value $H_T$.

The power distribution ratio determiner 38 determines the distribution ratios of the primary system and the secondary system for transmission power to be the same as the distribution ratios for the reception power. Further, the distribution ratios of the primary system and the secondary system for transmission power may be different from the distribution ratios for reception power.

Figure 23:
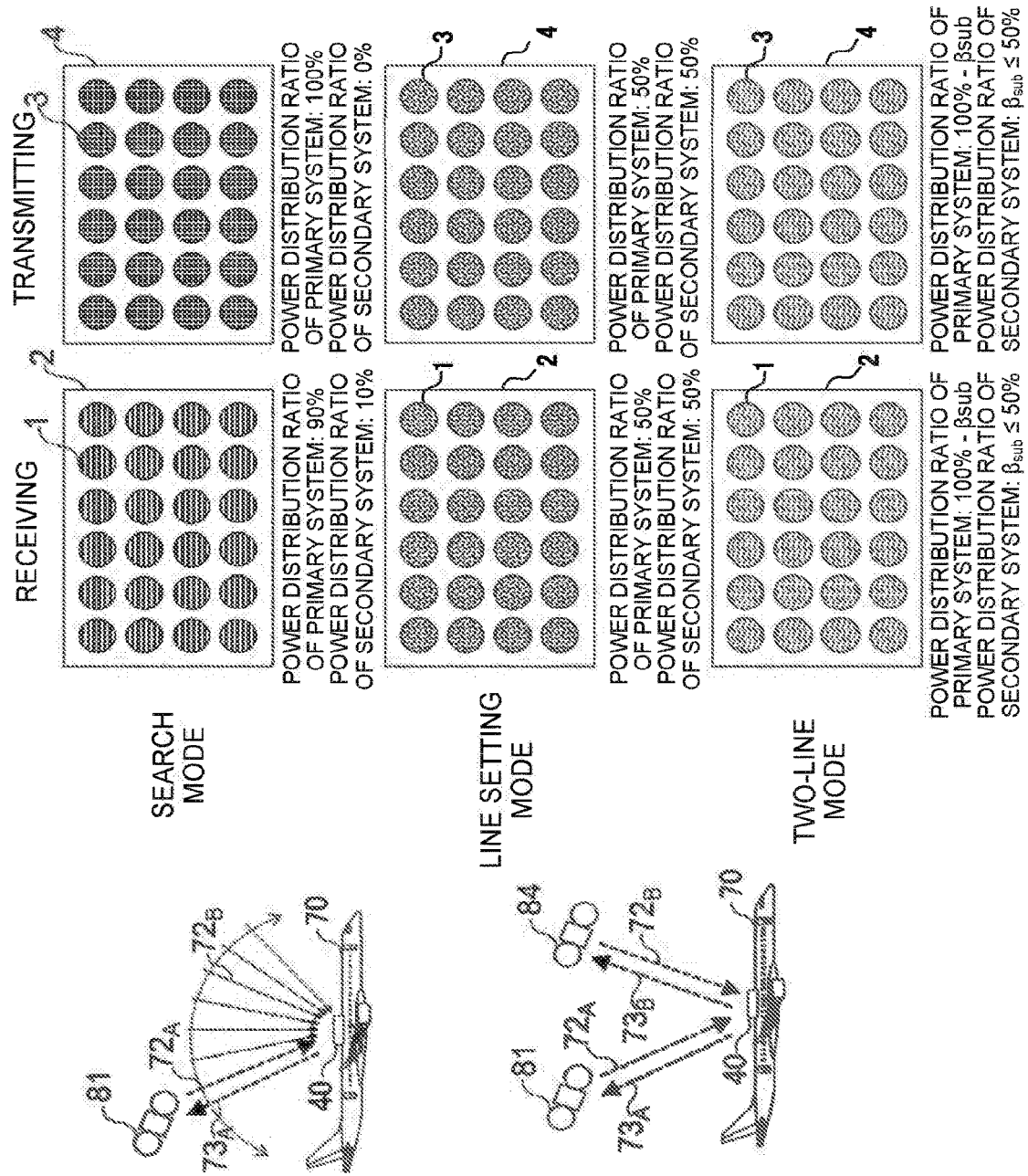
FIG. 23 is a drawing illustrating an example of use state of the antenna in the operational mode of the communication device according to Embodiment 5.

FIG. 23 is a drawing illustrating an example of a use state of the antenna in an operational mode of a communication device according to Embodiment 5. The power distribution ratios of reception and transmission in the two-line mode are changed depending on the sensitivity coefficient of the reception signal strength.

When the sensitivity coefficient of the reception signal strength of the secondary communication line is greater than the sensitivity coefficient of the reception signal strength of the primary communication line, or when the sensitivity coefficient of the reception signal strength of the secondary communication line decreases, the two-line communication determiner 33D determines that the two-line communication is unnecessary. That is to say, determination is performed as shown below.

(1) In the case in which the primary system 54 is the system A:

$\gamma_A \geq \gamma_B \geq H_C$ and $M_B \geq 0$: Two-line communication is necessary.

$\gamma_B \geq \gamma_B \geq H_C$ and $M_B < 0$: Two-line communication is unnecessary.

$\gamma_B > \gamma_A \geq H_C$: Two-line communication is unnecessary.

$\gamma_B \geq H_C > \gamma_A$: Two-line communication cannot be maintained.

$\gamma_A \geq H_C > \gamma_B$: Two-line communication cannot be maintained.

(2) In the case in which the primary system 54 is the system B:

$\gamma_B \geq \gamma_A \geq H_C$ and $M_A \geq 0$: Two-line communication is necessary.

$\gamma_B \geq \gamma_A \geq H_C$ and $M_A < 0$: Two-line communication is unnecessary.

$\gamma_A > \gamma_B \geq H_C$: Two-line communication is unnecessary.

$\gamma_A \geq H_C > \gamma_B$: Two-line communication cannot be maintained.

$\gamma_B \geq H_C > \gamma_A$: Two-line communication cannot be maintained.

Figure 24:
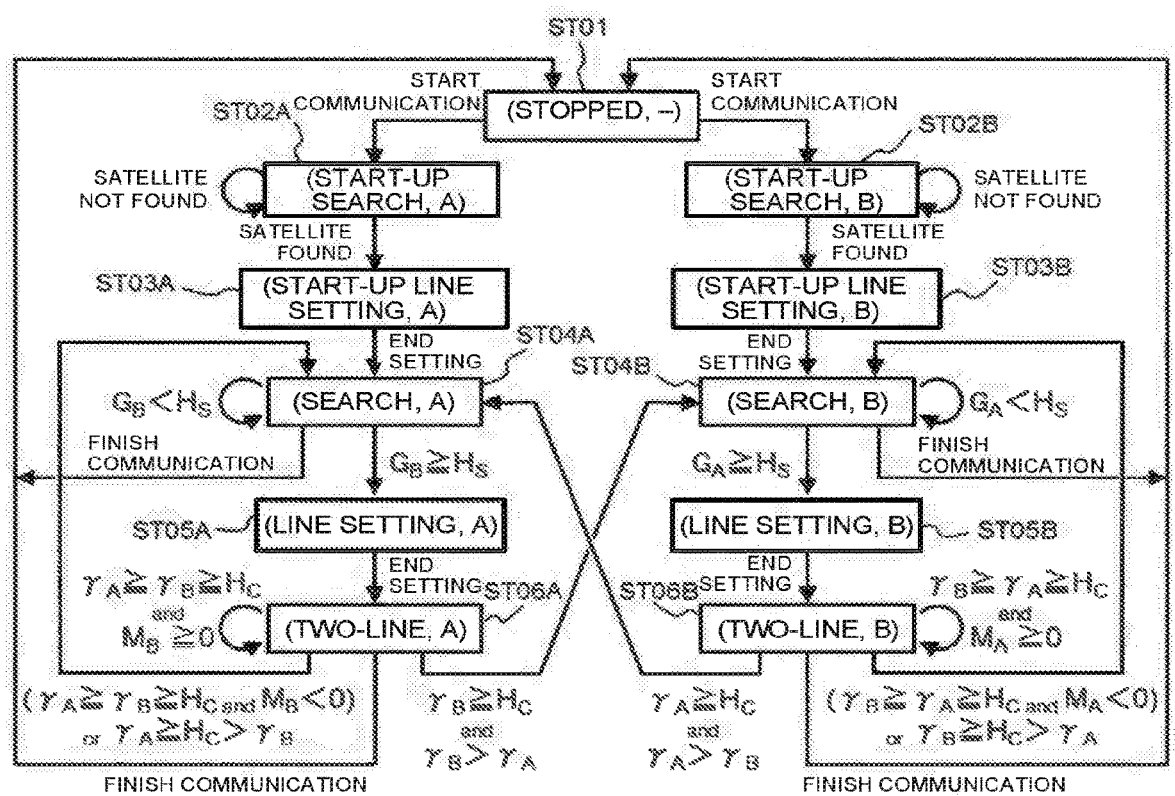
FIG. 24 is a state transition diagram illustrating change of state of the communication device according to Embodiment 5.

FIG. 24 is a state transition diagram illustrating change of state of the communication device according to Embodiment 5 of the present disclosure. Points in FIG. 24 that differ from those in FIG. 18 in the case of Embodiment 4 are described. The conditions for changing from the state ST06A that is "(two-line, system A)" and the state ST06B that is "(two-line, system B)" are different.

While being the state ST06A that is "(two-line, system A)", in the case in which $T_T$ elapses and $\gamma_A \geq \gamma_B \geq H_C$ and $M_B \geq 0$ are detected, since the two-line communication can be maintained and there exists a possibility of performing a handover, the state ST06A is continued. In the case in which $T_T$ elapses and $\gamma_A \geq H_C > \gamma_B$ or ($\gamma_A \geq \gamma_B \geq H_C$ and $M_B < 0$) are detected, it is determined that the handover becomes impossible, and the state is changed to the state ST04A that is "(search, system A)". In the case in which $T_T$ elapses and $\gamma_B \geq H_C$ and $\gamma_B > \gamma_A$ are detected, the handover is performed, and the state is changed to the state ST04B that is "(search, system B)".

While being the state ST06B that is "(two-line, system B), in the case in which $T_T$ elapses and $\gamma_A \geq \gamma_B \geq H_T$ and $M_A \geq 0$ are detected, since the two-line communication can be maintained and there exists a possibility of performing the handover, the state ST06B is continued. In the case in which $T_T$ elapses and $\gamma_B \geq H_T > \gamma_A$ or ($\gamma_B \geq \gamma_A \geq H_C$ and $M_A < 0$) are detected, it is determined that the handover becomes impossible, and the state is changed to the state ST04B that is "(search, system B)". In the case in which $T_T$ elapses and $\gamma_A \geq H_C$ and $\gamma_A > \gamma_B$ are detected, the handover is performed, and the state is changed to the state ST04A that is "(search, system A)".

Figure 25:
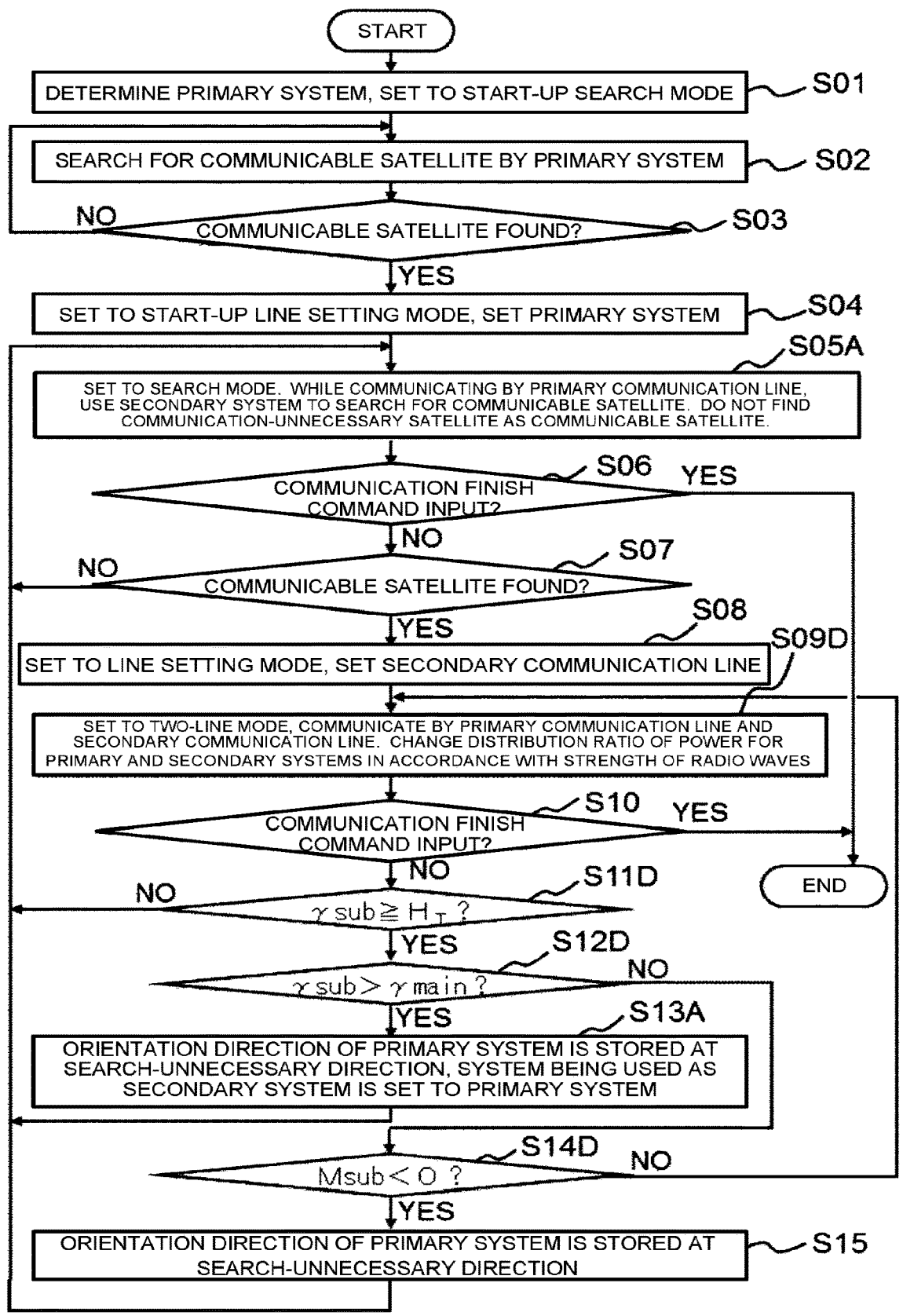
FIG. 25 is a flowchart illustrating operation of the communication device according to Embodiment 5.

Operations are described. FIG. 25 is a flowchart illustrating operation of the communication device according to Embodiment 5. Points in FIG. 25 that differ from those in FIG. 19 in the case of Embodiment 4 are described. Steps S09D, S11D, S12D, and S14D are modified.

In step S09D, the operational mode 53 is set to the two-line mode, and communication is performed using the primary communication line and the secondary communication line. The distribution ratios of power of the reception and transmission of the primary system and the secondary system are changed depending on strength of radio waves. The power distribution ratio determiner 38 controls the power distribution ratios of reception and transmission such that the reception signal strength $G_{sub}$ of the secondary system, that is, of the secondary communication line, is greater than or equal to the communicable lower limit value $H_T$, and such that the power distribution ratio of the primary system is greater than or equal to 50%. At the time of starting the two-line mode, the power distribution ratios for reception and transmission are set to 50% for the primary system and 50% for the secondary system. In step S10, it is checked as to whether a communication finish command is inputted. When the communication finish command is inputted (YES in step S10), communication is ended.

In the case in which the communication finish command is not inputted (NO in step S10), it is checked in step S11D whether the sensitivity coefficient ($\gamma_{sub}$) of the signal strength of the secondary communication line is greater than or equal to the lower limit value ($H_C$). In the case in which $\gamma_{sub} \geq H_C$ is detected, the secondary communication line is communicable. In the case in which $\gamma_{sub} \geq H_C$ is not detected (NO in step S11D), processing returns to step S05A, and the communication device 40D operates in the search mode.

In the case in which the secondary communication line is communicable (YES in step S11D), it is checked in step S12D whether the sensitivity coefficient ($\gamma_{main}$) of the reception signal strength of the primary communication line is greater than or equal to the sensitivity coefficient ($\gamma_{sub}$) of the reception signal strength of the secondary communication line. In the case in which $\gamma_{main}$ is less than $\gamma_{sub}$ (NO in step S12D), it is determined that the two-line communication is unnecessary, and the handover is performed from the primary satellite to the secondary satellite. In step S13A, the orientation direction of the primary system is stored at the search-unnecessary direction 62, and the system that is being used as the secondary system is stored at the primary system 53. And processing returns to step S05A, and the communication device 40D operates in the search mode.

In the case in which $\gamma_{main}$ is greater than or equal to $\gamma_{sub}$ (YES in step S12D), processing proceeds to step S14D. In step S14D, it is checked as to whether the change rate ($M_{sub}$) of $\gamma_{sub}$ is negative. In the case in which $M_{sub} < 0$ (YES in step S14D) is detected, it is determined that the handover becomes impossible from the primary satellite to the secondary satellite, and the two-line communication is discontinued. In step S15, the orientation direction of the secondary system is stored at the search-unnecessary direction 62. After executing step S15, processing returns to step S05A. In the case in which $M_{sub} < 0$ is not detected (NO in step S14D), processing returns to step S09D, and the two-line mode is continued.

In the two-line mode, the power distribution ratios are determined such that the power distribution ratio of the primary communication line is greater than or equal to 50%, and the reception signal strength of the secondary communication line is set to a value greater than the communicable strength, and therefore the reception signal strength of the primary communication line can be increased to a value greater than that of the case in which the distribution ratio of the two-line mode is 50% for both of the primary system and the secondary system.

A method of determining the power distribution ratio, other than the method described here, such that, in the two-line mode, the reception signal strength ($G_{sub}$) of the secondary communication line is greater than or equal to the reception signal strength lower limit value ($H_T$), and the power distribution ratio of the primary communication line is greater than or equal to 50%, may be used and causes similar advantageous effects.

With respect to other points, operations are similar to those of Embodiment 4, and similar advantageous effects are obtained.

In the present disclosure, a free combination of the embodiments or a modification of each embodiment or omission of some components of each embodiment can be made without departing from the scope of the present disclosure.

REFERENCE SIGNS LIST

100 Satellite communication system
70 Airplane (mobile body)
71 Communication counterpart
$72_A$, $72_B$ Reception beam
$73_A$, $73_B$ Transmission beam
75, 76, 77 Flight track
81, 82, 83, 84, 85 Satellite
91, 94, 95 Beam range of satellite
40, 40X, 40A, 40B, 40C, 40D Communication device
41 Signal processor
42 Central processing unit (CPU)
43 Memory
44 Primary device
45 Inertial navigation device
$46_A$, $46_B$ Control signal line
$47_A$, $47_B$ Control signal line
$48_A$, $48_B$ Control signal line
49 Control signal line
50 Control signal line
1 Element reception antenna
2 Reception antenna
3 Element transmission antenna
4 Transmission antenna
5 Element reception signal processor
6 Element transmission signal generator
$7_A$, $7_B$ Signal strength measurer
$8_A$, $8_B$, $8X_A$, $8X_B$ Modem
9, 9X Reception switching circuit
10, 10X Transmission switching circuit
11, 11X, 11A, 11B, 11C, 11D Controller
12 Power supply
$13_A$, $13_B$ Output terminal 14$_A$, 14$_B$ Synthesis circuit
15$_A$, 15$_B$ Reception module
16$_A$, 16$_B$ Input terminal
17$_A$, 17$_B$ Distribution circuit
18$_A$, 18$_B$ Transmission module
19$_A$, 19$_B$ Phase shifter
20$_A$, 20$_B$ Amplifier
21$_A$, 21$_B$ Phase shifter
22$_A$, 22$_B$ Amplifier
23 Line manager
24 Frequency controller
25 Communication controller
26$_A$, 26$_B$ Tracking controller (orientation controller)
27$_A$, 27$_B$, 27A$_A$, 27A$_B$ Search controller (orientation controller)
28$_A$, 28$_B$, 28D$_A$, 28D$_B$ Reception module controller (orientation controller)
29$_A$, 29$_B$, 29D$_A$, 29D$_B$ Transmission module controller (orientation controller)
30 Reception power distributor
31 Transmission power distributor
32, 32A, 32B Communicable satellite detector
33, 33A, 33C, 33D Two-line communication determiner
34, 34A, 34B Mode manager
35, 35A, 35B, 35D Storage
36 Fuselage attitude acquirer
38 Power distribution ratio determiner
51$_A$, 51$_B$ Reception signal strength
52 Fuselage attitude data
52 Operational mode
54 Primary system
55$_A$, 55$_B$ In-communication satellite
56$_A$, 56$_B$ Reception line frequency
57$_A$, 57$_B$ Transmission line frequency
58$_A$, 58$_B$ Reception frequency
59$_A$, 59$_B$ Transmission frequency
60$_A$, 60$_B$ Orientation direction
61 Search pattern
62 Search-unnecessary direction
63 Communication-unnecessary satellite
64$_A$, 64$_B$ Reception power distribution ratio
65$_A$, 65$_B$ Transmission power distribution ratio

The invention claimed is:

1. A communication device comprising:
a reception antenna having a plurality of element reception antennas each to receive radio waves and output an element reception signal, the reception antenna outputting a plurality of element reception signals;
an element reception signal processor to process the plurality of element reception signals to (i) output a reception signal having a primary reception frequency and coming from a primary reception direction being changeable electronically, and (ii) output a reception signal having a secondary reception frequency different from the primary reception frequency, the reception signal coming from a secondary reception direction being changeable electronically and independently of the primary reception direction;
a transmission antenna having a plurality of element transmission antennas each being inputted an element transmission signal included in a plurality of element transmission signals to transmit radio waves;
an element transmission signal generator (i) being inputted a transmission signal having a primary transmission frequency and a transmission signal having a secondary transmission frequency different from the primary transmission frequency, and (ii) to generate the plurality of element transmission signals being inputted to the respective element transmission antennas such that the transmission antenna transmits radio waves of the primary transmission frequency in a primary transmission direction being changeable electronically, and such that the transmission antenna transmits radio waves of the secondary transmission frequency in a secondary transmission direction being changeable electronically and independently of the primary transmission direction;
two modems each to modulate and demodulate signals transmitted and received using either one of an allocated primary communication line and a secondary communication line allocated while communicating using the primary communication line; and
a controller to control the element reception signal processor, the element transmission signal generator, and the two modems, wherein
the controller
controls switching between (i) a search mode to communicate with a communication counterpart by tracking in the primary reception direction and the primary transmission direction a primary satellite communicating using the primary communication line and being a communicable satellite transmitting radio waves receivable at a strength being greater than or equal to a determined communicable lower limit value, and to find the communicable satellite by setting the secondary reception frequency to a beacon frequency being a frequency of a beacon signal transmitted from a satellite and changing the secondary reception direction within a determined search range of an orientation direction, (ii) a line setting mode to set the secondary communication line to be relayed by a secondary satellite being the communicable satellite found in the search mode to communicate with the communication counterpart using the secondary communication line, and (iii) a two-line mode to communicate with the communication counterpart using the primary communication line by tracking the primary satellite in the primary reception direction and the primary transmission direction, and to communicate with the communication line set in the line setting mode, by tracking the secondary satellite in the secondary reception direction and the secondary transmission direction, and
the two-line mode is changed to the search mode.

2. The communication device according to claim 1, further comprising:
a primary signal strength measurer to measure a primary signal strength being a strength of the reception signal having the primary reception frequency outputted by the element reception signal processor; and
a secondary signal strength measurer to measure a secondary signal strength being a strength of the reception signal having the secondary reception frequency outputted by the element reception signal processor, wherein
the controller comprises:
a frequency controller that (i) in the search mode, the line setting mode, and the two-line mode, sets the primary reception frequency to a reception frequency allocated to the primary communication line, and sets the primary transmission frequency to a transmission frequency allocated to the primary communication line, (ii) in the search mode, sets the secondary reception frequency to the beacon frequency, (iii) in the line setting mode, sets the secondary reception frequency to a reception frequency used in line allocation control and sets the secondary transmission frequency to a transmission frequency used in the line allocation control, and (iv) in the two-line mode, sets the secondary reception frequency to a reception frequency allocated to the secondary communication line and sets the secondary transmission frequency to a transmission frequency allocated to the secondary communication line, an orientation controller to control the primary reception direction, the secondary reception direction, the primary transmission direction, and the secondary transmission direction, a reception power distributor to determine (i) a primary reception power being power used in processing of the reception signal having the primary reception frequency, and (ii) a secondary reception power being power used in processing of the reception signal having the secondary reception frequency, a transmission power distributor to determine (i) a primary transmission power being power used in generation of the transmission signal having the primary transmission frequency and (ii) a secondary transmission power being power used in generation of the transmission signal having the secondary transmission frequency, a line manager that, in the line setting mode, requests to allocate the secondary communication line, and sets the allocated secondary communication line to communicate with the communication counterpart, a communication controller that (i) in the search mode, controls one of the modems to modulate and demodulate the signals transmitted and received using the primary communication line, (ii) in the line setting mode, controls one of the modems to modulate and demodulate the signals transmitted and received using the primary communication line, and controls the other one of the modems to modulate and demodulate the signals transmitted and received using the secondary communication line, to cause the signals to be inputted to and to be outputted from the line manager, and (iii) in the two-line mode, controls the two modems to modulate and demodulate the signals transmitted and received using the primary communication line and the signals transmitted and received using the secondary communication line, a communicable satellite detector to find the communicable satellite based on the secondary signal strength in the search mode, a two-line communication determiner to determine, in the two-line mode, whether the two-line mode is to be continued based on at least one of the primary signal strength and the secondary signal strength, and a mode manager that controls switching between the search mode, the line setting mode, and the two-line mode based on output from the line manager, the communicable satellite detector, and the two-line communication determiner.

3. The communication device according to claim 2, wherein
in the search mode, the reception power distributor sets the secondary reception power to power being greater than or equal to power that ensure to find the communicable satellite, and sets the primary reception power to power being greater than the secondary reception power.

4. The communication device according to claim 2, wherein
in the two-line mode, the reception power distributor sets the primary reception power and the secondary reception power to be the same, and the transmission power distributer sets the primary transmission power and the secondary transmission power to be the same.

5. The communication device according to claim 2, wherein
in the two-line mode, the reception power distributor sets the secondary reception power to power being less than or equal to the primary reception power, and such that the secondary signal strength is a value being greater than or equal to the reception signal strength lower limit value.

6. The communication device according to claim 5, wherein
in the two-line mode, the transmission power distributor sets a ratio of the secondary transmission power to the primary transmission power to be the same as a ratio of the secondary reception power to the primary reception power.

7. The communication device according to claim 2, wherein
the reception power distributor sets the primary reception power and the secondary reception power such that a total of the primary reception power and the secondary reception power is fixed, and
the transmission power distributor sets the primary transmission power and the secondary transmission power such that a total of the primary transmission power and the secondary transmission power is fixed.

8. The communication device according to claim 2, wherein
when the two-line communication determiner determines that the primary satellite or the secondary satellite is not the communicable satellite, the two-line communication determiner determines that the two-line mode is not to be continued.

9. The communication device according to claim 8, wherein
when the primary signal strength being less than a primary reception signal strength lower limit value determined based on the communicable lower limit value and the primary reception power is detected, the two-line communication determiner determines that the primary satellite is not the communicable satellite, and
when the secondary signal strength being less than a secondary reception signal strength lower limit value determined based on the communicable lower limit value and the secondary reception power is detected, the two-line communication determiner determines that the secondary satellite is not the communicable satellite.

10. The communication device according to claim 2, wherein
when the secondary signal strength being greater than or equal to a secondary reception signal strength lower limit value determined based on the communicable lower limit value and the secondary reception power is detected in a direction different from the primary reception direction, the communicable satellite detector finds the communicable satellite, and when the secondary signal strength being greater than or equal to the secondary reception signal strength lower limit value is not detected in the direction different from the primary reception direction, the communicable satellite detector does not find the communicable satellite.

11. The communication device according to claim 8, wherein
when the two-line mode communication determiner determines that both of the primary satellite and the secondary satellite are communicable satellites and that the two-line mode is unnecessary, the two-line communication determiner determines that the two-line mode is not to be continued.

12. The communication device according to claim 11, wherein
when the secondary signal strength is greater than a switching-possible lower limit value determined based on the primary signal strength, the two-line communication determiner determines that the two-line mode is unnecessary, and communication using the primary communication line is discontinued.

13. The communication device according to claim 11, wherein
when the secondary signal strength is detected as decreasing, the two-line communication determiner determines that the two-line mode is unnecessary, and communication using the secondary communication line is discontinued.

14. The communication device according to claim 11, wherein
when the two-line communication determiner determines that the two-line mode is unnecessary and the two-line mode is changed to the search mode, a search-unnecessary direction is stored, the search-unnecessary direction being a direction in which communicating with the communicable satellite with which communication is discontinued,
in the search mode,
when the secondary signal strength being greater than or equal to a secondary reception signal strength lower limit value determined based on the communicable lower limit value and the secondary reception power is detected in a direction different from the primary reception direction and the search-unnecessary direction, the communicable satellite detector finds the communicable satellite,
when the secondary signal strength being greater than or equal to the secondary reception signal strength lower limit value is not detected in a direction different from the primary reception direction and the search-unnecessary direction, the communicable satellite detector does not find the communicable satellite.

15. The communication device according to claim 11, wherein
when the two-line communication determiner determines that the two-line mode is unnecessary and the two-line mode is changed to the search mode, a communication-unnecessary satellite is stored, the communication-unnecessary satellite being the communicable satellite used for communication that is discontinued,
in the search mode,
when the beacon signal is received from a satellite being different from the primary satellite and the communication-unnecessary satellite, and the secondary signal strength of the beacon signal being greater than or equal to a secondary reception signal strength lower limit value determined based on the communicable lower limit value and the secondary reception power is detected, the communicable satellite detector finds the communicable satellite,
when the beacon signal is received from a satellite different from the primary satellite and the communication-unnecessary satellite, and the secondary signal strength of the beacon signal being greater than or equal to the secondary reception signal strength lower limit value is not detected, the communicable satellite detector does not find the communicable satellite.

16. The communication device according to claim 10, wherein
the communicable satellite detector, when the communicable satellite is found, also detects a direction in which the communicable satellite exists.

17. The communication device according to claim 1, wherein
the communication device is mounted on a mobile body.

18. A communication method to communicate with a communication counterpart by using a communication device including (i) a reception antenna having a plurality of element reception antennas each to receive radio waves and output an element reception signal, the reception antenna outputting a plurality of element reception signals, (ii) an element reception signal processor to process the plurality of element reception signals and to output a reception signal having a primary reception frequency and coming from a primary reception direction being changeable electronically, and to output a reception signal having a secondary reception frequency different from the primary reception frequency, the reception signal coming from a secondary reception direction being changeable electronically and independently of the primary reception direction, (iii) a transmission antenna having a plurality of element transmission antennas each being inputted an element transmission signal included in a plurality of element transmission signals to transmit radio waves, (iv) an element transmission signal generator being inputted a transmission signal having a primary transmission frequency and a transmission signal having a secondary transmission frequency different from the primary transmission frequency, and to generate the plurality of element transmission signals being inputted to the respective element transmission antennas such that the transmission antenna transmits radio waves of the primary transmission frequency in a primary transmission direction being changeable electronically, and such that the transmission antenna transmits radio waves of the secondary transmission frequency in a secondary transmission direction being changeable electronically and independently of the primary transmission direction, (v) two modems each to modulate and demodulate signals transmitted and received using either one of an allocated primary communication line and a secondary communication line allocated while communicating using the primary communication line, and (iv) a controller to control the element reception signal processor, the element transmission signal generator, and the two modems, the communication method comprising:
a search procedure to communicate with the communication counterpart by tracking in the primary reception direction and the primary transmission direction a primary satellite communicating using the primary communication line and being a communicable satellite transmitting radio waves receivable at a strength being greater than or equal to a determined communicable lower limit value, and to find the communicable satellite by setting the secondary reception frequency to a beacon frequency being a frequency of a beacon signal transmitted from a satellite and changing the secondary reception direction within a determined search range of an orientation direction;

a line setting procedure to set the secondary communication line to be relayed by a secondary satellite being the communicable satellite found in the search procedure to communicate with the communication counterpart using the secondary communication line;

a two-line communication procedure to communicate with the communication counterpart using the primary communication line by tracking the primary satellite in the primary reception direction and the primary transmission direction, and to communicate with the communication counterpart using the secondary communication line, set in the line setting procedure, by tracking the secondary satellite in the secondary reception direction and the secondary transmission direction, and a two-line communication continuation check procedure, executed in parallel with the two-line communication procedure, to check whether the two-line communication procedure is to be continued, wherein when it is determined that the two-line communication procedure is not to be continued in the two-line communication continuation check procedure, the two-line communication procedure is changed to the search procedure.

19. The communication method according to claim 18, wherein the two-line communication continuation check procedure comprises:

a primary signal strength measurement procedure to measure a primary signal strength being a strength of the reception signal having the primary reception frequency from the primary satellite, a secondary signal strength measurement procedure to measure a secondary signal strength being a strength of the reception signal having the secondary reception frequency from the secondary satellite, and a two-line communicable check procedure to check whether the primary satellite is the communicable satellite based on the primary signal strength, and to check whether the secondary satellite is the communicable satellite based on the secondary signal strength, and when it is detected that the primary satellite or the secondary satellite is not the communicable satellite in the two-line communicable check procedure, it is determined that the two-line communication procedure is not to be continued.

20. The communication method according to claim 19, wherein the two-line communication continuation check procedure further comprises a two-line communication-unnecessary determination procedure to determine whether continuation of the two-line communication procedure is necessary based on, when both of the primary satellite and the secondary satellite are the communicable satellites, at least one of the primary signal strength or the secondary signal strength, and when it is determined that continuation of the two-line communication procedure is unnecessary in the two-line communication-unnecessary determination procedure, it is determined that the two-line communication procedure is not to be continued.

\* \* \* \* \*